United States Patent
Fujimoto et al.

(10) Patent No.: US 10,082,125 B2
(45) Date of Patent: Sep. 25, 2018

(54) CONTROL APPARATUS AND IGNITION APPARATUS

(71) Applicant: DENSO CORPORATION, Kariya, Aichi-pref. (JP)

(72) Inventors: Hidekazu Fujimoto, Kariya (JP); Makoto Toriyama, Kariya (JP); Satoru Nakayama, Kariya (JP); Yasuomi Imanaka, Kariya (JP); Kanechiyo Terada, Kariya (JP); Shunichi Takeda, Kariya (JP); Kaori Doi, Kariya (JP); Junichi Wada, Kariya (JP); Hisaharu Morita, Kariya (JP); Naohisa Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/302,072

(22) PCT Filed: Apr. 9, 2015

(86) PCT No.: PCT/JP2015/061173
§ 371 (c)(1),
(2) Date: Jan. 30, 2017

(87) PCT Pub. No.: WO2015/156371
PCT Pub. Date: Oct. 15, 2015

(65) Prior Publication Data
US 2017/0159634 A1    Jun. 8, 2017

(30) Foreign Application Priority Data

Apr. 10, 2014 (JP) .................. 2014-080620
Apr. 10, 2014 (JP) .................. 2014-080626
Apr. 10, 2014 (JP) .................. 2014-080666

(51) Int. Cl.
F02P 11/06 (2006.01)
F02P 3/05 (2006.01)
(Continued)

(52) U.S. Cl.
CPC ............... F02P 11/06 (2013.01); F02D 9/08 (2013.01); F02D 37/02 (2013.01); F02D 41/22 (2013.01); F02D 41/3005 (2013.01); F02P 9/002 (2013.01)

(58) Field of Classification Search
CPC .......... F02P 11/06; F02P 15/001; F02P 9/002; F02P 3/09; F02P 3/05; F02P 3/051;
(Continued)

(56) References Cited

U.S. PATENT DOCUMENTS

| 5,221,904 A | 6/1993 | Shimasaki et al. | |
| 2008/0007266 A1* | 1/2008 | Enomoto | F02P 9/002 324/380 |

(Continued)

FOREIGN PATENT DOCUMENTS

| JP | 61-058974 | 3/1986 |
| JP | 4-284176 | 10/1992 |

(Continued)

*Primary Examiner* — Lindsay Low
*Assistant Examiner* — George Jin
(74) *Attorney, Agent, or Firm* — Nixon & Vanderhye PC

(57) ABSTRACT

In a control apparatus, a discharge control unit controls an igniter unit so that a flow of current from a primary coil towards a ground side is blocked, thereby generating a high voltage in a secondary coil, and controls a spark plug so that the spark plug generates electric discharge. An energy input control unit controls an energy input unit so as to input electrical energy to an ignition coil after the start of control of the spark plug by the discharge control unit. A control unit and an abnormality detecting unit detects an abnormality in the igniter unit or the ignition coil based on a first threshold (Continued)

and a first current value that is a value corresponding to a current detected by a current detection circuit at this time, when a first predetermined period elapses after the start of control of the spark plug by the discharge control unit.

22 Claims, 21 Drawing Sheets

(51) Int. Cl.
    *F02P 9/00*     (2006.01)
    *F02D 9/08*     (2006.01)
    *F02D 37/02*     (2006.01)
    *F02D 41/22*     (2006.01)
    *F02D 41/30*     (2006.01)

(58) Field of Classification Search
    CPC .. F02P 17/12; F02D 9/08; F02D 37/02; F02D 41/22; F02D 41/3005
    See application file for complete search history.

(56) References Cited

U.S. PATENT DOCUMENTS

| | | | |
|---|---|---|---|
| 2009/0173315 A1* | 7/2009 | Inada | F02P 17/12 |
| | | | 123/406.26 |
| 2010/0122689 A1* | 5/2010 | Tanaya | F02D 35/021 |
| | | | 123/406.26 |

FOREIGN PATENT DOCUMENTS

| | | |
|---|---|---|
| JP | 7-229461 | 8/1995 |
| JP | 8-68372 | 3/1996 |
| JP | 2000-64938 | 3/2000 |
| JP | 2000-170632 | 6/2000 |
| JP | 2002-303238 | 10/2002 |
| JP | 2003-28037 | 1/2003 |
| JP | 2004-301016 | 10/2004 |
| JP | 2008-088948 | 4/2008 |
| JP | 2010-65549 | 3/2010 |
| JP | 2012-219627 | 11/2012 |
| JP | 2015-200269 | 11/2015 |
| JP | 2015-200300 | 11/2015 |

* cited by examiner

FIG.9
(A)
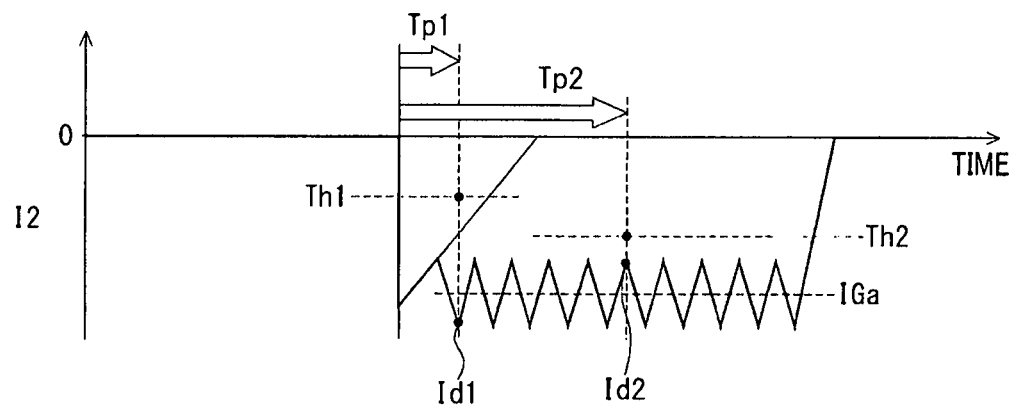
(B)
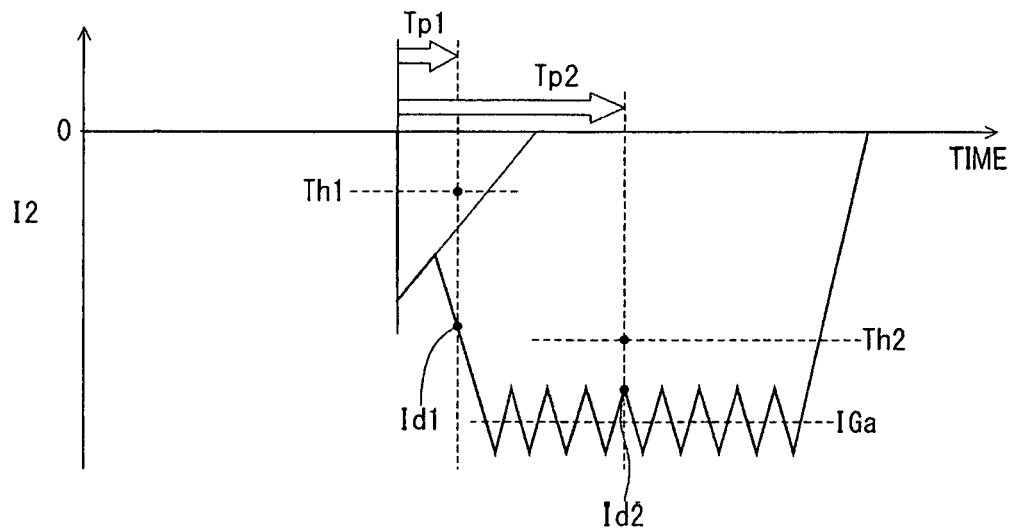

FIG.12
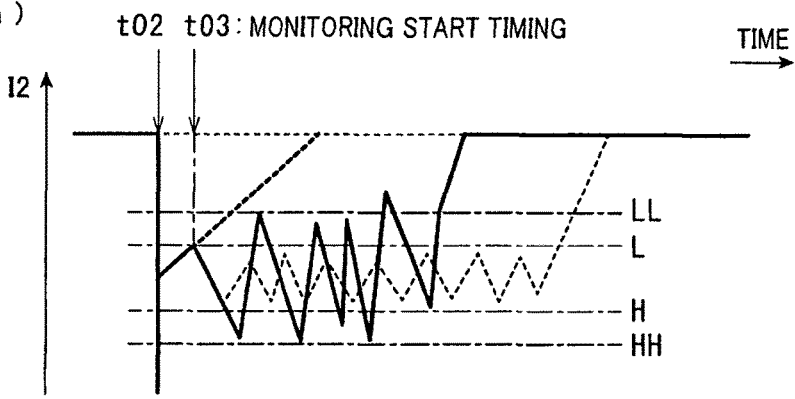
(a)
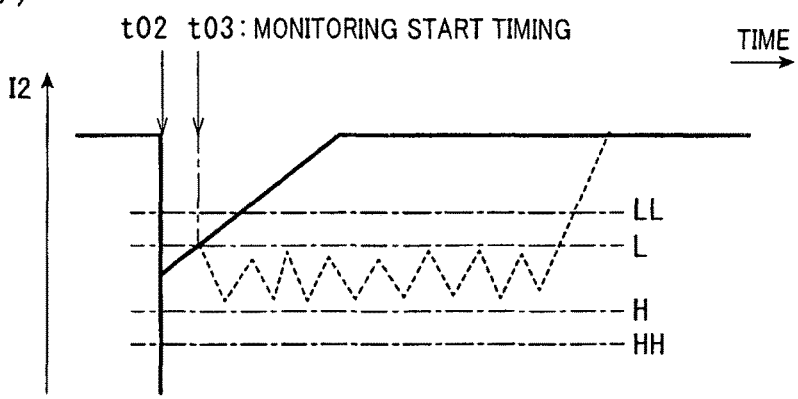
(b)
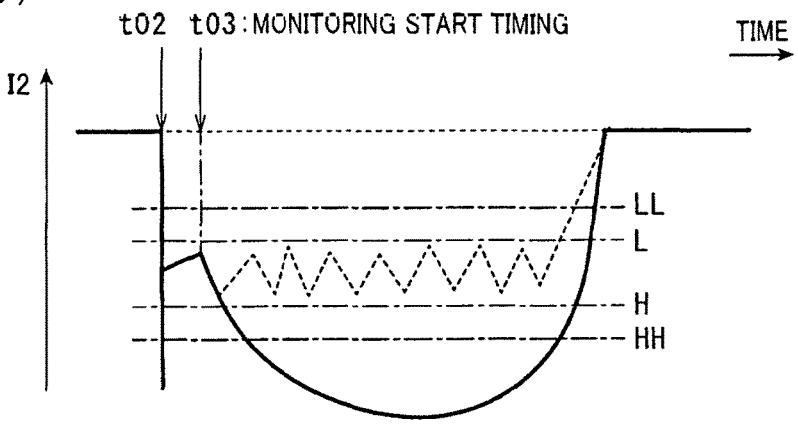
(c)

FIG.19
(a) DURING NORMAL OPERATION
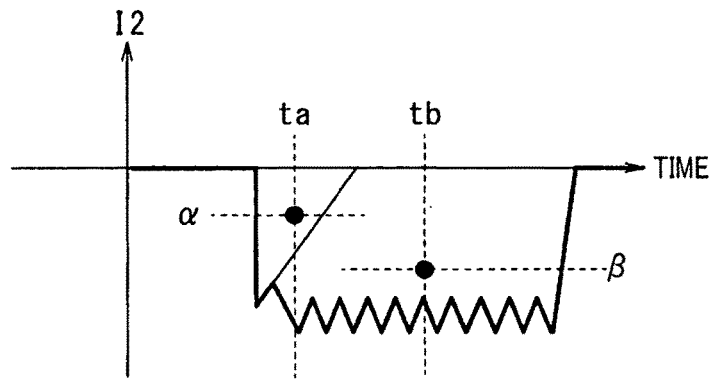
(b) DURING CONTINUED SPARK DISCHARGE ABNORMALITY
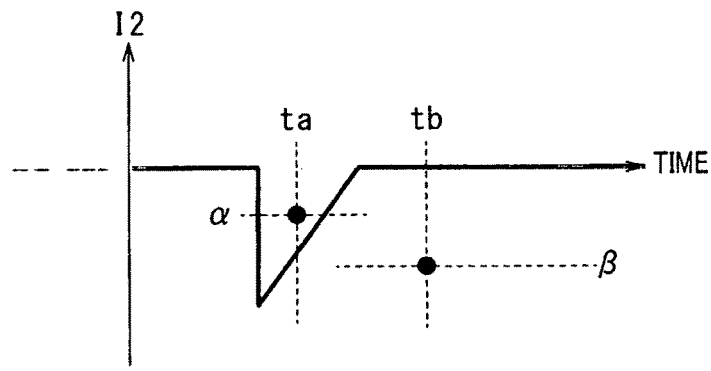
(c) DURING MAIN IGNITION ABNORMALITY
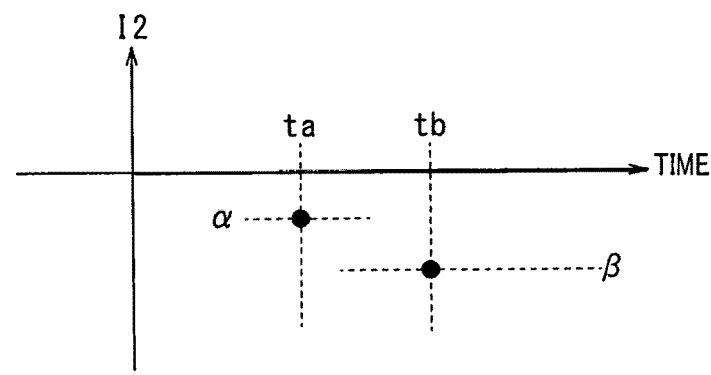

CONTROL APPARATUS AND IGNITION APPARATUS

CROSS-REFERENCE TO RELATED APPLICATION

This application is a U.S. National Phase Application under 35 U.S.C. 371 of International Application No. PCT/JP2015/061173 filed on Apr. 9, 2015 and published in Japanese as WO 2015/156371 A1 on Oct. 15, 2015. This application is based on and claims the benefit of priority from Japanese Patent Application Nos. 2014-080620, filed Apr. 10, 2014, 2014-080626, filed Apr. 10, 2014, and 2014-080666, filed Apr. 10, 2014. The entire disclosures of all of the above applications are incorporated herein by reference.

TECHNICAL FIELD

The present invention relates to a control apparatus. In particular, the present invention relates to a control apparatus that controls an ignition apparatus of an internal combustion engine. Furthermore, the present invention relates to an ignition apparatus that is used in an internal combustion engine (engine).

BACKGROUND ART

Conventionally, a control apparatus that controls an ignition apparatus of an internal combustion engine and controls ignition of an air-fuel mixture in a combustion chamber is known. For example, in a control apparatus described in PTL 1, a discharge time of a spark plug is measured. Operation of an internal combustion engine is controlled based on the measured discharge time.

In addition, as a related technology for reducing load placed on the spark plug, suppressing needless power consumption, and continuing spark discharge, the present applicants have proposed the following energy input circuit (refer to Japanese Patent Application No. 2013-082958; this technology was unpublished at the time of filing of the Japanese application serving as basis for priority rights of the present application).

The energy input circuit inputs electrical energy from a negative side of a primary coil before a spark discharge (referred to, hereafter, as a main ignition) started by a so-called full-transistor type ignition circuit goes out, and thereby continuously sends a secondary current that is in the same direction as the main ignition. As a result, the energy input circuit enables the spark discharge generated as the main ignition to be continued over an arbitrary period.

Hereafter, the spark discharge that is continued by the energy input circuit, that is, the spark discharge following the main ignition is referred to as continued spark discharge. In addition, the period over which the continued spark discharge continues is referred to as a continued discharge period.

The energy input circuit adjusts the secondary current and maintains the spark discharge by controlling a primary current during the continued discharge period. In addition, as a result of the secondary current during the continued spark discharge being adjusted, the load placed on the spark plug can be reduced, needless power consumption can be suppressed, and spark discharge can be continued.

Furthermore, to enable spark discharge to be stably continued without being affected by individual differences among apparatuses, degradation over time, diversity in discharge environments, and the like, the present applicants have also proposed a configuration in which a feedback circuit is added. The feedback circuit detects the secondary current and provides feedback to the energy input circuit (refer to Japanese Patent Application No. 2013-246091; this technology was unpublished at the time of filing in the Japanese application serving as basis for priority rights of the present application.)

First Reference Example

Next, for the purpose of supplementing comprehension of the present invention, a first reference example of an energy input circuit to which the present invention is not applied will be described as a related technology, with reference to FIG. 15.

An ignition apparatus 1100 of the first reference example shown in FIG. 15 includes a main ignition circuit 1102 and an energy input circuit 1103. The main ignition circuit 1102 makes a spark plug 1101 generate a main ignition based on full-transistor. The energy input circuit 1103 makes the spark plug 1101 generate a continued spark discharge following the main ignition.

The main ignition circuit 1102 accumulates magnetic energy in a primary coil 1106 by sending a positive primary current from an on-board battery 1105 to the primary coil 1106, as a result of a switching element 1104 being turned ON. Subsequently, as a result of the switching element 1104 being turned OFF, the main ignition circuit 1102 converts the magnetic energy to electrical energy by electromagnetic induction, generates a high voltage in a second coil 1107, and generates the main ignition. In addition, the energy input circuit 1103 boosts the voltage of the on-board battery 1105 in a booster circuit 1108 and accumulates electrical energy in a capacitor 1109. In addition, as a result of a switching element 1110 being turned ON/OFF, the energy input circuit 1103 inputs the electrical energy accumulated in the capacitor 1109 to a negative side of the primary coil 1106.

Furthermore, the ignition apparatus 1100 shown in FIG. 15 includes a feedback circuit 1111. The feedback circuit 1111 detects the secondary current and provides feedback to the energy input circuit 1103. The feedback circuit 1111 provides a driver circuit of the energy input circuit 1103 with feedback of the detected secondary current.

However, when the secondary current during the continued spark discharge indicates an abnormal numeric value due to malfunction of the ignition apparatus or the like, situations such as those below may occur. That is, when the secondary current during the continued spark discharge is excessively small, an energy input amount from the energy input circuit may become excessively small, thereby possibly leading to engine misfire. Conversely, when the secondary current during the continued spark discharge is excessively large, the energy input amount may become excessively large with continued use, thereby possibly leading to further malfunctions. Therefore, a means for determining an abnormality in the secondary current during operation of the energy input circuit is necessary.

Meanwhile, as a related technology, a technology is known in which the intensity of turbulence inside a combustion chamber is estimated based on a discharge time of a spark plug. Whether or not a combustion state of an engine is in a stable range is determined based on the estimation result, and the intensity of turbulence is reduced (refer to PTL 2).

Second Reference Example

Next, for the purpose of supplementing comprehension of the present invention, a second reference example of an energy input circuit to which the present invention is not applied will be described as a related technology, with reference to FIG. 21.

An ignition apparatus 2100 of the second reference example shown in FIG. 21 includes a main ignition circuit 2102 and an energy input circuit 2103. The main ignition circuit 2102 makes a spark plug 2101 generate a main ignition based on full-transistor. The energy input circuit 2103 makes the spark plug 2101 generate a continued spark discharge following the main ignition.

The main ignition circuit 2102 accumulates magnetic energy in a primary coil 2106 by sending a positive primary current from an on-board battery 2105 to the primary coil 2106, as a result of a switching element 2104 being turned ON. Subsequently, as a result of the switching element 2104 being turned OFF, the main ignition circuit 2102 converts the magnetic energy to electrical energy by electromagnetic induction, generates a high voltage in the second coil 2107, and generates the main ignition. In addition, the energy input circuit 2103 boosts the voltage of the on-board battery 2105 in a booster circuit 2108 and accumulates electrical energy in a capacitor 2109. In addition, as a result of a switching element 2110 being turned ON/OFF, the energy input circuit 2103 inputs the electrical energy accumulated in the capacitor 2109 to a negative side of the primary coil 2106.

In addition, the period over which the magnetic energy is accumulated in the primary coil 2106 and the timing at which the main ignition is started in the main ignition circuit 2102, and the period over which the electrical energy is inputted to the primary coil 2106 and the continued spark discharge is maintained in the energy input circuit 2103 are each commanded based on the start and stop of input of signals outputted from a separate control apparatus.

Hereafter, a signal commanding the period over which the magnetic energy is accumulated in the primary coil 2106 and the timing at which the main ignition is started in the main ignition circuit 2102 is referred to as an ignition signal IGt. A signal commanding the period over which the electrical energy is inputted to the primary coil 2106 and the continued spark discharge is maintained in the energy input circuit 2103 is referred to as a continued discharge signal IGw.

However, it is necessary to consider, in advance, the manner in which to operate the ignition apparatus 2100 when a malfunction occurs in the energy input circuit 2103. At this time, enabling the engine to be operated while suppressing deterioration of fuel efficiency to the greatest possible extent is preferable.

In addition, as a related technology, in conventional ignition apparatuses that do not include an energy input circuit but include a circuit corresponding to the main ignition circuit, an ignition apparatus is known in which, when the circuit corresponding to the main ignition circuit malfunctions in any of the cylinders, fuel injection is stopped in the malfunctioning cylinder to prevent overheating of a catalyst caused by fuel not being ignited (for example, refer to PTL 3).

Furthermore, as a related technology, in ignition apparatuses that perform so-called multiple ignition, an ignition apparatus is known in which a conduction path dedicated to malfunctions is provided in preparation for malfunctions in the circuit corresponding to the main ignition circuit, and the ignition operation is continued (for example, refer to PTL 4).

CITATION LIST

Patent Literature

[PTL 1] JP-A-2008-88948
[PTL 2] JP-A-2012-219627
[PTL 3] JP-A-S61-058974
[PTL 4] JP-A-2002-303238

SUMMARY

Technical Problem

In the control apparatus in PTL 1, when the discharge time becomes a predetermined threshold or less during a lean operation of the internal combustion engine, the operation is switched to a stoichiometric operation to prevent misfire. As a result, stable drivability is ensured. Here, it is thought that, should a current flowing through the secondary coil of the ignition coil be detected during discharge by the spark plug, an abnormality in the ignition coil can be detected based on the detected current value and a threshold.

However, in the control apparatus in PTL 1, no consideration is given regarding abnormality detection of the ignition apparatus. Therefore, during an abnormality in the ignition apparatus, fuel efficiency, emission, and drivability may deteriorate, and response such as setting the vehicle to limp-home may not be possible.

Here, an ignition apparatus that includes an energy input unit is known. The energy input unit is capable of maintaining the discharge state by continuously inputting electrical energy to the ignition coil after the start of discharge control of the spark plug. In the ignition apparatus, regarding the current flowing through the secondary coil, a current value detected at the time of normal discharge by the spark plug and a current value detected at the time of input of electrical energy to the ignition coil after discharge may differ. Therefore, when the control apparatus in PTL 1 is applied to an ignition apparatus configured in this way and an abnormality is detected by the above-described method, although abnormality in the ignition coil may be detected with a single threshold, an abnormality in the energy input unit may not be detected.

In addition, the technology in PTL 2 is related to a technology for correcting turbulence within the combustion chamber using the discharge time of the spark plug. The technology is not related to abnormality in the secondary current.

Furthermore, in the technology in PTL 3, combustion in the malfunctioning cylinder is not possible at all. Moreover, in the technology in PTL 4, the conduction path dedicated to malfunctions is required to be provided, and therefore, the technology may be disadvantageous in terms of cost. Thus, it is thought that application of the technologies in PTL 3 and 4 to malfunctions in the energy input circuit is not preferable.

An example of an object of the present invention is to provide a control apparatus that is capable of detecting an abnormality in an ignition apparatus with a simple configuration.

An example of an object of the present invention is to provide a means for determining an abnormality in a secondary current during operation of an energy input circuit, in an ignition apparatus for an internal combustion engine that includes an energy input circuit.

An example of an object of the present invention is to operate an engine while suppressing deterioration of fuel efficiency to the greatest possible extent when a malfunction occurs in an energy input circuit, in an ignition apparatus for an internal combustion engine that is capable of generating continued spark discharge by the energy input circuit after generation of a main ignition.

Solution to Problem

According to a first embodiment of the present disclosure, a control apparatus is provided. The control apparatus is a control apparatus that is capable of controlling ignition of an air-fuel mixture in a combustion chamber of an internal combustion engine by controlling an ignition apparatus that includes a spark plug, an ignition coil, an igniter unit, and an energy input unit. The control apparatus includes a control unit, a current detecting means, and an abnormality detecting means. Here, the spark plug is provided in the combustion chamber and is capable of igniting the air-fuel mixture in the combustion chamber by generating electric discharge. The ignition coil has a primary coil of which one end is connected to a power supply side and another end is connected to a ground side, and a secondary coil of which one end is connected to the spark plug. The igniter unit is provided to be capable of allowing or blocking a current flowing from the primary coil towards the ground side. The energy input unit is capable of inputting electrical energy to the ignition coil.

The control unit is capable of controlling the ignition of the air-fuel mixture in the combustion chamber. The control unit has a discharge control means and an energy input control means.

The discharge control means controls the igniter unit so that the flow of current from the primary coil towards the ground side is blocked, thereby generating a high voltage in the secondary coil, and controls the spark plug to so that the spark plug generates electric discharge. As a result, the spark plug can generate electric discharge and ignite the air-fuel mixture.

The energy input control means controls the energy input unit to input electrical energy to the ignition coil, after start of control of the spark plug by the discharge control means. As a result, the discharge state of the spark plug that occurs as a result of control by the discharge control means can be maintained. Consequently, ignitability of the air-fuel mixture can be improved.

A current detecting means is capable of detecting a current flowing through the secondary coil.

An abnormality detecting means detects an abnormality in the ignition apparatus based on a current value that is a value corresponding to the current detected by the current detecting means.

The abnormality detecting means detects an abnormality in the igniter unit or the ignition coil based on a first threshold that is a first threshold, and a first current value that is a value corresponding to a current detected by the current detecting means at a current time, when a first predetermined period that is a first predetermined period elapses from the start of control of the spark plug by the discharge control means.

In this configuration, the abnormality detecting means can detect an abnormality in the igniter unit or the ignition coil based on the current value detected after the start of control of the spark plug by the discharge control means and a threshold. Consequently, an abnormality in the ignition apparatus can be detected with a simple configuration.

Here, for example, the abnormality detecting means can detect an abnormality in the energy input unit based on a second threshold that is a second threshold, and a second current value that is a value corresponding to a current detected by the current detecting means at a current time, when a second predetermined period that is a second predetermined period that is longer than the first predetermined period elapses from the start of control of the spark plug by the discharge control means.

In this configuration, detection in which an abnormality in the igniter unit or the ignition coil and an abnormality in the energy input unit are differentiated can be performed by the abnormality detecting means, based on current values (first current value and second current value) detected with a time lag after the start of control of the spark plug by the discharge control means, and two thresholds (first threshold and second threshold). As a result, detection in which abnormalities in respective sections configuring the ignition apparatus are differentiated can be performed with a simple configuration. Therefore, operation of the internal combustion engine can be controlled based on the section in which the abnormality is detected.

According to a second embodiment of the present disclosure, an ignition apparatus for an internal combustion engine is provided. The ignition apparatus includes a main ignition circuit, an energy input circuit, a secondary current detecting means, and an abnormality determining means.

The main ignition circuit performs energization control of a primary coil of an ignition coil and makes a spark plug generate spark discharge. In addition, the energy input circuit performs energization control of the primary coil during the spark discharge started by operation of the main ignition circuit, continuously sends a secondary current of a same direction to a secondary coil of the ignition coil, and continues the spark discharge started by the operation of the main ignition circuit. Furthermore, the secondary current detecting means detects the secondary current.

In addition, the abnormality determining unit sets an allowable range for a detection value of the secondary current during operation of the energy input circuit, and determines whether or not the detection value of the secondary current has fallen outside of the allowable range.

As a result, the detection value of the secondary current falling outside of the allowable range can be detected. Consequently, an abnormality in the secondary current during operation of the energy input circuit can be determined. Furthermore, when an abnormality is detected, a user can be notified by an abnormality signal being outputted. As a result, further malfunctions can be prevented.

In this configuration, the abnormality determining unit may change the allowable range based on a command value of the secondary current. As a result, erroneous determination accompanying changes in the command value can be prevented.

According to a third embodiment of the present disclosure, an ignition apparatus for an internal combustion engine is provided. The ignition apparatus includes a main ignition circuit, an energy input circuit, a secondary current detecting means, a malfunction determining means, and an energy input stopping means.

The main ignition circuit is provided for each cylinder of the internal combustion engine, performs energization control of a primary coil of an ignition coil, and makes a spark plug generate spark discharge. In addition, the energy input circuit is provided for each cylinder of the internal combustion engine, performs energization control of the primary coil during the spark discharge started by operation of the man ignition circuit, continuously sends a secondary current of a same direction to a secondary coil of the ignition coil, and continues the spark discharge started by the operation of the main ignition circuit. The secondary current detecting means detects the secondary current.

Furthermore, the malfunction determining means determines whether or not a malfunction has occurred in the energy input circuit based on changes over time in the detection value of the secondary current during a period over which the energy input circuit is performing energization control of the primary coil. In addition, the energy input stopping means stops operation of the energy input circuit of a cylinder determined by the malfunction determining means to be malfunctioning.

As a result, at least the main ignition can be generated in a cylinder in which the energy input circuit has malfunctioned. In addition, continued spark discharge can be maintained in a cylinder in which the energy input circuit has not malfunctioned. Lean burn becomes possible as a result of the continued spark discharge being maintained. Consequently, when a malfunction occurs in the energy input circuit, the engine can be operated while suppressing deterioration of fuel efficiency to the greatest possible extent.

BRIEF DESCRIPTION OF DRAWINGS

FIG. 9 illustrates diagrams for explaining an operation example of a control apparatus and an ignition apparatus according to a second embodiment of the present invention, with (A) showing a diagram before a target current value and a second threshold are changed, with (B) is a diagram after the target current value and the second threshold are changed;

FIG. 12 illustrates diagrams, with (a) showing a time chart of a first aspect serving as one of the patterns in which a detection value of a secondary current falls outside of an allowable range, with (b) showing a time chart of a second aspect, and with (c) showing a time chart of a third aspect;

FIG. 19 illustrates diagrams, with (a) showing a time chart of a secondary current in a normal state, with (b) showing a time chart of the secondary current during a continued spark discharge abnormality, and with (c) showing a time chart of the secondary current during a main ignition abnormality;

DESCRIPTION OF EMBODIMENTS

A control apparatus and an ignition apparatus according to a plurality of embodiments of the present invention will hereinafter be described with reference to the drawings. Constituent sections that are essentially identical among the plurality of embodiments are given the same reference number. Descriptions thereof are omitted.

First Embodiment

Figure 1:
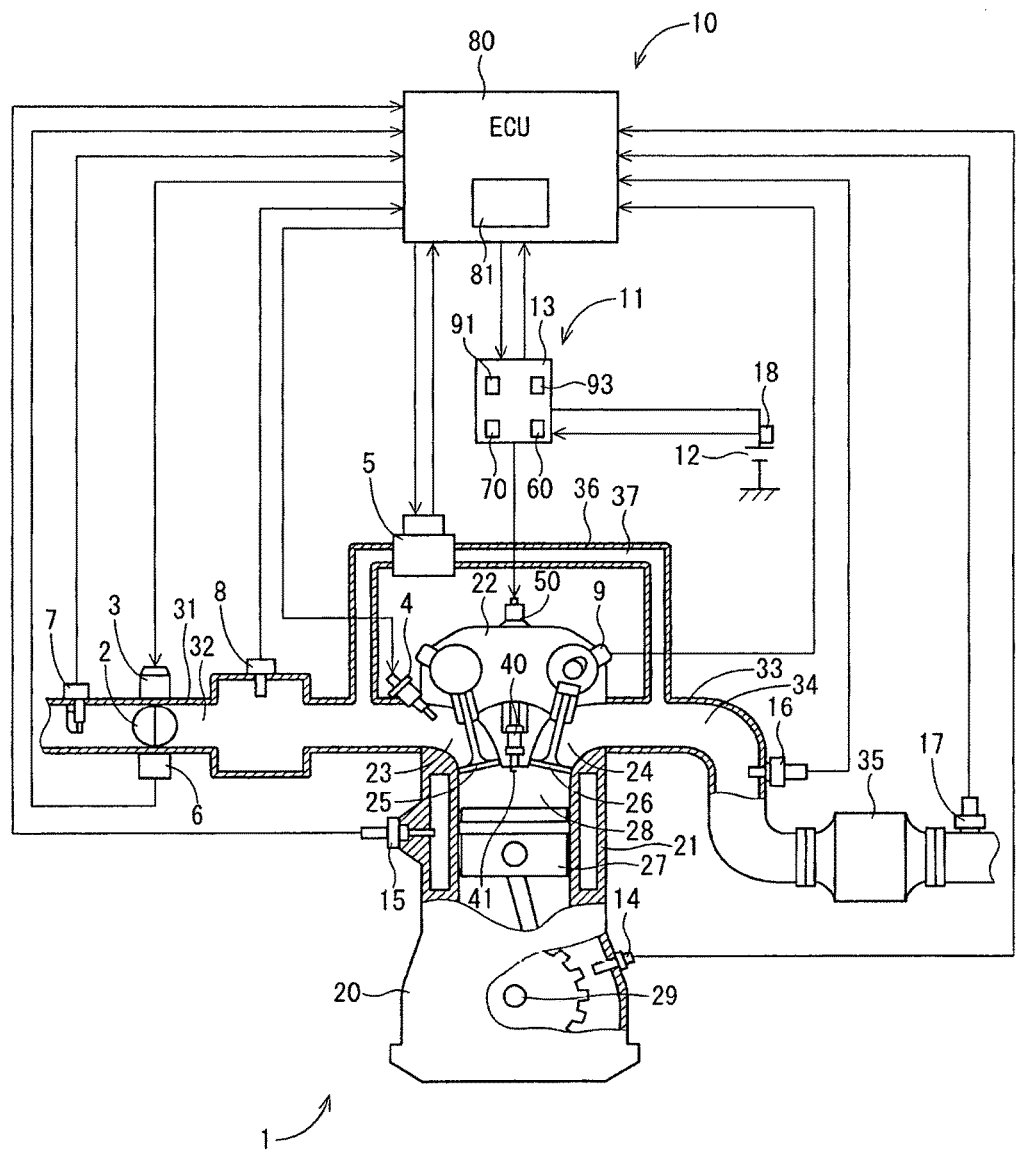
FIG. 1 is a diagram of a control apparatus according to a first embodiment of the present invention and an engine system to which the control apparatus is applied.
Figure 2:
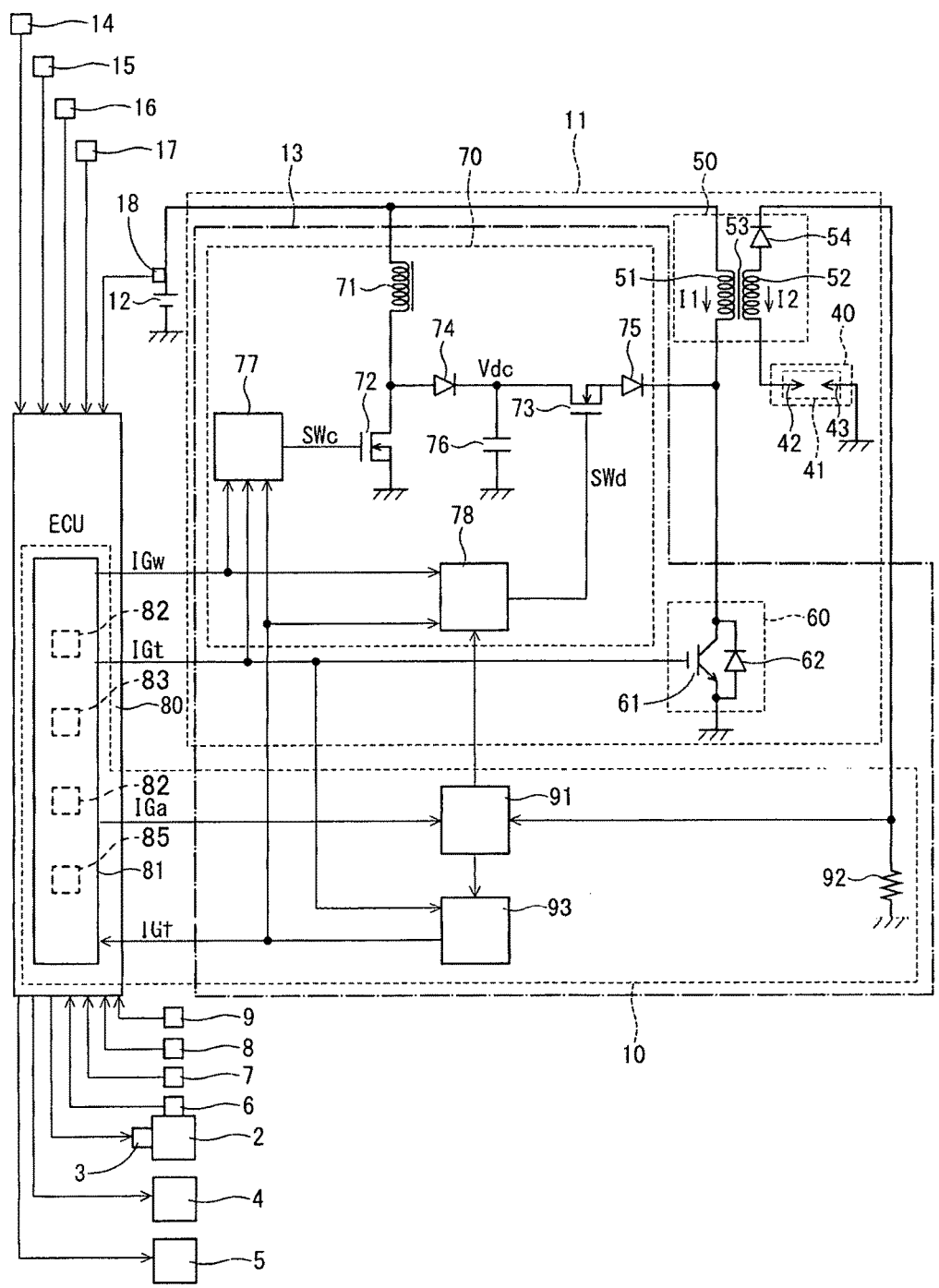
FIG. 2 is a diagram of a circuit configuration of the control apparatus according to the first embodiment.

A first embodiment of the present invention will be described with reference to FIGS. 1 to 8. A control apparatus according to the first embodiment is shown in FIGS. 1 and 2. A control apparatus 10 is applied to an engine system 1 and is capable of controlling each section configuring the engine system 1.

The engine system 1 includes an engine 20, an ignition apparatus 11, and the like. The engine 20 serves as an internal combustion engine.

For example, the engine 20 is a pre-mixed combustion-type, four-cylinder engine that is driven using gasoline as fuel. The engine 20 includes a cylinder 21, an engine head 22, an intake valve 25, an exhaust valve 26, a piston 27, a crank shaft 29, and the like.

The cylinder 21 is formed into a cylindrical shape. According to the present embodiment, four cylinders 21 are formed in the engine 20. The engine head 22 is provided so as to seal one end of the cylinder 21. An intake port 23 and an exhaust port 24 that communicate with an interior space of the cylinder 21 are formed in the engine head 22.

The intake valve 25 is provided so as to be capable of opening and closing between the intake port 23 and the interior space of the cylinder 21. The exhaust valve 26 is provided so as to be capable of opening and closing between the exhaust port 24 and the interior space of the cylinder 21.

The piston 27 is provided so as to be capable of reciprocal movement in an axial direction inside the cylinder 21. A combustion chamber 28 is formed by the inner wall of the cylinder 21, the engine head 22, and the piston 27. When a gas composed of a mixture of fuel and air, that is, an air-fuel mixture combusts in the combustion chamber 28, the volume in the combustion chamber 28 increases, and the piston 27 moves towards a side opposite the engine head 22. When the air-fuel mixture combusts in the combustion chamber 28, combustion gas is generated.

The crank shaft 29 is provided so as to be capable of rotating as a result of the reciprocal movement of the piston 27. When the fuel combusts in the combustion chamber 28 and the piston 27 reciprocally moves inside the cylinder 21, the crank shaft 29 rotates, and torque is outputted from the crank shaft 29. The torque outputted from the crank shaft 29 is transmitted to a wheel of a vehicle (not shown). The vehicle travels as a result.

An intake pipe 31 is connected to the intake port 23 of the engine head 22. An intake passage 32 is formed inside the intake pipe 31. One end of the intake passage 32 is open to the atmosphere and the other end is connected to the intake port 23. As a result, the atmosphere (air) is supplied to the combustion chamber 28, via the intake passage 32 and the intake port 23. Hereafter, the air supplied from the atmosphere side to the combustion chamber 28 of the engine 20 is referred to as intake air, as appropriate.

A throttle valve 2 is provided in the intake passage 32. The throttle valve 2 is capable of opening and closing the intake passage 32 by being rotatably driven by an actuator 3. That is, the throttle valve 2 is capable of changing the amount of intake air supplied to the combustion chamber 28 by opening and closing the intake passage 32.

A fuel injection valve 4 is provided in the intake pipe 31, near the engine head 22. The fuel injection valve 4 is capable of injecting fuel into the intake port 23. As a result, the air-fuel mixture of fuel and intake air (air) is supplied to the combustion chamber 28. The fuel injection valve 4 is capable of changing the amount of fuel to be injected by opening and closing of a spray hole being controlled. That is, the fuel injection valve 4 is capable of changing the amount of fuel supplied to the combustion chamber 28.

An exhaust pipe 33 is connected to the exhaust port 24 of the engine head 22. An exhaust passage 34 is formed inside the exhaust pipe 33. One end of the exhaust passage 34 is connected to the exhaust port 24, and the other end is open to the atmosphere. As a result, air containing combustion gas generated in the combustion chamber 28 is discharged towards the atmosphere side, via the exhaust port 24 and the exhaust passage 34. Hereafter, the air containing the combustion gas that is discharged from the combustion chamber 28 of the engine 20 is referred to as exhaust gas, as appropriate. According to the present embodiment, a three-way catalyst 35 is provided in the exhaust passage 34. The three-way catalyst 35 cleans the exhaust gas discharged towards the atmosphere side by oxidizing or reducing hydrocarbons, carbon monoxide, and nitrogen oxides in the exhaust gas.

According to the present embodiment, the engine system 1 has an exhaust gas recirculation (EGR) pipe 36 that connects the intake pipe 31 and the exhaust pipe 33. An EGR passage 37 is formed inside the EGR pipe 36. The EGR passage 37 communicates between the exhaust passage 34 and the intake passage 32. As a result, the exhaust gas in the exhaust passage 34 can be recirculated to the intake passage 32, via the EGR passage 37.

An EGR valve apparatus 5 is provided in the EGR pipe 36. The EGR valve apparatus 5 is capable of opening and closing the EGR passage 37 with an EGR valve (not shown). That is, the EGR valve apparatus 5 is capable of changing the amount of exhaust gas recirculated from the exhaust passage 34 to the intake passage 32 by opening and closing the EGR passage 37.

Here, the EGR pipe 36 and the EGR valve apparatus 5 configure an exhaust gas recirculation (EGR) system that re-supplies the combustion chamber 28 with the exhaust gas discharged from the combustion chamber 28 of the engine 20, together with the intake air. As a result of the exhaust gas being re-supplied to the combustion chamber 28 together with the intake air, reduction of nitrogen oxides in the exhaust gas discharged into the atmosphere, improvement in fuel efficiency, and the like can be achieved.

The ignition apparatus 11 is provided to ignite the air-fuel mixture introduced into the combustion chamber 28. As shown in FIG. 2, the ignition apparatus 11 includes a spark plug 40, an ignition coil 50, an igniter unit 60, an energy input unit 70, and the like.

Four spark plugs 40 are provided to respectively correspond to the four cylinders 21. The spark plug 40 has a discharging portion 41. The discharging portion 41 has a center electrode 42 and a ground electrode 43. The center electrode 42 and the ground electrode 43 form a predetermined gap therebetween. The spark plug 40 is provided in the engine head 22 such that the discharging portion 41 is exposed in the combustion chamber 28 (see FIG. 1). The ground electrode 43 is electrically connected to the engine head 22. That is, the ground electrode 43 is grounded. The spark plug 40 is capable of igniting the air-fuel mixture in the combustion chamber 28 by generating electric discharge between the center electrode 42 and the ground electrode 43 of the discharging portion 41 by a voltage that is applied.

Four ignition coils 50 are provided to respectively correspond to the four spark plugs 40 (cylinders 21). The ignition coil 50 is provided in the engine head 22 such that one end of the ignition coil 50 is connected to the spark plug 40 on the side opposite the discharging portion 41 (see FIG. 1). The ignition coil 50 has a primary coil 51, a secondary coil 52, a core 53, and a diode 54 (see FIG. 2).

For example, the primary coil 51 is formed by a copper wire being wound around the core 53, a predetermined number of times. One end of the primary coil 51 is connected to a positive terminal of a power supply 12. The power supply 12 is a low-voltage battery that is capable of outputting a voltage of about 10 to 19 volts from the positive terminal. A negative terminal is grounded (body earth). The other end of the primary coil 51 is the side that is grounded.

For example, the secondary coil 52 is formed by a copper wire being wound around the core 53, a predetermined number of times. One end of the secondary coil 52 is connected to the center electrode 42 of the spark plug 40, and the other end is grounded. Here, the number of times the secondary coil 52 is wound is set to be greater than that of the primary coil 51.

The core 35 is composed of a material having a magnetic permeability of a predetermined value or greater, such as iron.

The diode 54 is provided on the side of the secondary coil 52 opposite the spark plug 40. The diode 54 is provided such that an anode side is connected to the secondary coil 52 and a cathode side is connected to the ground side. As a result, a flow of current from the secondary coil 52 towards the ground side, via the diode 54, is allowed. A flow of current from the ground side towards the secondary coil 52 side, via the diode 54, is blocked.

Four igniter units 60 are provided to respectively correspond to the four ignition coils 50 (cylinders 21). The igniter unit 60 is provided on the side of the primary coil 51 of the ignition coil 50 opposite the power supply 12 (see FIG. 2). The igniter unit 60 has a switching element 61 and a diode 62.

According to the present embodiment, for example, the switching element 61 is an insulated gate bipolar transistor (IGBT). The switching element 61 is provided such that a collector is connected to the primary coil 51 and an emitter is grounded. The switching element 61 performs a switching operation to be set to an ON state or an OFF state, based on a signal inputted to a gate. In the ON state, the switching element 61 allows a flow of current from the primary coil 51 towards the ground side, via the switching element 61. In the OFF state, the switching element 61 blocks the flow of current from the primary coil 51 towards the ground side, via the switching element 61.

An anode side of the diode 62 is connected to the emitter of the switching element 61, or in other words, grounded. A cathode side of the diode 62 is connected to the collector of the switching element 61, or in other words, connected to the primary coil 51. As a result, a flow of current from the ground side towards the primary coil 51 side, via the diode 62, is allowed. A flow of current from the primary coil 51 side towards the ground side, via the diode 62, is blocked.

When the switching element 61 of the igniter unit 60 is in the ON state, the current from the power supply 12 flows towards the ground side, via the primary coil 51 of the ignition coil 50 and the switching element 61. At this time, the core 53 is magnetized and accumulates magnetic energy. A magnetic field is formed around the core 53. When the switching element 61 is set to the OFF state while the current is flowing through the primary coil 51, the flow of current from the primary coil 51 towards the ground side is blocked. The magnetic field around the core 53 changes, and a voltage of about several hundred volts is generated in the primary coil 51 as a result of self-induction. At this time, a high voltage of about several tens of kilovolts is also generated in the secondary coil 52 that shares a magnetic circuit and magnetic flux. At this time, the voltage generated in the secondary coil 52 is of a magnitude proportional to the numbers of turns of the primary coil 51 and the secondary coil 52. When a high voltage is generated in the secondary coil 52, a potential difference between the center electrode 42 and the ground electrode 43 of the spark plug 40 becomes a predetermined value or more. As a result, insulation breakdown occurs between the center electrode 42 and the ground electrode 43. The spark plug 40 generates electric discharge between the center electrode 42 and the ground electrode 43.

Hereafter, the current flowing to the primary coil 51 is referred to as a primary current I1, the current flowing to the secondary coil 52 is referred to as a secondary current I2, and the voltage of the second coil 52 is referred to as a secondary voltage V2, as appropriate. In addition, a direction from the power supply 12 side towards the igniter unit 60 side is a positive direction of the primary current I1, and a direction from the diode 54 side towards the spark plug 40 side is a positive direction of the secondary current I2. Furthermore, the secondary voltage V2 when the positive-direction secondary current I2 flows to the secondary coil 52 is a positive voltage.

According to the present embodiment, when the spark plug 40 generates electric discharge, the secondary voltage V2 is a negative voltage. A negative-direction secondary current I2 flows to the secondary coil 52.

According to the present embodiment, a single energy input unit 70 is provided for the four ignition coils 50. The energy input unit 70 is provided in parallel to the primary coil 51 between the power supply 12 and the igniter unit 60 (see FIG. 2). The energy input unit 70 has a coil 71, switching elements 72 and 73, diodes 74 and 75, a capacitor 76, and driver circuits 77 and 78.

For example, the coil 71 is formed by a copper wire being wound a predetermined number of times. The coil 71 is provided such that one end is connected between the power supply 12 and the primary coil 51.

According to the present embodiment, the switching elements 72 and 73 are metal-oxide-semiconductor field-effect transistors (MOSFETs), which are a type of field-effect transistors. The switching element 72 is provided such that the drain is connected to the other end of the coil 71, and the source is grounded. The switching element 73 is provided such that the drain is connected to the capacitor 76, and the source is connected between the primary coil 51 of the ignition coil 50 and the igniter unit 60, with the diode 75 therebetween. According to the present embodiment, four switching elements 73 are provided to respectively correspond to the four ignition coils 50 (cylinders 21). However, the present invention is not limited thereto.

The switching elements 72 and 73 each perform a switching operation so as to be set to an ON state or an OFF state, based on a signal inputted to a gate. In the ON state, the switching element 72 allows a flow of current from the coil 71 towards the ground side, via the switching element 72. In the OFF state, the switching element 72 blocks the flow of current from the coil 71 towards the ground side, via the switching element 72. In the ON state, the switching element 73 allows a flow of current from the capacitor 76 towards the primary coil 51 and igniter unit 60 side, via the switching element 73. In the OFF state, the switching element 73 blocks the flow of current from the capacitor 76 towards the primary coil 51 and igniter unit 60 side via the switching element 73.

The diode 74 is provided such that the anode side is connected between the coil 71 and the switching 72, and the cathode side is connected to the capacitor 76. As a result, a flow of current from the coil 71 and switching element 72 side towards the capacitor 76, via the diode 74, is allowed. A flow of current from the capacitor 76 towards the coil 71 and switching element 72 side, via the diode 74, is blocked.

The diode 75 is provided such that an anode side is connected to a source of the switching element 73 and a cathode side is connected between the primary coil 51 and the igniter unit 60. As a result, a flow of current from the switching element 73 side towards the primary coil 51 and igniter unit 60 side, via the diode 75, is allowed. A flow of current from the primary coil 51 and igniter unit 60 side towards the switching element 73 side, via the diode 75, is blocked. According to the present embodiment, four diodes 75 are provided to respectively correspond to the four switching elements 73.

The driver circuit 77 generates a switching signal SWc related to the switching operation of the switching element 72, based on an inputted signal. The driver circuit 77 then outputs the generated switching signal SWc to the gate of the switching element 72. Here, the switching signal SWc is a signal indicating OFF (Lo) or ON (Hi). When the switching signal SWc is OFF, the switching element 72 is set to the OFF state. When the switching signal SWc is ON, the switching element 72 is set to the ON state. In this way, the switching element 72 performs the switching operation based on the switching signal SWc inputted from the driver circuit 77.

The driver circuit 78 generates a switching signal SWd related to the switching operation of the switching element 73, based on an inputted signal. The driver circuit 78 then outputs the generated switching signal SWd to the gate of the switching element 73. Here, the switching signal SWd is a signal indicating OFF (Lo) or ON (Hi). When the switching signal SWd is OFF, the switching element 73 is set to the OFF state. When the switching signal SWd is ON, the switching element 73 is set to the ON state. In this way, the switching element 73 performs the switching operation based on the switching signal SWd inputted from the driver circuit 78. According to the present embodiment, four driver circuits 78 are provided to respectively correspond to the four switching elements 73.

When the switching element 73 is in the OFF state and the switching element 72 is in the ON state, the current from the power supply 12 flows towards the ground side, via the coil 71 and the switching element 72. At this time, magnetic energy is stored in the coil 71. When the switching element 72 is set to the OFF state while the current is flowing through the coil 71, the flow of current from the coil 71 towards the ground side is blocked. As a result, electrical energy is discharged from the coil 71. The electrical energy is supplied to the capacitor 76 via the diode 74.

Therefore, when the switching element 72 performs a switching operation so as to repeatedly alternate between the ON state and the OFF state while the switching element 73 is in the OFF state, the electrical energy is gradually accumulated in the capacitor 76 from the coil 71. At this time, a voltage Vdc on one end side of the capacitor 76 gradually increases. When the switching element 73 is set to the ON state in a state in which the electrical energy is accumulated in the capacitor 76 and the switching element 61 of the igniter unit 60 is in the OFF state, the electrical energy of the capacitor 76 is supplied (inputted) to the primary coil 51 of the corresponding ignition coil 50, via the switching element 73 and the diode 75.

In this way, the energy input unit 70 is capable of accumulating electrical energy from the power supply 12 in the capacitor 76, and inputting the electrical energy to the ignition coil 50. According to the present embodiment, the energy input unit 70 inputs electrical energy to the ignition coil 50 such that the polarity is the same as that of the secondary current I2 flowing to the secondary coil 52 when the spark plug 40 generates electric discharge, that is, such that the negative-direction secondary current I2 is superimposed.

According to the present embodiment, the above-described igniter unit 60 and energy input unit 70 are housed in a housing of an ignition circuit unit 13 (see FIG. 2).

As shown in FIG. 2, the control apparatus 10 includes a control unit 81, a current detection circuit (corresponding to a current detecting means) 91, an abnormality detecting unit 93 (corresponding to an abnormality detecting means), and the like.

According to the present embodiment, the control unit 81 is housed in a housing of an electronic control unit (referred to, hereafter, as an "ECU") 80.

For example, the control unit 81 is a microcomputer. The control unit 81 has a central processing unit (CPU) that serves as a calculating means, a read-only memory (ROM) and a random access memory (RAM) that serve as a storage means, a timer that serves as a time measuring means, an input/output (I/O) that serves as an input/output means, and the like. The control unit 81 is capable of integrally controlling the vehicle by performing calculations based on a program stored in the ROM, based on signals from sensors provided in each section of the vehicle and the like, and controlling operation of apparatuses and equipment in each section of the vehicle.

As shown in FIG. 1, according to the present embodiment, a throttle position sensor 6 is provided near the throttle valve 2 of the intake pipe 31. The throttle position sensor 6 detects the degree of opening of the throttle valve 2 on the intake passage 32, and outputs a signal correlated to the detected degree of opening to the control unit 81. As a result, the control unit 81 can detect the degree of opening of the throttle valve 2.

In addition, an airflow meter 7 is provided on the side of the throttle valve 2 in the intake pipe 31 opposite the engine 20. The airflow meter 7 detects the amount of intake air flowing through the intake passage 32, that is, the amount of intake air supplied to the combustion chamber 28 of the engine 20. The airflow meter 7 then outputs a signal correlated to the detected amount of intake air to the control unit 81. As a result, the control unit 81 can detect the amount of intake air supplied to the combustion chamber 28.

In addition, an intake pressure sensor 8 is provided in a surge tank between the throttle valve 2 in the intake pipe 31 and the engine 20. The intake pressure sensor 8 detects the pressure (intake pressure) of the intake air flowing through the intake passage 32, and outputs a signal correlated to the detected pressure to the control unit 81. As a result, the control unit 81 can detect the intake pressure.

In addition, a cam position sensor 9 is provided near a cam shaft of the engine head 22. The cam position sensor 9 detects a rotation position of the cam shaft that drives the discharge valve 26 or the intake valve 25 so as to open and close. The cam position sensor 9 then outputs a signal correlated to the detected rotation position to the control unit 81. As a result, the control unit 81 can detect the rotation position of the cam shaft. Consequently, the control unit 81 can perform calculation of a cam angle, cylinder differentiation, and the like.

In addition, the engine 20 is provided with a crank position sensor 14 near the crank shaft 29. The crank position sensor 14 detects a rotation position of the crank shaft 29 and outputs a signal correlated to the detected rotation position to the control unit 81. As a result, the control unit 81 can detect the rotation position of the crank shaft 29. Consequently, the control unit 81 can perform calculation of a crank angle, calculation of a rotation speed of the crank shaft 29, that is, the rotation speed of the engine 20, and the like.

In addition, in the engine 20, a water temperature sensor 15 is provided in the cylinder 21. The water temperature sensor 15 detects the temperature (water temperature) of a coolant that cools the cylinder 21, and outputs a signal correlated to the detected temperature to the control unit 81. As a result, the control unit 81 can detect the temperature of the coolant.

In addition, an air/fuel (A/F) sensor 16 is provided in the exhaust pipe 33 between the engine 20 and the three-way catalyst 35. The A/F sensor 16 detects the air-fuel ratio inside the engine 20, based on the oxygen concentration and the unburnt gas concentration in the exhaust gas flowing through the exhaust passage 34. The A/F sensor 16 then outputs a signal correlated to the detected air-fuel ratio to the control unit 81. As a result, the control unit 81 can detect the air-fuel ratio inside the engine 20.

In addition, an O2 sensor 17 is provided on the side of the three-way catalyst 35 in the exhaust pipe 33 opposite the engine 20. The O2 sensor 17 detects whether the air-fuel ratio inside the engine 20 is in a rich (rich) state or a lean (lean) state in relation to a theoretical air-fuel ratio (stoichiometry), based on electromotive force generated due to the difference between the oxygen concentration in the atmosphere and the oxygen concentration in the exhaust gas flowing through the exhaust passage 34. The O2 sensor 17 then outputs a signal (rich signal or lean signal) corresponding to the detected state to the control unit 81. As a result, the control unit 81 can detect whether the air-fuel ratio inside the engine 20 is in a rich state or a lean state in relation to the theoretical air-fuel ratio.

In addition, a voltage sensor 18 is provided in the power supply 12. The voltage sensor 18 detects the voltage of the power supply 12 and outputs a signal correlated to the detected voltage to the control unit 81. As a result, the control unit 81 is capable of detecting the voltage of the power supply 12.

The EGR valve apparatus 5 outputs a signal correlated to the degree of opening of the EGR valve in the EGR passage 37, to the control unit 81. As a result, the control unit 81 is capable of detecting the degree of opening of the EGR valve.

The control unit 81 can control the operation of the engine 20 by controlling the operations of the ignition apparatus 11 including the spark plug 40 and the ignition coil 50, the actuator 3 of the throttle valve 2, the fuel injection valve 4, the EGR valve apparatus 5, and the like, based on the signals from the various sensors described above.

According to the present embodiment, the current detection circuit 91 is housed in the housing of the ignition circuit unit 13 (see FIG. 2). The ignition circuit unit 13 is provided with a resistor 92. The resistor 92 is provided such that one end is connected to the cathode side of the diode 54 of the ignition coil 50 and the other end is grounded. The current detection circuit 91 is provided so as to be connected between the diode 54 and the resistor 92. As a result, the current detection circuit 91 is capable of detecting the current flowing from the diode 54 towards the ground side, that is, the secondary current I2 flowing through the secondary coil 52. Here, the current detection circuit 91 corresponds to a current detecting means.

According to the present embodiment, the abnormality detecting unit 93 is housed in the housing of the ignition circuit unit 13 (see FIG. 2). A current value corresponding to the secondary current I2 detected by the current detection circuit 91 is inputted to the abnormality detecting unit 93.

Next, control of the ignition apparatus 11 by the control unit 81 and ignition control of the air-fuel mixture in the combustion chamber 28 will be described.

The control unit 81 controls the igniter unit 60 so as to block the flow of current from the primary coil 51 towards the ground side, thereby generating a high voltage in the secondary coil 52. The control unit 81 thereby controls the spark plug 40 such that the spark plug 40 generates electric discharge. Specifically, the control unit 81 controls the spark plug 40 by outputting an ignition signal IGt to the gate of the switching element 61 of the igniter unit 60. Here, the ignition signal IGt is a signal indicating OFF (Lo) or ON (Hi). When the ignition signal IGt is OFF, the switching element 61 is set to the OFF state. The flow of current (primary current I1) from the primary coil 51 towards the ground side, via the switching element 61, is blocked. Meanwhile, when the ignition signal IGt is ON, the switching element 61 is set to the ON state. The flow of current from the primary coil 51 towards the ground side, via the switching element 61, is allowed.

When the ignition signal IGt changes from ON to OFF, the flow of the primary current I1 flowing through the primary coil 51 is blocked and a high voltage is generated in the secondary coil 52. As a result, the spark plug 40 generates electric discharge between the center electrode 42 and the ground electrode 43 of the discharging portion 41. As a result, the air-fuel mixture in the combustion chamber 28 is ignited (ignited).

In this way, the control unit 81 generates the ignition signal IGt and outputs the ignition signal IGt to the switching element 61 of the igniter unit 60. As a result, the control unit 81 is capable of controlling the spark plug 40 so as to generate electric discharge at a timing at which the ignition signal IGt falls from ON to OFF. According to the present embodiment, the control unit 81 has a discharge control unit 82 (corresponding to a discharge control mean) that performs the above-described control. The timing at which the ignition signal IGt falls from ON to OFF is the time at which control of the spark plug 40 by the discharge control unit 82 is started (start of a control period).

In addition, after the start of control of the spark plug 40 by the discharge control unit 82, the control unit 81 controls the energy input unit 70 to input electrical energy to the ignition coil 50. Specifically, the control unit 81 controls the energy input unit 70 by controlling the switching element 73 by outputting an energy input period signal IGw to the driver circuit 78. Here, the energy input period signal IGw is a signal indicating OFF (Lo) or ON (Hi). The energy input period signal IGw is generated so as to rise from OFF to ON after the ignition signal IGt has fallen from ON to OFF, that is, after the start of control of the spark plug 40 by the discharge control unit 82.

The driver circuit 78 outputs the switching signal SWd to the gate of the switching element 73 during the period over which the energy input period signal IGw is ON. As a result, during the period over which the energy input period signal IGw is ON, the switching element 73 performs a switching operation so as to be in the ON state or the OFF state.

When the switching element 73 is in the ON state, the electrical energy accumulated in the capacitor 76 is inputted to the ground side of the primary coil 51 of the ignition coil 50, via the switching element 73 and the diode 75. According to the present embodiment, the control unit 81 has an energy input control unit 83 (corresponding to an energy input control means) that performs the above-described control.

When the energy input control unit 83 controls the energy input unit 70 and the electrical energy is inputted to the ground side of the primary coil 51 of the ignition coil 50, induced current (secondary current I2) is generated in the secondary coil 52 of the ignition coil 50. The induced current corresponds to electrical energy enabling the discharge state of the spark plug 40 generated by control performed by the discharge control unit 82 to be maintained. That is, the energy input unit 70 can also be considered to input electrical energy to the spark plug 40.

According to the present embodiment, the input of electrical energy from the capacitor 76 is blocked after the switching element 73 that is in the ON state changes to the OFF state. However, for a predetermined period, the primary current I1 is not blocked and the secondary current I2 is also not blocked because current flows from the ground side, via the diode 62, as a result of inductance of the primary coil 51. Therefore, at this time (until the predetermined period elapses after the switching element 73 that is in the ON state changes to the OFF state), the discharge state of the spark plug 40 can be maintained.

According to the present embodiment, the energy input control unit 83 gives feedback of a value of the secondary current I2 detected by the current detection circuit 91. As a result, the energy input control unit 83 controls the energy input unit 70 by, for example, controlling a duty ratio of the switching signal SWd (a ratio of the ON period in relation to the switching cycle) so that a current corresponding to a target current value IGa flows through the secondary coil 52. The target current value IGa is a predetermined current value. Consequently, the secondary current I2 substantially corresponding to the target current value IGa flows through the secondary coil 52 during the period over which the energy input unit 70 inputs electrical energy to the ignition coil 50.

The control unit 81 accumulates electrical energy in the capacitor 76 by controlling the switching element 72 via the driver circuit 77 before the energy input control unit 83 inputs electrical energy to the ignition coil 50. Specifically, the driver circuit 77 outputs the switching signal SWc to the gate of the switching element 72 before the energy input period signal IGw is set to ON, such as during the period over which the ignition signal IGt is ON. Consequently, the switching element 72 performs the switching operation so as to be set to the ON state or the OFF state during the period over which the ignition signal IGt is ON, for example. As a result, electrical energy is accumulated in the capacitor 76.

According to the present embodiment, the control unit 81 has a normal ignition control unit 84 (corresponding to a normal ignition control means) that controls ignition of the air-fuel mixture in the combustion chamber 28 only through control of the spark plug 40 by the discharge control unit 82. In ignition control of the air-fuel mixture by the normal ignition control unit 84, the input of electrical energy to the ignition coil 50 by the energy input unit 70 is not performed. Consequently, electric discharge by the spark plug 40 is completed in a relatively short amount of time. Therefore, ignition control of the air-fuel mixture by the normal ignition control unit 84 is suitable for when the air-fuel mixture in the combustion chamber 28 is in an easily ignitable (ignitable) state.

In addition, the control unit 81 has a specific ignition control unit 85 (corresponding to a specific ignition control means) that controls ignition of the air-fuel mixture in the combustion chamber 28 through control of the spark plug 40 by the discharge control unit 82 and control of the energy input unit 70 by the energy input control unit 83. In ignition control of the air-fuel mixture by the specific ignition control unit 85, the input of electrical energy to the ignition coil 50 by the energy input unit 70 is performed. Consequently, electric discharge by the spark plug 40 continues over a relatively long amount of time. Therefore, ignition control of the air-fuel mixture by the specific ignition control unit 85 is suitable for when the air-fuel mixture in the combustion chamber 28 is in a difficult-to-ignite (ignite) state.

The control unit 81 determines the ignitability of the air-fuel mixture in the combustion chamber 28 based on the operating state of the engine 20, environmental conditions, and the like. The control unit 81 can switch between ignition control of the air-fuel mixture by the normal ignition control unit 84 and ignition control of the air-fuel mixture by the specific ignition control unit 85 based on the determination result.

Next, abnormality detection of the igniter unit 60, the ignition coil 50 or the energy input unit 70 by the control unit 81 and the abnormality detecting unit 93 will be described.

The control unit 81 (abnormality detecting unit 93) is capable of detecting an abnormality in the igniter unit 60 or the ignition coil 50 based on a first threshold Th1 and a first current value Id1, when a first predetermined period Tp1 elapses after the start of control of the spark plug 40 by the discharge control unit 82. The first threshold Th1 is a first threshold. The first current value Id1 is a value corresponding to the current (secondary current I2) detected by the current detection circuit 91 at this time. The first predetermined period Tp1 is a first predetermined period.

Specifically, when an absolute value of the first current value Id1 inputted from the current detection circuit 91 is less than the first threshold Th1, the abnormality detecting unit 93 outputs an abnormality-detected signal IGf to the control unit 81. The abnormality-detected signal IGf indicates that an abnormality has occurred in the igniter unit 60 or the ignition coil 50. In this case, the control unit 81 detects an abnormality in the igniter unit 60 or the ignition coil 50.

In addition, the control unit 81 (abnormality detecting unit 93) is capable of detecting an abnormality in the energy input unit 70 based on a second threshold Th2 and a second current value Id2, when a second predetermined period Tp2 elapses after the start of control of the spark plug 40 by the discharge control unit 82. The second threshold Th2 is a second threshold. The second current value Id2 that is a value corresponding to the current (secondary current I2) detected by the current detection circuit 91 at this time. The second predetermined period Tp2 is a second predetermined period that is longer than the first predetermined period Tp1. Specifically, when an absolute value of the second current value Id2 inputted from the current detection circuit 91 is less than the second threshold Th2, the abnormality detecting unit 93 outputs an abnormality-detected signal IGf to the control unit 81. The abnormality-detected signal IGf indicates that an abnormality has occurred in the energy input unit 70. In this case, the control unit 81 detects an abnormality in the energy input unit 70.

Here, the control unit 81 and the abnormality detecting unit 93 correspond to the abnormality detecting means.

According to the present embodiment, the second threshold Th2 is set to be greater than the first threshold Th1 and less than the target current value IGa.

Next, ignition control of the air-fuel mixture in the combustion chamber 28 by the control unit 81 will be described with reference to FIGS. 3 to 5.

Figure 3:
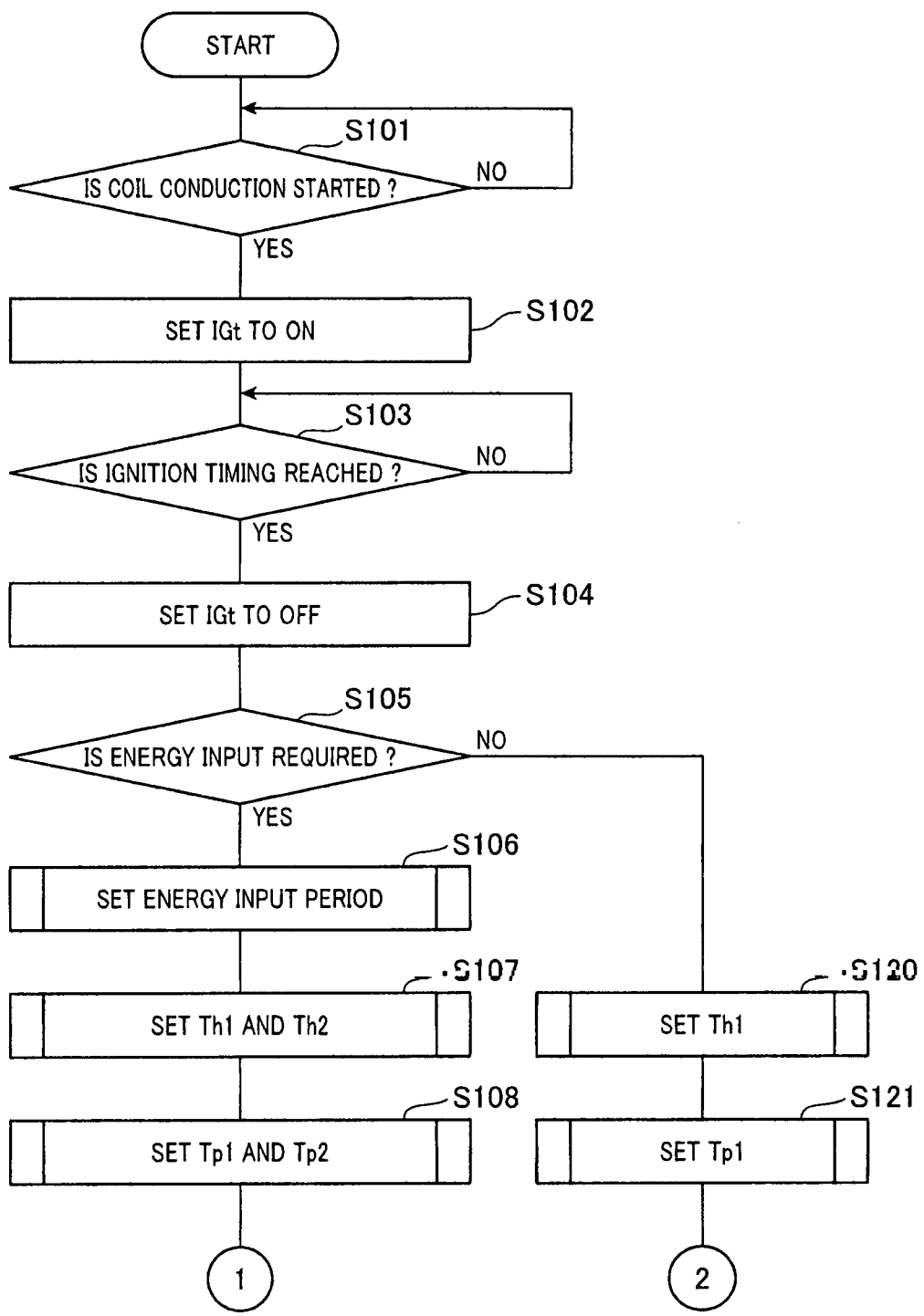
FIG. 3 is a flowchart of a part of a process related to ignition control of an air-fuel mixture and abnormality detection by the control apparatus according to the first embodiment.
Figure 4:
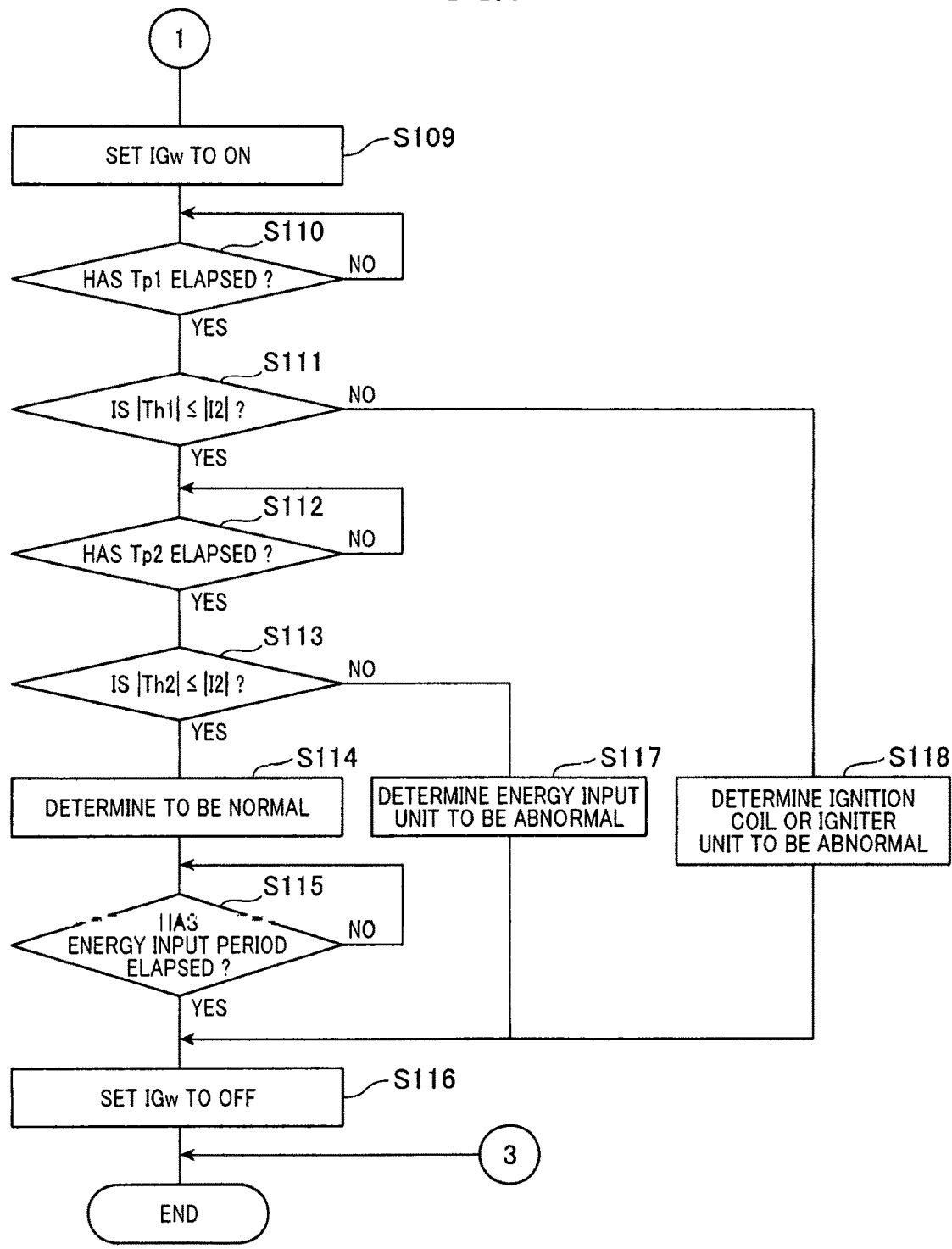
FIG. 4 is a flowchart of a part of a process related to ignition control of an air-fuel mixture and abnormality detection by the control apparatus according to the first embodiment.
Figure 5:
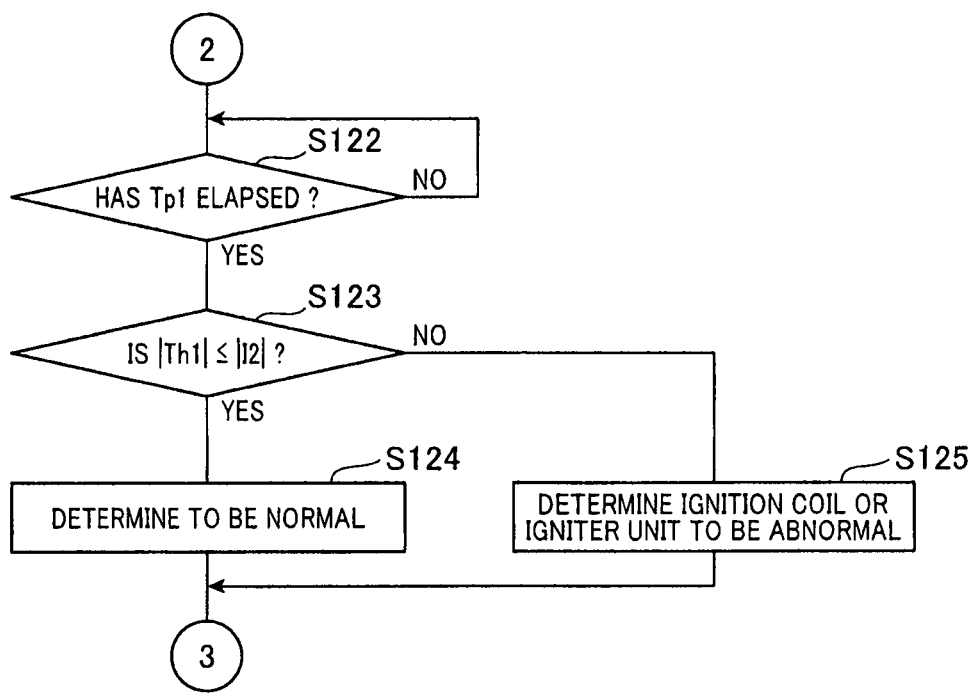
FIG. 5 is a flowchart of a part of the process related to ignition control of an air-fuel mixture and abnormality detection by the control apparatus according to the first embodiment.

The control unit 81 performs ignition control of the air-fuel mixture in the combustion chamber 28 by performing a series of processing steps S100, shown in FIG. 3 to FIG. 5. In addition, as a result of performing the series of processing steps S100, the control unit 81 is capable of detecting an abnormality in the igniter unit 60, the ignition coil 50, or the energy input unit 70 by the abnormality detecting unit 93, while performing ignition control of the air-fuel mixture in the combustion chamber 28. The series of processes S100 is started when, for example, an ignition key of the vehicle is turned ON.

As shown in FIG. 3, at step S101, the control unit 81 determines whether or not to start current conduction to the primary coil 51 of the ignition coil 50. As a result, when determined that current conduction to the primary coil 51 of the ignition coil 50 should be started (YES at step S101), the process proceeds to step S102. Meanwhile, when determined that current conduction to the primary coil 51 should not be started (NO at step S101), the process returns to step S101. That is, step S101 is a process that is repeated until the determination is made that current conduction to the primary coil 51 should be started.

At step S102, the control unit 81 sets the ignition signal IGt to be outputted to the switching element 61 of the igniter unit 60 to ON. As a result, the switching element 61 is set to the ON state and current conduction (primary current I1)

to the primary coil 51 of the ignition coil 50 is started. After step S102, the process proceeds to step S103.

At step S103, the control unit 81 determines whether or not the timing is such that the air-fuel mixture should be ignited. Specifically, the control unit 81 determines the timing at which the air-fuel mixture should be ignited by, for example, calculating the crank angle based on a signal from the crank position sensor 14. As a result, when determined that the timing is such that the air-fuel mixture should be ignited (YES at step S103), the process proceeds to step S104. Meanwhile, when determined that the timing is not such that the air-fuel mixture should be ignited (NO at step S103), the process returns to step S103. That is, step S103 is a process that is repeated until the determination is made that the timing is such that the air-fuel mixture should be ignited.

At step S104, the control unit 81 sets the ignition signal IGt to OFF. Consequently, the switching element 61 is set to the OFF state and the flow of current from the primary coil 51 towards the ground side is blocked. A high voltage is thereby generated in the secondary coil 52 and electric discharge by the spark plug 40 is started. That is, control of the spark plug 40 by the discharge control unit 82 is started. As a result, the air-fuel mixture is ignited (ignited), and combustion of the air-fuel mixture is started. After step S104, the process proceeds to step S105.

At step S105, the control unit 81 determines whether or not input of electrical energy to the ignition coil 50 by the energy input unit 70 is required. Specifically, the control unit 81 determines the ignitability of the air-fuel mixture in the combustion chamber 28 based on the operating state of the engine 20, environmental conditions, and the like. The control unit 81 then determines whether or not the input of electrical energy to the ignition coil 50 is required based on the determination result.

As a result, when determined that the input of electrical energy to the ignition coil 50 is required (YES at step S105), the process proceeds to step S106. In this case, the control unit 81 performs ignition control of the air-fuel mixture by the specific ignition control unit 85. Meanwhile, when determined that the input of electrical energy to the ignition coil 50 is not required (NO at step S105), the process proceeds to step S120. In this case, the control unit 81 performs ignition control of the air-fuel mixture by the normal ignition control unit 84.

At step S106, the control unit 81 sets an input period of the electrical energy to the ignition coil 50, that is, an energy input period. Specifically, the control unit 81 sets the period over which the energy input period signal IGw is ON (width of the ON state) based on the operating state of the engine 20, environmental conditions, and the like. After step S106, the process proceeds to step S107.

At step S107, the control unit 81 sets the first threshold Th1 and the second threshold Th2. Here, the control unit 81 sets the second threshold Th2 to a value greater than the first threshold Th1. After step S107, the process proceeds to step S108.

At step S108, the control unit 81 (abnormality detecting unit 93) sets the first predetermined period Tp1 and the second predetermined period Tp2. Here, the control unit 81 sets the second predetermined period Tp2 to a period longer than the first predetermined period Tp1. After step S108, the process proceeds to step S109.

As shown in FIG. 4, at step S109, the control unit 81 sets the energy input period signal IGw to ON. As a result, the switching element 73 performs a switching operation, and the input of electrical energy to the ignition coil 50 from the energy input unit 70 is started. That is, control of the energy input unit 70 by the energy input control unit 83 is started. As a result, the discharge state of the spark plug 40 that is generated as a result of control by the discharge control unit 82 is subsequently maintained. After step S109, the process proceeds to step S110.

At step S110, the control unit 81 (abnormality detecting unit 93) determines whether or not the first predetermined period Tp1 has elapsed from the start of control of the spark plug 40 by the discharge control unit 82, that is, from when step S104 is performed. As a result, when determined that the first predetermined period Tp1 has elapsed (YES at step S110), the process proceeds to S111. Meanwhile, when determined that the first predetermined period Tp1 has not elapsed (NO at step S110), the process returns to S110. That is, step S110 is a process (delay process) that is repeated until the determination is made that the first predetermined period Tp1 has elapsed from the start of control of the spark plug 40 by the discharge control unit 82.

At step S111, the abnormality detecting unit 93 determines whether or not the absolute value of a value corresponding to the current (secondary current I2) detected by the current detection circuit 91 at this time, that is, the first current value Id1 is an absolute value of the first threshold Th1 or greater. As a result, when determined that the absolute value of the first current value Id1 is the absolute value of the first threshold Th1 or greater (YES at step S111), the process proceeds to step S112. Meanwhile, when determined that the absolute value of the first current value Id1 is less than the absolute value of the first threshold Th1 (NO at step S111), the abnormality detecting unit 93 outputs the abnormality-detected signal IGf to the control unit 81. The abnormality-detected signal IGf indicates that an abnormality has occurred in the igniter unit 60 or the ignition coil 50. The process then proceeds to step S118.

At step S112, the control unit 81 (abnormality detecting unit 93) determines whether or not the second predetermined period Tp2 has elapsed from the start of control of the spark plug 40 by the discharge control unit 82, that is, from when step S104 is performed. As a result, when determined that the second predetermined period Tp2 has elapsed (YES at step S112), the process proceeds to S113. Meanwhile, when determined that the second predetermined period Tp2 has not elapsed (NO at step S112), the process returns to S112. That is, step S112 is a process (delay process) that is repeated until the determination is made that the second predetermined period Tp2 has elapsed from the start of control of the spark plug 40 by the discharge control unit 82.

At step S113, the abnormality detecting unit 93 determines whether or not the absolute value of a value corresponding to the current (secondary current I2) detected by the current detection circuit 91 at this time, that is, the second current value Id2 is an absolute value of the second threshold Th2 or greater. As a result, when determined that the absolute value of the second current value Id2 is the absolute value of the second threshold Th2 or greater (YES at step S113), the process proceeds to step S114. Meanwhile, when determined that the absolute value of the second current value Id2 is less than the absolute value of the second threshold Th2 (NO at step S113), the abnormality detecting unit 93 outputs the abnormality-detected signal IGf to the control unit 81. The abnormality-detected signal IGf indicates that an abnormality has occurred in the energy input unit 70. The process then proceeds to step S117.

At step S114, the control unit 81 determines that the igniter unit 60, the ignition coil 50, and the energy input unit 70 are all normal. After step S114, the process proceeds to step S115.

At step S115, the control unit 81 determines whether or not the energy input period set at step S106 has elapsed from the start of control of the energy input unit 70 by the energy input control unit 83, that is, from when the energy input period signal IGw is set to ON at step S109. As a result, when determined that the energy input period has elapsed (YES at step S115), the process proceeds to step S116. Meanwhile, when determined that the energy input period has not elapsed (NO at step S115), the process returns to step S115. That is, step S115 is a process (delay process) that is repeated until the determination is made that the energy input period has elapsed from the start of control of the energy input unit 70 by the energy input control unit 83.

At step S117, the control unit 81 determines that an abnormality has occurred in the energy input unit 70, that is, detects an abnormality in the energy input unit 70. After step S117, the process proceeds to step S116.

At step S118, the control unit 81 determines that an abnormality has occurred in the igniter unit 60 or the ignition coil 50, that is, detects an abnormality in the igniter unit 60 or the ignition coil 50. After step S117, the process proceeds to step S116.

At S116 that is performed after steps S115, S117, and S118, the control unit 81 sets the energy input period signal IGw to OFF. As a result, the switching operation of the switching element 73 is stopped. The input of electrical energy to the ignition coil 50 from the energy input unit 70 is stopped. That is, control of the energy input unit 70 by the energy input control unit 83 is stopped. After step S116, the process leaves the series of S100.

At step S120, the control unit 81 (abnormality detecting unit 93) sets the first threshold Th1. After step S120, the process proceeds to step S121.

At step S121, the control unit 81 (abnormality detecting unit 93) sets the first predetermined period Tp1. After step S121, the process proceeds to step S122.

As shown in FIG. 5, at step S122, the control unit 81 (abnormality detecting unit 93) determines whether or not the first predetermined period Tp1 has elapsed from the start of control of the spark plug 40 by the discharge control unit 82, that is, from when step S104 is performed. As a result, when determined that the first predetermined period Tp1 has elapsed (YES at step S122), the process proceeds to S123. Meanwhile, when determined that the first predetermined period Tp1 has not elapsed (NO at step S122), the process returns to S122. That is, step S122 is a process (delay process) that is repeated until the determination is made that the first predetermined period Tp1 has elapsed from the start of control of the spark plug 40 by the discharge control unit 82.

At step S123, the abnormality detecting unit 93 determines whether or not the absolute value of the value corresponding to the current (secondary current I2) detected by the current detection circuit 91 at this time, that is, the first current value Id1 is an absolute value of the first threshold Th1 or greater. As a result, when determined that the absolute value of the first current value Id1 is the absolute value of the first threshold Th1 or greater (YES at step S123), the process proceeds to step S124. Meanwhile, when determined that the absolute value of the first current value Id1 is less than the absolute value of the first threshold Th1 (NO at step S123), the abnormality detecting unit 93 outputs the abnormality-detected signal IGf to the control unit 81. The abnormality-detected signal IGf indicates that an abnormality has occurred in the igniter unit 60 or the ignition coil 50. The process then proceeds to step S125.

At step S124, the control unit 81 determines that the igniter unit 60 and the ignition coil 50 are normal. After step S124, the process leaves the series of processing steps S100.

At step S125, the control unit 81 determines that an abnormality has occurred in the igniter unit 60 or the ignition coil 50, that is, detects an abnormality in the igniter unit 60 or the ignition coil 50. After step S125, the process leaves the series of processing steps S100.

When the process leaves the series of processing steps S100 after step S116, S124, or S125, the series of processing steps S100 is started again when the ignition key is ON. That is, the series of processing steps S100 is a process that is repeatedly performed while the ignition key is ON.

As described above, when the input of electrical energy to the ignition coil 50 is determined to be required at step S105 (YES at step S105), ignition control of the air-fuel mixture by the specific ignition control unit 85 is performed. Meanwhile, when the input of electrical energy to the ignition coil 50 is determined not to be required at step S105 (NO at step S105), ignition control of the air-fuel mixture by the normal ignition control unit 84 is performed.

In addition, when ignition control of the air-fuel mixture by the specific ignition control unit 85 is performed, the control unit 81 (abnormality detecting unit 93) is capable of performing detection in which an abnormality in the igniter unit 60 or the ignition coil 50 and an abnormality in the energy input unit 70 are differentiated. Meanwhile, when ignition control of the air-fuel mixture by the normal ignition control unit 84 is performed, the control unit 81 (abnormality detecting unit 93) is capable of detecting an abnormality in the igniter unit 60 or the ignition coil 50.

Next, an operating example of the control apparatus 10 and the ignition apparatus 11 controlled by the control apparatus 10 will be described with reference to FIGS. 6 to 8.

Figure 6:
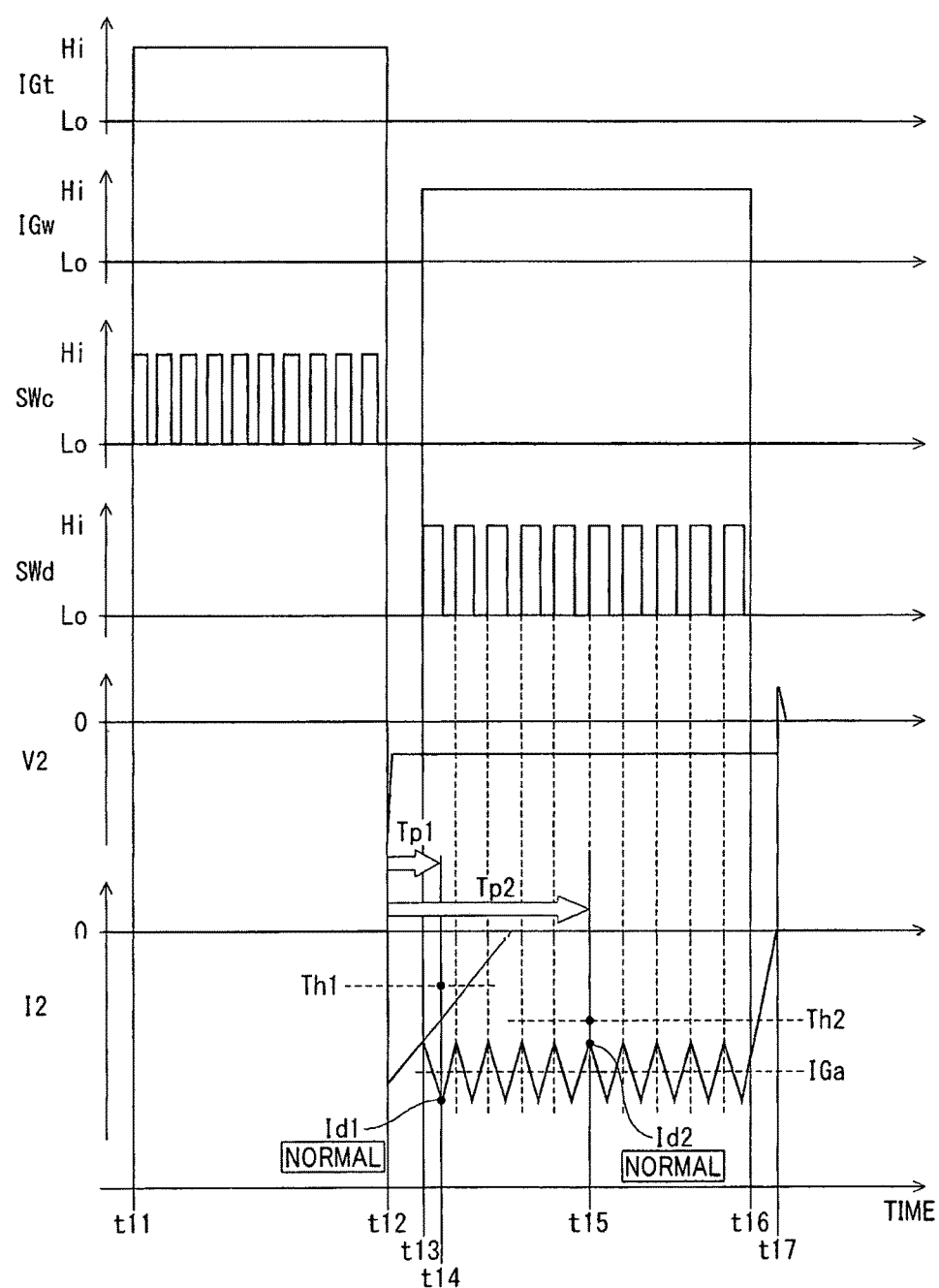
FIG. 6 is a diagram for explaining a first operation example of the control apparatus and an ignition apparatus according to the first embodiment.

A first operating example (first operating example) is shown in FIG. 6. The first operating example is an operating example of when the igniter unit 60, the ignition coil 50, and the energy input unit 70 are all normal.

When the control unit 81 determines that current conduction to the primary coil 51 of the ignition coil 50 should be started (YES at step S101) at time t11, the ignition signal IGt is set to ON (step S102). As a result, current conduction (primary current I1) to the primary coil 51 is started. In addition, according to the present embodiment, the driver circuit 77 of the energy input unit 70 outputs the switching signal SWc to the switching element 72. The switching signal SWc changes to ON or OFF during a period over which the ignition signal IGt is ON (from time t11 to 12). Consequently, the switching element 72 performs a switching operation so as to be set to the ON state or the OFF state during the period over which the ignition signal IGt is ON. As a result, electrical energy is accumulated in the capacitor 76.

When the control unit 81 determines that the timing is such that the air-fuel mixture should be ignited (YES at step S103) at time t12, the ignition signal IGt is set to OFF (step S104). As a result, a secondary voltage V2, which is a negative voltage, is generated in the secondary coil 52. The absolute value of the secondary voltage V2 becomes a predetermined value or greater, and the spark plug 40 generates electric discharge between the center electrode 42 and the ground electrode 43 of the discharging unit 41. As a result, the air-fuel mixture in the combustion chamber 28 is ignited (combusted).

At this time, the negative-direction secondary current I2 flows to the secondary coil 52. The absolute value of the secondary current I2 becomes a predetermined value or greater. When the spark plug 40 generates electric discharge at time t12, in accompaniment, the absolute value of the secondary voltage V2 promptly becomes the predetermined value or less. In addition, in accompaniment with the electric discharge by the spark plug 40, the absolute value of the secondary current I2 gradually decreases over a period from time t12 to time t13.

When the control unit 81 sets the energy input period signal IGw to ON (step S109) at time t13, the driver circuit 78 of the energy input unit 70 outputs the switching signal SWd that changes to ON or OFF to the switching element 73. As a result, the input of electrical energy to the ignition coil 50 by the energy input unit 70 is started.

The switching element 73 performs a switching operation so as to be set to the ON state or the OFF state during the period over which the energy input period signal IGw is ON (time t13 to 16). Therefore, the energy input unit 70 inputs electrical energy to the ignition coil 50 during the period from time t13 to 16. Consequently, the secondary current I2 that has the same polarity as that of the secondary current I2 that flows to the secondary coil 52 when the spark plug 40 generates electric discharge, that is, the negative-direction secondary current I2 is superimposed. As a result, the discharge state of the spark plug 40 that occurs at time t12 is maintained.

According to the present embodiment, the energy input control unit 83 gives feedback of the value of the secondary current I2 detected by the current detection circuit 91, thereby controlling the energy input unit 70 such that a current corresponding to the target current value IGa flows to the secondary coil 52. As a result, as shown in FIG. 6, during the period (time t13 to 16) over which the energy input period signal IGw is ON, the secondary current I2 (of which an average value is IGa) substantially corresponding to the target current value IGa flows to the secondary coil 52.

When the first predetermined period Tp1 elapses from time t12 at which control of the spark plug 40 by the discharge control unit 82 is started (time t14), the control unit 81 and the abnormality detecting unit 93 determine whether or not an abnormality has occurred in the igniter unit 60 or the ignition coil 50, based on the first threshold Th1 and the first current value Id1 corresponding to the secondary current I2 detected by the current detection circuit 91 at this time. In the first operating example shown in FIG. 6, the absolute value of the first current value Id1 is the absolute value of the first threshold Th1 or greater. Therefore, a determination is made that an abnormality has not occurred in the igniter unit 60 or the ignition coil 50, that is, the igniter unit 60 and the ignition coil 50 are normal.

When the second predetermined period Tp2 elapses from time t12 at which control of the spark plug 40 by the discharge control unit 82 is started (time t15), the control unit 81 and the abnormality detecting unit 93 determine whether or not an abnormality has occurred in the energy input unit 70, based on the second threshold Th2 and the second current value Id2 corresponding to the secondary current I2 detected by the current detection circuit 91 at this time. In the first operating example shown in FIG. 6, the absolute value of the second current value Id2 is the absolute value of the second threshold Th2 or greater. Therefore, a determination is made that an abnormality has not occurred in the energy input unit 70, that is, the energy input unit 70 is normal.

When the control unit 81 sets the energy input period signal IGw to OFF (S116) at time t16, the switching operation of the switching element 73 is stopped. The input of electrical energy to the ignition coil 50 from the energy input unit 70 is stopped. As a result, electric discharge by the spark plug 40 is stopped at time t17. The secondary current I2 and the secondary voltage V2 become zero.

Figure 7:
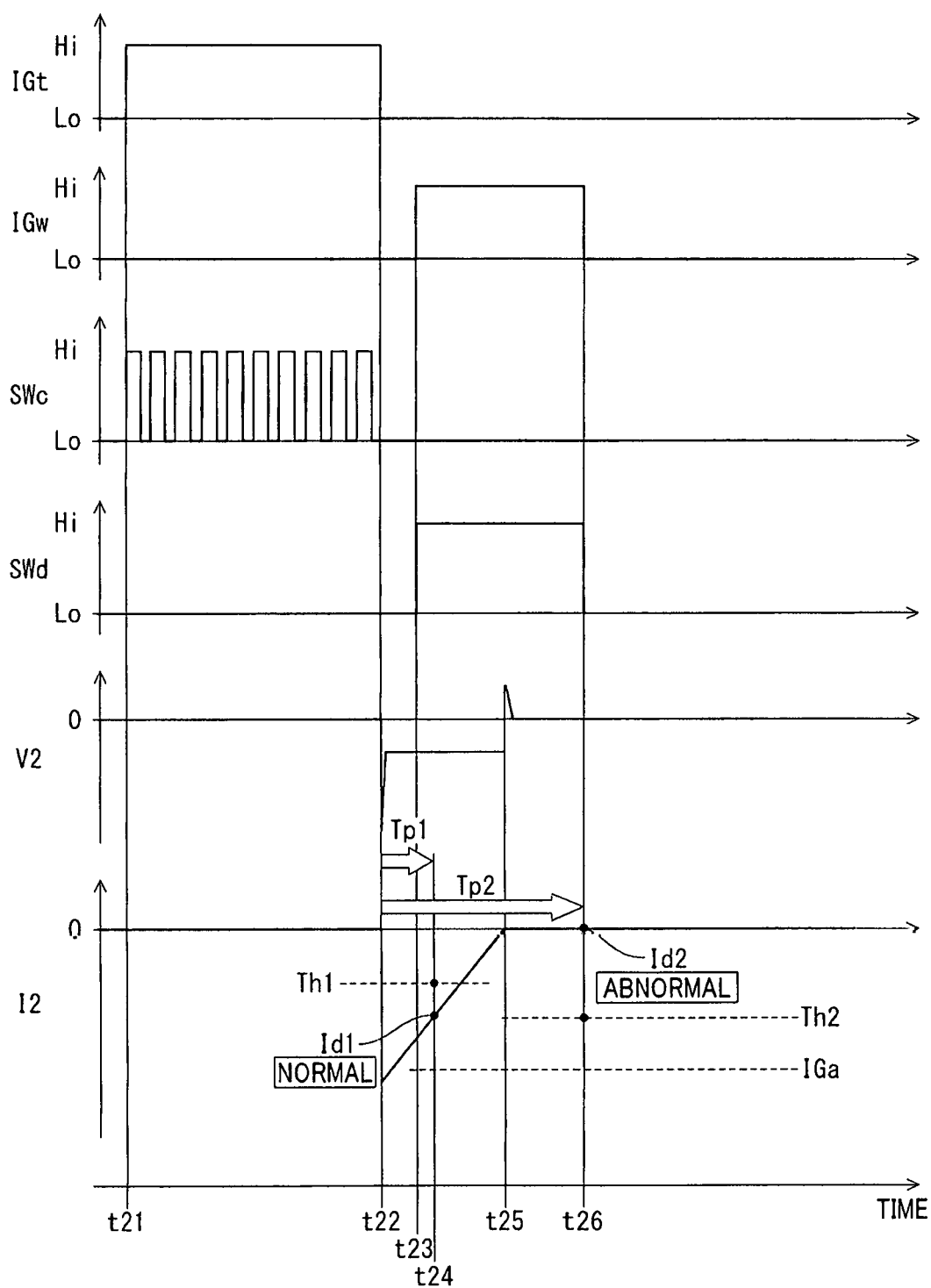
FIG. 7 is a diagram for explaining a second operation example of the control apparatus and the ignition apparatus according to the first embodiment.

A second operating example (second operating example) is shown in FIG. 7. The second operating example is an operating example of when an abnormality has occurred in only the energy input unit 70. Operations from time t21 to 23 are similar to those at time t11 to 13 in the first operating example. Therefore, descriptions thereof are omitted.

When the control unit 81 sets the energy input period signal IGw to ON (step S109) at time t23, the driver circuit 78 of the energy input unit 70 outputs the switching signal SWd that changes to ON or OFF to the switching element 73. However, in the second operating example, because an abnormality has occurred in the energy input unit 70, the input of electrical energy to the ignition coil 50 from the energy input unit 70 is not started.

The switching element 73 remains in the ON state because the secondary current I2 does not reach the target current value IGa during the period over which the energy input period signal IGw is ON (time t23 to 26). However, during the period of time t23 to 26, electrical energy is not inputted to the ignition coil 50 from the energy input unit 70. Therefore, after time t23, the absolute value of the secondary current I2 gradually decreases. At time t25, electric discharge by the spark plug 40 stops, and the secondary current I2 becomes zero.

When the first predetermined period Tp1 elapses from time t22 at which control of the spark plug 40 by the discharge control unit 82 is started (time t24), the control unit 81 and the abnormality detecting unit 93 determine whether or not an abnormality has occurred in the igniter unit 60 or the ignition coil 50, based on the first threshold Th1 and the first current value Id1 corresponding to the secondary current I2 detected by the current detection circuit 91 at this time.

In the second operating example shown in FIG. 7, the absolute value of the first current value Id1 is the absolute value of the first threshold Th1 or greater. Therefore, a determination is made that an abnormality has not occurred in the igniter unit 60 or the ignition coil 50, that is, the igniter unit 60 and the ignition coil 50 are normal.

When the second predetermined period Tp2 elapses from time t22 at which control of the spark plug 40 by the discharge control unit 82 is started (time t26), the control unit 81 and the abnormality detecting unit 93 determine whether or not an abnormality has occurred in the energy input unit 70, based on the second threshold Th2 and the second current value Id2 corresponding to the secondary current I2 detected by the current detection circuit 91 at this time.

In the second operating example shown in FIG. 7, the absolute value of the second current value Id2 is less (is zero) than the absolute value of the second threshold Th2 (NO at step S113). Therefore, the abnormality detecting unit 93 outputs the abnormality-detected signal IGf to the control unit 81. The abnormality-detected signal IGf indicates that an abnormality has occurred in the energy input unit 70. As a result, the control unit 81 determines that an abnormality has occurred in the energy input unit 70, that is, detects an abnormality in the energy input unit 70 (step S117).

When the abnormality in the energy input unit 70 is detected at time t26, the control unit 81 sets the energy input period signal IGw to OFF. As a result, the output of the switching signal SWd to the switching element 73 from the driver circuit 78 is stopped.

According to the present embodiment, when an abnormality in the igniter unit 60 or the ignition coil 50 is not detected and only an abnormality in the energy input unit 70 is detected, as in the second operating example, the control unit 81 controls the throttle valve 2 and the fuel injection valve 4 such that the air-fuel ratio in the combustion chamber 28 is a predetermined value enabling igniting by normal ignition or lower, that is, so as to stoichiometric or rich. As a result, the air-fuel mixture in the combustion chamber 28 becomes easily ignitable (ignitable). Even when the input of electrical energy to the ignition coil 50 by the energy input unit 70 is not possible, ignition of the air-fuel mixture by the discharge control unit 82 can be continued.

Consequently, limp-home by the vehicle becomes possible. In addition, when the abnormality-detected signal IGf indicating that an abnormality has occurred in the energy input unit 70 is received from the abnormality detecting unit 93, for example, the control unit 81 stores diagnostics information in relation to the abnormality. The control unit 81 is also capable of notifying the driver that an abnormality has occurred in the energy input unit 70 of the ignition apparatus 11 by lighting a notification lamp in a display unit at the driver's seat of the vehicle or by generating a notification sound.

Figure 8:
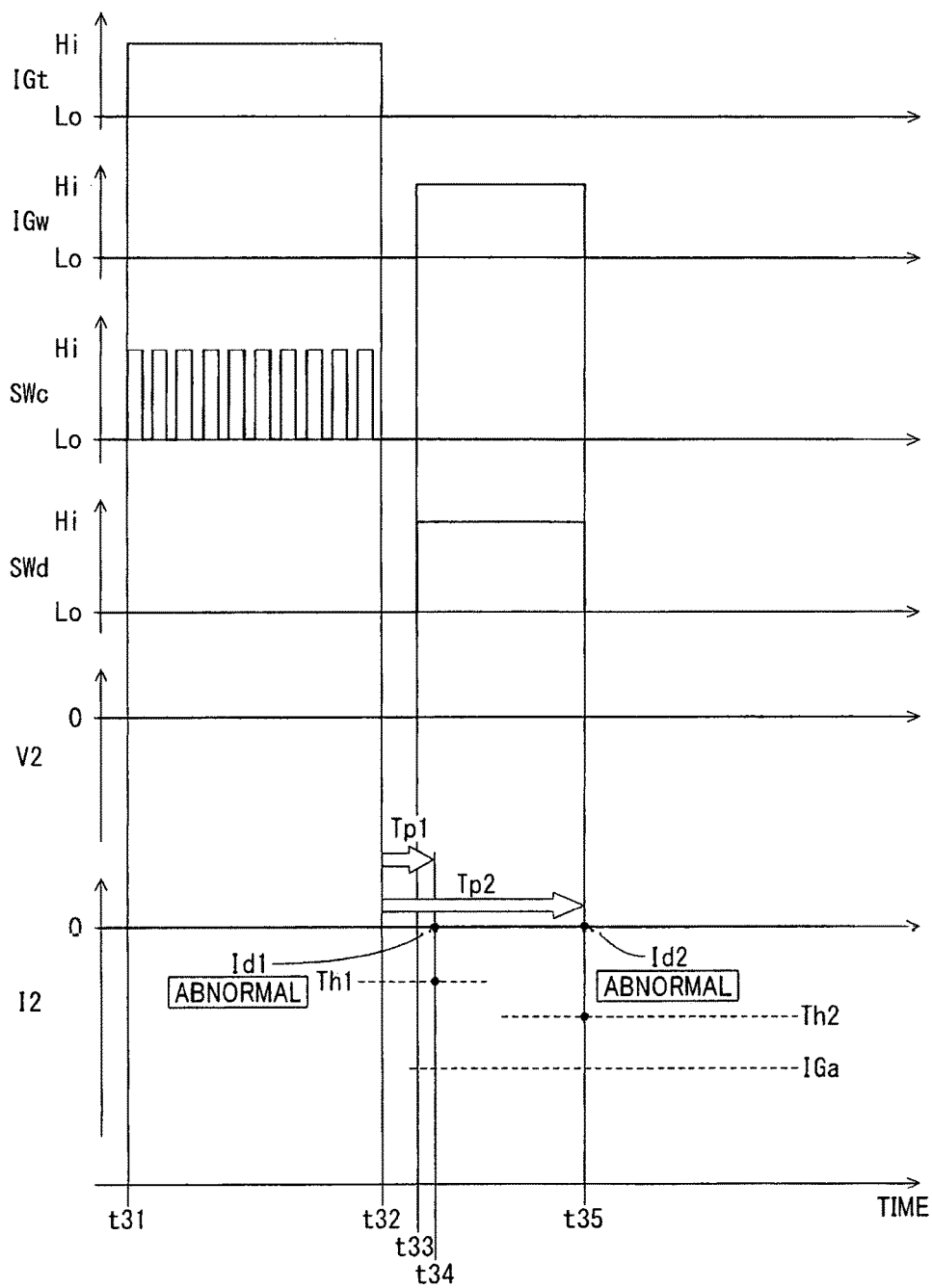
FIG. 8 is a diagram for explaining a third operation example of the control apparatus and the ignition apparatus according to the first embodiment.

A third operating example (third operating example) is shown in FIG. 8. The third operating example is an operating example of when an abnormality has occurred in the igniter unit 60 or the ignition coil 50, and in the energy input unit 70. Operations from time t31 to 32 are similar to those at time t11 to 12 in the first operating example. Therefore, descriptions thereof are omitted.

When the control unit 81 determines that the timing is such that the air-fuel mixture should be ignited (YES at step S103) at time t32, the ignition signal IGt is set to OFF (step S104). However, in the third operating example, an abnormality has occurred in the igniter unit 60 or the ignition coil 50. Therefore, after time t32, the absolute value of the secondary voltage V2 remains zero. As a result, the spark plug 40 does not generate electric discharge. Consequently, the air-fuel mixture in the combustion chamber 28 is not ignited (ignited). In addition, the absolute value of the secondary current I2 also remains zero.

When the control unit 81 sets the energy input period signal IGw to ON (step S109) at time t33, the driver circuit 78 of the energy input unit 70 outputs the switching signal SWd that changes to ON or OFF to the switching element 73. However, in the third operating example, an abnormality has also occurred in the energy input unit 70. Therefore, the input of electrical energy to the ignition coil 50 by the energy input unit 70 is not started. Consequently, after time t33, the absolute value of the secondary voltage V2 and the absolute value of the secondary current I2 remain zero.

When the first predetermined period Tp1 elapses from time t32 at which control of the spark plug 40 by the discharge control unit 82 is started (time t34), the control unit 81 and the abnormality detecting unit 93 determine whether or not an abnormality has occurred in the igniter unit 60 or the ignition coil 50, based on the first threshold Th1 and the first current value Id1 corresponding to the secondary current I2 detected by the current detection circuit 91 at this time.

In the third operating example shown in FIG. 8, the absolute value of the first current value Id1 is less (is zero) than the absolute value of the first threshold Th1 (NO at step S123). Therefore, the abnormality detecting unit 93 outputs the abnormality-detected signal IGf to the control unit 81. The abnormality-detected signal IGf indicates that an abnormality has occurred in the igniter unit 60 or the ignition coil 50. As a result, the control unit 81 determines that an abnormality has occurred in the igniter unit 60 or the ignition coil 50, that is, detects an abnormality in the igniter unit 60 or the ignition coil 50 (step S125).

When the second predetermined period Tp2 elapses from time t32 at which control of the spark plug 40 by the discharge control unit 82 is started (time t35), the control unit 81 and the abnormality detecting unit 93 determine whether or not an abnormality has occurred in the energy input unit 70, based on the second threshold Th2 and the second current value Id2 corresponding to the secondary current I2 detected by the current detection circuit 91 at this time.

In the third operating example shown in FIG. 8, the absolute value of the second current value Id2 is less (is zero) than the absolute value of the second threshold Th2 (NO at step S113). Therefore, the abnormality detecting unit 93 outputs the abnormality-detected signal IGf to the control unit 81. The abnormality-detected signal IGf indicates that an abnormality has occurred in the energy input unit 70. As a result, the control unit 81 determines that an abnormality has occurred in the energy input unit 70, that is, detects an abnormality in the energy input unit 70 (step S117).

When the abnormality in the energy input unit 70 is detected at time t35, the control unit 81 sets the energy input period signal IGw to OFF. As a result, the output of the switching signal SWd to the switching element 73 from the driver circuit 78 is stopped.

According to the present embodiment, when an abnormality is detected in the igniter unit 60 or the ignition coil 50, as in the third operating example, the control unit 81 controls the fuel injection valve 4 so as to block the supply of fuel to the combustion chamber 28 corresponding to the igniter unit 60 or the ignition coil 50 in which the abnormality has been detected. As a result, limp-home of the vehicle becomes possible, while reducing the number of cylinders 21 used to operate the engine 20 (reduced cylinders).

In addition, when the abnormality-detected signal IGf indicating that an abnormality has occurred in the igniter unit 60 or the ignition coil 50 is received from the abnormality detecting unit 93, for example, the control unit 81 stores diagnostics information in relation to the abnormality. The control unit 81 is also capable of notifying the driver that an abnormality has occurred in the igniter unit 60 or the ignition coil 50 of the ignition apparatus 11 by lighting a notification lamp in a display unit at the driver's seat of the vehicle or by generating a notification sound.

As described above, (1) according to the present embodiment, the control unit 81 has the discharge control unit 82 and the energy input control unit 83, and is capable of controlling the ignition of the air-fuel mixture in the combustion chamber 28.

The discharge control unit 82 controls the igniter unit 60 so as to block the flow of current from the primary coil 51 towards the ground side, causing a high voltage to be generated in the secondary coil 52. The discharge control unit 82 thereby controls the spark plug 40 so that the spark plug 40 generates electric discharge. As a result, the spark plug 40 can generate electric discharge and ignite the air-fuel mixture.

The energy input control unit 83 controls the energy input unit 70 so as to input electrical energy to the ignition coil 50 after the start of control of the spark plug 40 by the discharge control unit 82. As a result, the discharge state of the spark plug 40 that occurs as a result of control by the discharge control unit 82 can be maintained. Consequently, ignitability of the air-fuel mixture can be improved.

The current detection circuit 91 is capable of detecting the current flowing through the secondary coil 52.

The control unit 81 and the abnormality detecting unit 93 (abnormality detecting means) are capable of detecting an abnormality in the ignition apparatus 11 based on a current value that is a value corresponding to the current detected by the current detection circuit 91.

According to the present embodiment, when the first predetermined period Tp1 elapses after control of the spark plug 40 by the discharge control unit 82 is started, the control unit 81 and the abnormality detecting unit 93 are capable of detecting an abnormality in the igniter unit 60 or the ignition coil 50 based on the first threshold Th1 and the first current value Id1. The first predetermined period Tp1 is a first predetermined period. The first threshold Th1 is a first threshold. The first current value Id1 is a value corresponding to the current (secondary current I2) detected by the current detection circuit 91 at this time.

In this way, according to the present embodiment, the control unit 81 and the abnormality detecting unit 93 are capable of detecting an abnormality in the igniter unit 60 or the ignition coil 50, based on a current value (first current value Id1) detected after the start of control of the spark plug 40 by the discharge control unit 82 and a threshold (first threshold Th1). As a result, an abnormality in the ignition apparatus 11 can be detected with a simple configuration.

In addition, (2) according to the present embodiment, when the second predetermined period Tp2 elapses after control of the spark plug 40 by the discharge control unit 82 is started, the control unit 81 and the abnormality detecting unit 93 are capable of detecting an abnormality in the energy input unit 70 based on the second threshold Th2 and the second current value Id2. The second predetermined period Tp2 is a second predetermined period that is longer than the first predetermined period Tp1. The second threshold Th2 is a second threshold. The second current value Id2 is a value corresponding to the current (secondary current I2) detected by the current detection circuit 91 at this time.

In this configuration, detection in which an abnormality in the igniter unit 60 or the ignition coil 50 and an abnormality in the energy input unit 70 are differentiated can be performed by the control unit 81 and the abnormality detecting unit 93, based on current values (first current value Id1 and second current value Id2) detected with a time lag after the start of control of the spark plug 40 by the discharge control unit 82, and two thresholds (first threshold Th1 and second threshold Th2). As a result, detection in which abnormalities in respective sections (igniter unit 60, ignition coil 50, or energy input unit 70) configuring the ignition apparatus 11 are differentiated can be performed with a simple configuration. Therefore, operation of the engine 20 can be switched based on the section in which the abnormality is detected.

Furthermore, (3) according to the present embodiment, the energy input unit 70 inputs electrical energy to the ignition coil 50 from the ground side of the primary coil 51. According to the present embodiment, an example of a configuration of the ignition apparatus 11 (energy input unit 70) is given. According to the present embodiment, the ignition apparatus 11 has one ignition coil 50 for each spark plug 40. As a result of the energy input unit 70 continuously inputting electrical energy to the ignition coil 50 from the ground side of the primary coil 51, the discharge state occurring in the spark plug 40 can be maintained over a predetermined period (energy input period).

Moreover, (7) according to the present embodiment, the energy input control unit 83 controls the energy input unit 70 such that a current corresponding to the target current value IGa, which is a predetermined current value, flows through the secondary coil 52. As a result, during the period over which the energy input unit 70 is inputting electrical energy to the ignition coil 50, the secondary current I2 substantially corresponding to the target current value IGa flows through the secondary coil 52. As a result, the discharge state occurring in the spark plug 40 can be stably maintained over a predetermined period (energy input period).

In addition, (10) according to the present embodiment, the control unit 81 is capable of controlling the throttle valve 2 and the fuel injection valve 4. Here, the throttle valve 2 is capable of changing the amount of intake air supplied to the combustion chamber 28. The fuel injection valve 4 is capable of changing the amount of fuel supplied to the combustion chamber 28.

When only an abnormality in the energy input unit 70 is detected by the abnormality detecting unit 93, the control unit 81 controls the throttle valve 2 and the fuel injection valve 4 such that the air-fuel ratio in the combustion chamber 28 becomes a predetermined value or lower. Therefore, the air-fuel mixture in the combustion chamber 28 becomes easily ignitable (ignitable). Even when the input of electrical energy to the ignition coil 50 by the energy input unit 70 is not possible, the ignition of the air-fuel mixture can be continuously performed by the discharge control unit 82 (normal ignition control unit 84). As a result, limp-home of the vehicle becomes possible.

In addition, the control unit 81 controls the fuel injection valve 4 so as to block the supply of fuel to the combustion chamber 28 when an abnormality in the igniter unit 60 or the ignition coil 50 is detected by the abnormality detecting unit 93. As a result, limp-home of the vehicle becomes possible, while reducing the number of cylinders 21 used to operate the engine 20 (reduced cylinders).

In this way, the operation of the engine 20 can be switched based on the section (igniter unit 60 or ignition coil 50, and energy input unit 70) in which the abnormality is detected in the ignition apparatus 11. The vehicle can be made to limp-home, while minimizing deterioration in fuel efficiency, emission, and drivability.

Second Embodiment

An ignition apparatus 11 according to a second embodiment of the present invention will be described with reference to FIG. 9 by (A) and (B). The second embodiment differs from the first embodiment in terms of the manner in which the target current value and the second threshold are set, and the like.

According to the second embodiment, the control unit 81 determines an operating state of the engine 20 based on, for example, the rotation speed of the engine 20, intake pressure, the amount of fuel injected from the fuel injection valve 4, and the air-fuel ratio. The control unit 81 changes the target current value IGa based on the determined operating state. Specifically, for example, when the control unit 81 determines the operating state of the engine 20 to be a state in which the discharge state of the spark plug 40 in the combustion chamber 28 can be easily maintained, the control unit 81 changes the target current value IGa to be a predetermined value or less. Meanwhile, when the control unit 81 determines that the state is such that the discharge state of the spark plug 40 in the combustion chamber 28 is difficult to maintain, the control unit 81 changes the target current value IGa to be a predetermined value or greater. As a result, the value of the secondary current I2 flowing to the secondary coil 52 when the energy input unit 70 inputs electrical energy to the ignition coil 50 is changed depending on the operating state of the engine 20.

In addition, the abnormality detecting unit 93 changes the second threshold Th2 based on the target current value IGa changed by the control unit 81. Specifically, for example, when the target current value IGa is changed so as to be decreased, in response, the abnormality detecting unit 93 changes the second threshold Th2 so as to be decreased. Meanwhile, when the target current value IGa is changed so as to be increased, in response, the threshold Th2 is changed so as to be increased. The second threshold Th2 that is changed by the abnormality detecting unit 93 may be a value that is greater than the first threshold Th1 and less than the target current IGa.

As shown in FIG. 9 by (A), when the control unit 81 determines that the operating state of the engine 20 is neither a state in which the discharge state of the spark plug 40 in the combustion chamber 28 can be easily maintained nor a state in which the discharge state is difficult to maintain, the target current value IGa and the second threshold Th2 respectively remain at the predetermined values.

Meanwhile, as shown in FIG. 9 by (B), when the control unit 81 determines the operating state of the engine 20 to be a state in which the discharge state of the spark plug 40 in the combustion chamber 28 is difficult to maintain, the target current value IGa and the second threshold Th2 are changed in a direction in which the respective absolute values increase.

As described above, (8) according to the present embodiment, the control unit 81 changes the target current value IGa based on the operating state of the engine 20. For example, when the control unit 81 determines the operating state of the engine 20 to be a state in which the discharge state of the spark plug 40 in the combustion chamber 28 can be easily maintained, the control unit 81 changes the target current value IGa to be a predetermined value or less. When determined that the state is such that the discharge state of the spark plug 40 in the combustion chamber is difficult to maintain, the control unit 81 changes the target current value IGa to be a predetermined value or greater.

As a result, the value of the secondary current I2 flowing to the secondary coil 52 when the energy input unit 70 inputs electrical energy to the ignition coil 50 changes depending on the operating state of the engine 20. As a result, when the operating state of the engine 20 is a state in which the discharge state of the spark plug 40 in the combustion chamber 28 can be easily maintained, energy-saving can be achieved by the electrical energy inputted to the ignition coil 50 being reduced. When the state is such that the discharge state of the spark plug 40 in the combustion chamber 28 is difficult to maintain, the spark plug 40 can reliably generate electric discharge by the electrical energy inputted to the ignition coil 50 being increased.

In addition, (9) according to the present embodiment, the abnormality detecting unit 93 changes the second threshold Th2 based on the target current value IGa changed by the control unit 81. For example, when the target current value IGa is changed so as to be decreased, in response, the abnormality detecting unit 93 changes the second threshold Th2 so as to be decreased. When the target current value IGa is changed so as to be increased, in response, the abnormality detecting unit 93 changes the second threshold Th2 so as to be increased. As a result, an abnormality in the energy input unit 70 can be detected based on the target current value IGa that is changed. Consequently, even when the target current value IGa is changed, an abnormality in the energy input unit 70 can be detected with high accuracy.

Variation Examples (4) In a variation example according to the first and second embodiments, for example, the control unit 81 (abnormality detecting unit 93) may set the first threshold Th1 and the second threshold Th2 based on a map of load and rotation speed of the engine 20. In this case, an abnormality in each section of the ignition apparatus 11 can be detected with high accuracy based on the load and rotation speed of the engine 20.

In addition, (5) in a variation example according to the first and second embodiments, when a state in which the absolute value of the first current value Id1 is less than the absolute value of the first threshold Th1 continues over a predetermined period, the abnormality detecting unit 93 may detect an abnormality in the igniter unit 60 or the ignition coil 50. In this case, an abnormality in the igniter unit 60 or the ignition coil 50 can be detected with higher accuracy.

Furthermore, (6) in a variation example according to the first and second embodiments, when a state in which the absolute value of the second current value Id2 is less than the absolute value of the second threshold Th2 continues over a predetermined period, the abnormality detecting unit 93 may detect an abnormality in the energy input unit 70. In this case, an abnormality in the energy input unit 70 can be detected with higher accuracy.

In addition, according to the first and second embodiments, an example is given in which the abnormality detecting means detects an abnormality in the igniter unit or the ignition coil based on the first current value and the first threshold, and detects an abnormality in the energy input unit based on the second current value and the second threshold. Conversely, in a variation example, the abnormality detecting means may detect only an abnormality in the igniter unit or the ignition coil based on the first current value and the first threshold, without detecting an abnormality in the energy input unit.

Furthermore, according to the first and second embodiments, an example is given in which the control apparatus is applied to the ignition apparatus in which one ignition coil is provided for one spark plug and the energy input unit inputs electrical energy to the ignition coil from the ground side of the primary coil. Conversely, in a variation example, the control unit can also be applied to an ignition apparatus in which a plurality of ignition coils are provided for one spark plug, for example, and the discharge state of the spark plug can be maintained by electrical energy being continuously inputted to the plurality of ignition coils from the energy input unit after discharge control of the spark plug.

In addition, the energy input unit may be actualized in any manner as long as the energy input unit is capable of inputting electrical energy that allows the ignition state to be maintained (allows the discharge state of the spark plug to be maintained). A conventional multiple discharge method or a dual coil offset (DCO) method disclosed, for example, in JP-A-2012-167665 may be used. For example, when the DCO method is used, of the two ignition coils, the ignition coil that starts the main electric discharge may be considered to be a normal coil, and a section that inputs electrical energy to the ignition coil capable of maintaining the discharge state after the main discharge can be considered the energy input unit.

Furthermore, according to the first and second embodiments, an example is given in which the energy input control unit controls the energy input unit 70 such that a current corresponding to the target current value IGa that is a predetermined current value flows through the secondary coil 52, by giving feedback of the value of the secondary current I2. Conversely, in a variation example, the energy input control unit may not give feedback of the value of the secondary current I2 and may not control the energy input unit 70 such that a current corresponding to the target current value IGa flows through the secondary coil 52.

In addition, in a variation example according to the first and second embodiments, when an abnormality is detected in the igniter unit, the ignition coil, or the energy input unit, the control unit may only give notification of the detected abnormality, without controlling the throttle valve or the fuel injection valve.

Furthermore, in a variation example according to the first and second embodiments, the energy input unit 70 may be configured to not include the capacitor 76. Even with the configuration in which the capacitor 76 is not included, electrical energy can be inputted to the ignition coil as a result of switching operation of the switching elements 72 and 73 being performed as appropriate.

In addition, in a variation example according to the first and second embodiments, for example, the energy input unit may be a section that is capable of inputting electrical energy from a high-voltage power supply separate from the power supply 12, to the ignition coil. In this case, compared to the above-described embodiment, the number of components configuring the energy input unit can be reduced.

Furthermore, in a variation example according to the first and second embodiments, the switching element 61 of the igniter unit 60 is not limited to the IGBT, and may be configured by another semiconductor switching element, such as a MOSFET or a transistor. Moreover, because the MOSFET generally has a parasitic diode, when the switching element 61 is configured by the MOSFET, the diode 62 can be omitted.

In addition, in a variation example according to the first and second embodiments, the switching elements 72 and 73 of the energy input unit 70 are not limited to the MOSFET, and may be configured by another semiconductor switching element, such as the IGBT or a transistor.

Furthermore, according to the first and second embodiment, an example is given in which the igniter unit 60 is housed in the housing of the ignition circuit unit 13. Conversely, in a variation example, the igniter unit 60 may be provided near the ignition coil 50 without being housed in the housing of the ignition circuit unit 13.

In addition, according to the first and second embodiment, an example is given in which the current detection circuit 91 and the abnormality detecting unit 93 are housed in the housing of the ignition circuit unit 13. Conversely, in a variation example, at least either of the current detection circuit 91 and the abnormality detecting unit 93 may be housed in the housing of the ECU 80. Alternatively, the control unit 81 of the ECU 80 may include at least either of the current detection circuit 91 and the abnormality detecting unit 93.

Furthermore, the control apparatus according to the first and second embodiments can be applied to an ignition apparatus of an engine system that does not include the exhaust gas recirculation (EGR) system.

In addition, according to the first and second embodiment, an example is given in which the negative-direction secondary current flows to the secondary coil of the ignition coil during electric discharge of the spark plug. Conversely, in a variation example, a configuration may be such that a positive-direction secondary current flows to the secondary coil of the ignition coil during electric discharge of the spark plug.

Furthermore, according to the above-described embodiments, an example is given in which the energy input unit inputs electrical energy to the ignition coil such that the negative-direction secondary current is superimposed. Conversely, according to a variation example of the present embodiment, the energy input unit may be configured to input electrical energy to the ignition coil such that a positive-direction secondary current is superimposed.

Moreover, the control apparatus according to the first and second embodiments is not limited to the four-cylinder internal combustion engine, and can also be applied to an ignition apparatus of an internal combustion engine of which the number of cylinders is other than four. In addition, the control apparatus according to the first and second embodiments is not limited to the pre-mixed combustion-type internal combustion engine, and can also be applied to an ignition apparatus of a direct injection-type internal combustion engine. In this way, the present disclosure is not limited to the above-described embodiments and can be carried out according to various aspects without departing from the spirit of the invention.

Third Embodiment

Figure 10:
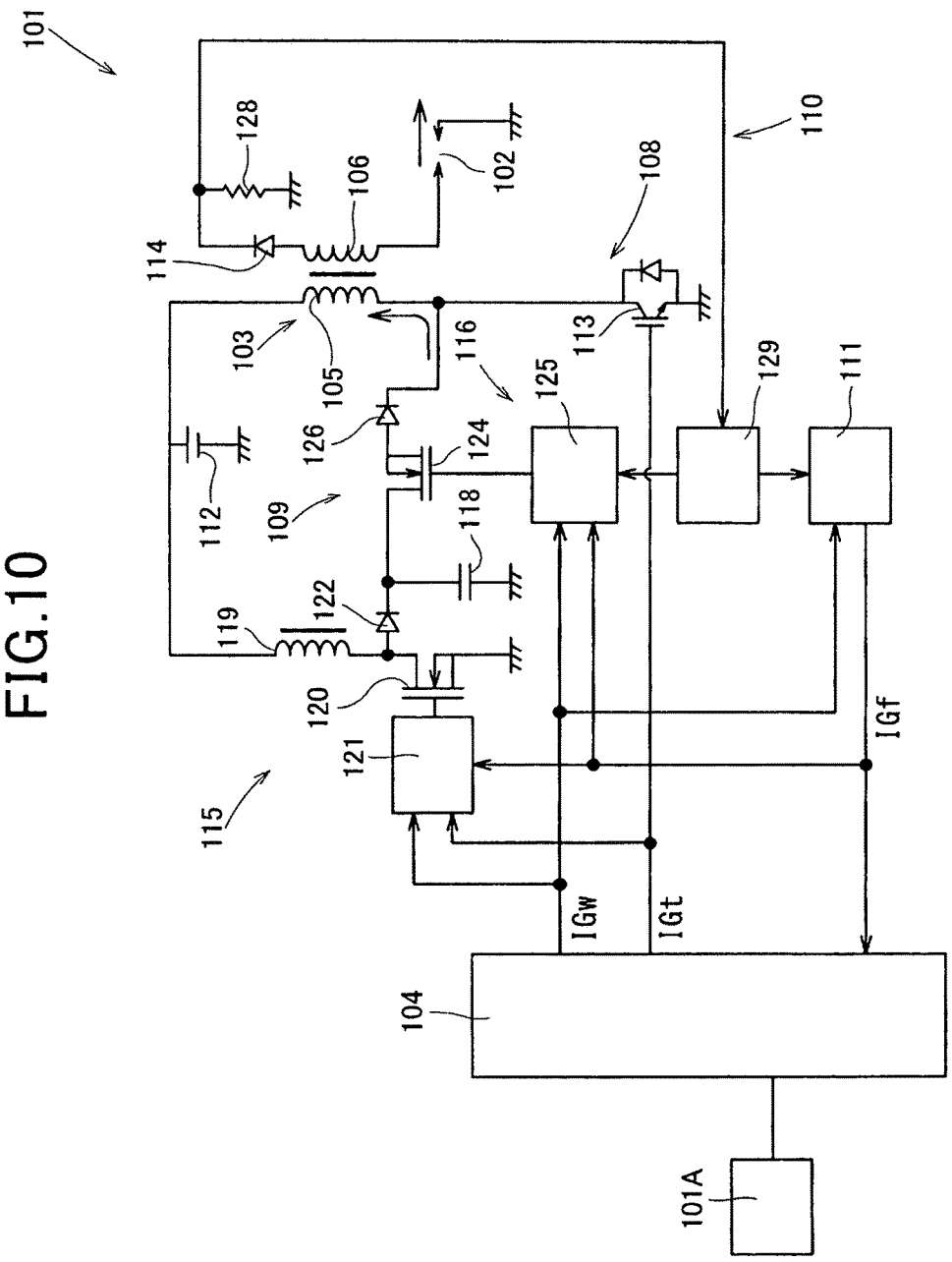
FIG. 10 is a configuration diagram of an ignition apparatus according to a third embodiment of the present invention.

A third embodiment of the present embodiment will be described below with reference to FIG. 10 to FIG. 12. The third embodiment discloses a specific example. It goes without saying that the present invention is not limited to the third embodiment.

An ignition apparatus 101 according to the third embodiment will be described with reference to FIG. 10.

The ignition apparatus 101 is mounted in a spark-ignition engine for vehicle driving. The ignition apparatus 101 ignites an air-fuel mixture inside a combustion chamber at a predetermined ignition timing. An example of the engine is a direct injection-type engine that uses gasoline as fuel and is capable of performing lean burn (lean burn). The engine includes a rotational flow control means that generates rotational flow of the air-fuel mixture, such as a tumble flow or a swirl flow, inside the cylinder. In an operating state in which a gas flow rate inside the cylinder is high and the occurrence of a blowout of the spark discharge is possible, such as in lean burn, the ignition apparatus 101 is controlled to perform continued spark discharge following the main ignition.

In addition, the ignition apparatus 101 is a direct ignition (DI) type that uses an ignition coil 103 corresponding to a spark plug 102 of each cylinder.

Furthermore, the ignition apparatus 101 controls energization of a primary coil 105 of the ignition coil 103 based on an ignition signal IGt, a continued discharge signal IGw, and the like provided by an electronic control unit (referred to, hereafter, as an ECU 104) that serves as the core of engine control. The ignition apparatus 101 manipulates electrical energy that is generated in a secondary coil 106 of the ignition coil 103 by performing energization control of the primary coil 105, and controls spark discharge of the spark plug 102.

Here, the ECU 104 receives input of signals from various sensors that are mounted in the vehicle and detect parameters (such as a warmup state, engine rotation speed, engine load, presence of a lean-burn state, and degree of rotational flow) indicating the operating state and the control state of the engine. In addition, the ECU 104 is configured to include an input circuit, a CPU, various memories, an output circuit, and the like. The input circuit processes inputted signals. The CPU performs control processes and calculation processes related to engine control based on the inputted signals. The various memories store and hold data, programs, and the like required for engine control. The output circuit outputs signals required for engine control based on the processing results from the CPU. The ECU 104 then generates the ignition signal IGt and the continued discharge signal IGw based on the engine parameters acquired from the various sensors, and outputs the generated ignition signal IGt and continued discharge signal IGw.

The ignition apparatus 101 according to the third embodiment is configured to include a main ignition circuit 108, an energy input circuit 109, a feedback circuit 110, and an abnormality determining unit 111. The main ignition circuit 108 generates a main ignition based on full-transistor. The energy input circuit 109 continues, as continued spark discharge, the spark discharge generated as the main ignition by performing additional input of electrical energy. The feedback circuit 110 detects the secondary current and gives feedback to the energy input circuit 109. The abnormality determining unit 111 performs abnormality determination of the ignition apparatus 101.

The main ignition circuit 108, the energy input circuit 109, the feedback circuit 110, and the abnormality determining unit 111 are arranged so as to be housed inside a single case as an ignition circuit unit. The spark plug 102, the ignition coil 103, and the ignition circuit unit are provided in the same quantity as the number of cylinders, and are provided for each cylinder.

The spark plug 102 has a known structure. The spark plug 102 includes a center electrode and a ground electrode. The center electrode is connected to one end of the secondary coil 106. The ground electrode is grounded to the earth via a cylinder head of the engine or the like. The spark plug 102 generates spark discharge between the center electrode and the ground electrode by electrical energy generated in the secondary coil 106.

The ignition coil 103 has the primary coil 105 and the secondary coil 106. The ignition coil 103 has a known structure that starts electric discharge from the spark plug 102 by generating a high voltage in the secondary coil by electromagnetic induction based on increase and decrease of a current (primary current) flowing through the primary coil 105, and generates a discharge current (secondary current).

One end of the primary coil 105 is connected to a positive electrode of an on-board battery 112. The other end of the primary coil 105 is grounded to the earth via a switching unit for ignition (corresponding to a switching means for ignition) 113 of the main ignition circuit 108. Furthermore, the energy input circuit 109 is connected to the other end of the primary coil 105 in parallel with the line that is grounded to the earth via the switching unit for ignition 113.

As described above, one end of the secondary coil 106 is connected to the center electrode of the spark plug 102. The other end of the secondary coil 106 is connected to the feedback circuit 110. The other end of the secondary coil 106 is connected to the feedback circuit 110 via a first diode 114 that restricts the direction of the secondary current to a single direction.

The main ignition circuit 108 accumulates energy in the primary coil 105 by the switching element for ignition 113 being turned ON and OFF. In addition, the main ignition circuit 108 generates a high voltage in the secondary coil 106 using the energy accumulated in the primary coil 105 and generates a main ignition in the spark plug 102.

More specifically, the main ignition circuit 108 includes the switching unit for ignition 113 that continues and interrupts the energization state of the primary coil 105. As a result of the switching unit for ignition 113 being turned ON during a period over which the ECU 104 provides the ignition signal IGt, the main ignition circuit 108 applies the voltage of the on-board battery 112 to the primary coil 105 and sends a positive primary current, thereby accumulating magnetic energy in the primary coil 105. Subsequently, as a result of the switching unit for ignition 113 being turned OFF, the main ignition circuit 108 converts the magnetic energy to electrical energy by electromagnetic induction, generates a high voltage in the secondary coil 106, and generates the main ignition.

The switching unit for ignition 113 is a power transistor, a metal-oxide semiconductor (MOS) type transistor, or the like. In addition, the ignition signal IGt is a signal commanding the period over which magnetic energy is accumulated in the primary coil 105 and the ignition start timing in the main ignition circuit 108.

The energy input circuit 109 is configured to include a following booster circuit 115 and an input energy control unit (corresponding to an input energy control means) 116.

First, the booster circuit 115 boosts the voltage of the on-board battery 112 during the period over which the ECU 104 provides the ignition signal IGt, and accumulates electrical energy in a capacitor 118.

Next, the input energy control unit 116 inputs the electrical energy accumulated in the capacitor 118 to a negative side (ground side) of the primary coil 105.

The booster circuit 115 is configured to include, in addition to the capacitor 118, a choke coil 119, a boost switching unit (corresponding to a boost switching means) 120, a boost driver circuit 121, and a second diode 122. The boost switching unit 120 is, for example, a MOS-type transistor.

Here, one end of the choke coil 119 is connected to a positive electrode of the on-board battery 112. The energization state of the choke coil 119 is continued and interrupted by the boost switching unit 120. In addition, the boost driver circuit 121 turns ON and OFF the boost switching unit 120 by providing the boost switching unit 120 with a control signal. As a result of the ON/OFF operation of the boost switching unit 120, electrical energy is charged in the capacitor 118 by the magnetic energy accumulated in the choke coil 119.

The boost driver circuit 121 is provided to repeatedly turn ON and OFF the boost switching unit 120 at a predetermined cycle, during the period over which the ECU 104 provides the ignition signal IGt.

In addition, the second diode 122 prevents backflow of the electrical energy accumulated in the capacitor 118 towards the choke coil 119 side.

The input energy control unit 116 is configured to include a following switching unit for input (corresponding to a switching means for input) 124, a driver circuit for input 125, and a third diode 126. The switching unit for input 124 is, for example, a MOS-type transistor.

Here, the switching unit for input 124 turns ON and OFF the input of electrical energy accumulated in the capacitor 118 to the primary coil 105 from the negative side. The driver circuit for input 125 turns ON and OFF the switching unit for input 124 by providing the switching unit for input 124 with a control signal.

The driver circuit for input 125 maintains the secondary current at a predetermined value during the period over which the continued discharge signal IGw is provided, by controlling the electrical energy inputted to the primary coil 105 from the capacitor 118 by turning ON and OFF the switching unit for input 124. Here, the continued discharge signal IGw is a signal commanding the period over which the continued spark discharge is continued. More specifically, the continued discharge signal IGw is a signal commanding the period over which the switching unit for input 124 is repeatedly turned ON and OFF and electrical energy is inputted to the primary coil 105 from the booster circuit 115.

The third diode 126 prevents backflow of current from the primary coil 105 to the capacitor 118.

The feedback circuit 110 detects the secondary current and gives feedback to the input energy control unit 116 of the energy input circuit 109.

Here, the feedback circuit 110 is provided with a secondary current detection resistor 128 and a current detection circuit 129. The secondary current detection resistor 128 serves as a secondary current detecting means that detects the secondary current. The current detection circuit 129 composites a feedback signal and outputs the feedback signal. A detection value of the secondary current is converted to voltage by the secondary current detection resistor 128 and outputted to the current detection circuit 129. In addition, for example, upper limit and lower limit thresholds for the secondary current are set in the current detection circuit 129. A feedback signal based on a comparison of the detection value with the upper limit and lower limit thresholds is composited and outputted to the driver circuit for input 125.

Next, an operation of the ignition apparatus 101 during a normal operation will be described with reference to FIG. 11.

Figure 11:
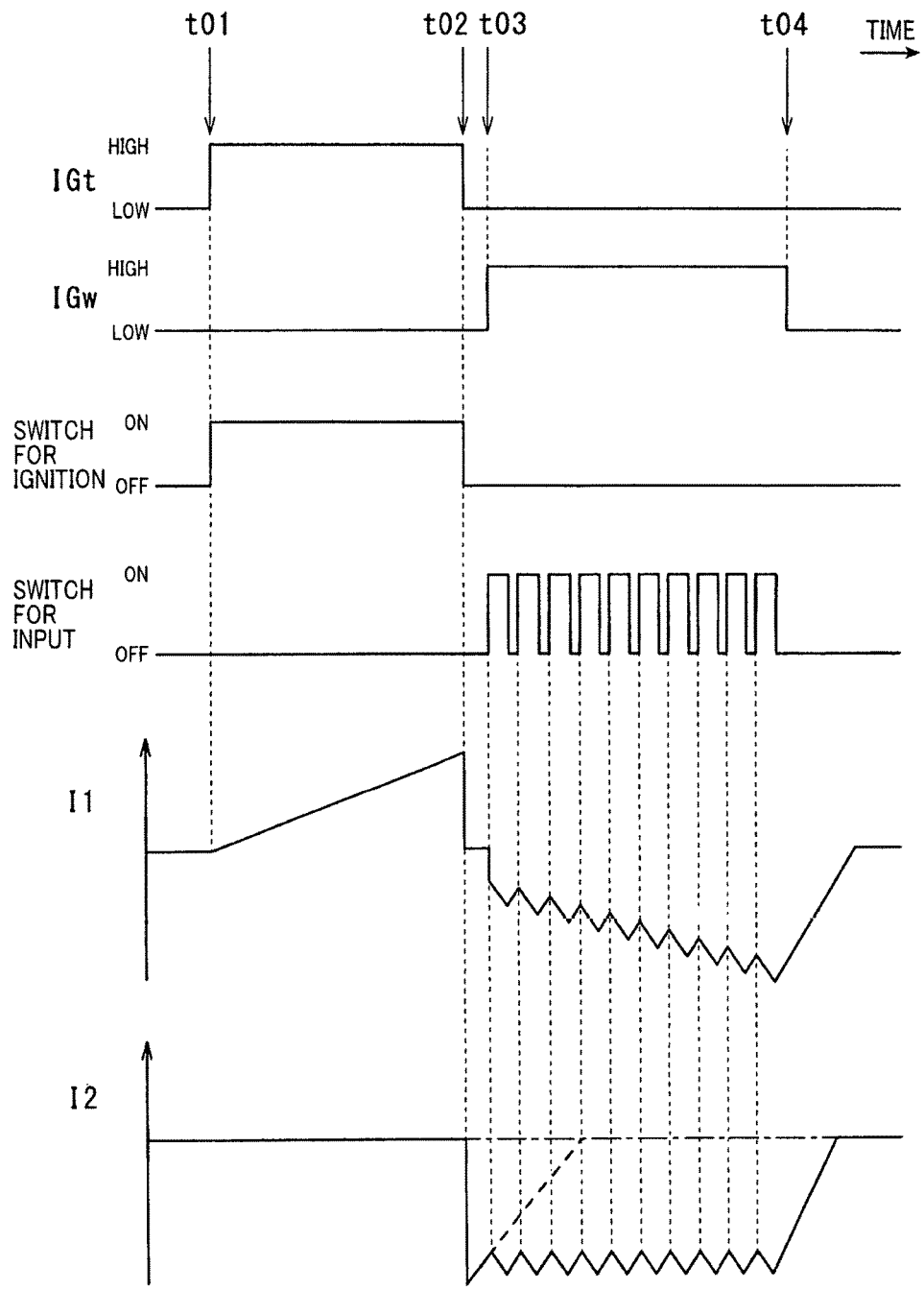
FIG. 11 is a timing diagram of an operation of an ignition apparatus according to the third embodiment.

In FIG. 11, IGt indicates the input state of the ignition signal IGt by high/low. IGw indicates the input state of the continued discharge signal IGw by high/low. In addition, switch for ignition and switch for input respectively indicate the ON/OFF of the switching unit for ignition 113 and the switching unit for input 124. I1 indicates the primary current (the value of the current flowing to the primary coil 105), and I2 indicates the secondary current (the value of the current flowing to the secondary coil 106).

When the ignition signal IGt changes from low to high (see time t01), the switching unit for ignition 113 maintains the ON state during the period over which the ignition signal IGt is held high, and a positive primary current flows. Magnetic energy is accumulated in the primary coil 105. In addition, a boosting operation is performed by the boost switching unit 120 being repeatedly turned ON and OFF. The boosted electrical energy is accumulated in the capacitor 118.

When the ignition signal IGt eventually changes from high to low (see time t02), the switching unit for ignition 113 is turned OFF. The energization state of the primary coil 105 is interrupted. As a result, the magnetic energy accumulated in the primary coil 105 is converted to electrical energy. A high voltage is generated in the secondary coil 106, and the main ignition is started in the spark plug 102.

After the main ignition is started in the spark plug 102, the secondary current attenuates in the manner of a substantially triangular waveform (see the dotted line of I2). Before the secondary current reaches the lower limit threshold, the continued discharge signal IGw changes from low to high (see time t03).

When the continued discharge signal IGw changes from low to high, ON/OFF control of the switching unit for input 124 is performed. The electrical energy accumulated in the capacitor 118 is successively inputted to the negative side of the primary coil 105. The primary current flows from the primary coil 105 towards the positive electrode of the on-board battery 112. More specifically, each time the switching unit for input 124 is turned ON, the primary current from the primary coil 105 towards the positive electrode of the on-board battery 112 is added, and the primary current increases towards the negative side (see time t03 to t04).

In other words, when the secondary current reaches the upper limit (control upper limit H, described hereafter) as a result of the primary current being added, the switching unit for input 124 is turned OFF and energy input is stopped. The secondary current gradually decreases. In addition, when the secondary current reaches the lower limit (control lower limit L, described hereafter), the switching unit for input 124 is turned ON and energy input is restarted. Each time the primary current is added, the secondary current in the same direction as that of the secondary current resulting from the main ignition is successively added to the secondary coil 106. The secondary current is maintained between the upper limit and the lower limit.

As a result of the foregoing, the second current continuously flows to an extent that spark discharge can be maintained, through ON/OFF control of the switching unit for input 124. As a result, when the ON state of the continued discharge signal IGw continues, continued spark discharge is maintained in the spark plug 102.

Next, a characteristic configuration according to the third embodiment will be described.

The abnormality determining unit 11 of the ignition apparatus 101 sets an allowable range for the secondary current in a following manner, to prevent engine misfire and further malfunctions from occurring as a result of the secondary current indicating an abnormal numeric value during continued spark discharge.

That is, the allowable range is set for the detection value of the secondary current during operation of the energy input circuit 109. An upper limit threshold of the allowable range is greater, in terms of absolute value, than the upper limit threshold set by the current detection circuit 129. A lower limit threshold of the allowable range is less, in terms of absolute value, than the lower limit threshold set by the current detection circuit 129.

In the description below, the upper limit and lower limit thresholds set by the current detection circuit 129 are respectively referred to as the control upper limit H and the control lower limit L. The upper limit and lower limit thresholds set by the abnormality determining unit 111 are respectively referred to as an allowed upper limit HH and an allowed lower limit LL (see (a) to (c) of FIG. 12).

The abnormality determining unit 111 determines whether or not the detection value of the secondary current falls outside of the allowable range during operation of the energy input circuit 109. When determined that the detection value of the secondary current falls outside of the allowable range, the abnormality determining unit 111 outputs a diagnostics signal IGf to the ECU 104. The diagnostics signal IGf indicates that the detection value of the secondary current has fallen outside of the allowable range.

In the description below, a function for determining whether or not the detection value of the secondary current has fallen outside of the allowable range may simply be referred to as a determining means.

Here, the abnormality determining unit 111 monitors whether the absolute value of the detection value of the secondary current becomes greater than the allowed upper limit HH or whether the absolute value of the detection value of the secondary current becomes less than the allowed lower limit LL, while the continued discharge signal IGw is being inputted (that is, time t03 in FIG. 11 and (a) to (c) of FIG. 12 correspond to a timing at which monitoring of the detection value of the secondary current by the abnormality determining unit 111 is started).

The abnormality determining unit 111 provides a function as the determining means, for example, based on the number of times per unit time (that is, the frequency by which) the detection value of the secondary current falls outside of the allowable range, or the length of time over which the detection value of the secondary current falls outside of the allowable range.

For example, when the detection value of the secondary current falls outside of the allowable range two times or more within a predetermined amount of time, the abnormality determining unit 111 determines that the detection value of the secondary current has fallen outside of the allowable range. In addition, when the detection value of the secondary current continuously falls outside of the allowable range over a predetermined amount of time, the abnormality determining unit 111 determines that the detection value of the secondary current has fallen outside of the allowable range.

Then, for example, the ECU 104 can take a following measure against the cylinder in which the detection value of the secondary current has fallen outside of the allowable range. That is, the ECU 104 can take a measure in which the output of the continued discharge signal IGw to the relevant cylinder is stopped, and spark discharge in the relevant cylinder is based only on the main ignition.

In addition, when input of the diagnostics signal IGf is received, the ECU 104 performs various publicly known processes and makes a warning display apparatus 101A perform a predetermined operation, thereby notifying the user of the abnormality. That is, when the abnormality determining unit 111 determines that the detection value of the secondary current has fallen outside of the allowable range, the warning display apparatus 101A functions as a notifying means for notifying the user of the determination as an abnormality.

In terms of control, the continued spark discharge is performed during an operating state, such as lean burn, in which the gas flow rate inside the cylinder is high and the occurrence of a blowout is possible. Therefore, when the determining means is performed when the occurrence of a blowout is possible, the detection value of the secondary current may become less than the allowed lower limit LL, regardless of a malfunction not having occurred, and may be determined to have fallen outside of the allowable range.

Therefore, the determining means is performed upon the energy input circuit 109 being intentionally operated and the continued spark discharge being generated, during idle operation after engine warmup, when the likelihood of a blowout occurring is low. Alternatively, the determining means is performed during an operating state in which, while the gas flow rate is high, the likelihood of a blowout occurring is not very high. As a result, a detection value abnormality of the second current accompanying blowout and a detection value abnormality of the second current accompanying the occurrence of a malfunction can be differentiated. The detection value abnormality of the secondary current accompanying the occurrence of a malfunction can be reliably detected.

In addition, as patterns in which the detection value of the secondary current falls outside of the allowable range, first to third aspects such as those below can be considered.

First, as shown in FIG. 12(*a*), a first aspect can be considered in which, regarding a waveform that indicates changes over time in the secondary current, the amplitude during an abnormality becomes greater compared to the amplitude during normal operation, and the detection value of the secondary current falls outside of the allowable range near the peak of the waveform. In this case, the abnormality determining unit 111 determines that the detection value of the secondary current has fallen outside of the allowable range based on the frequency by which the detection value of the secondary current falls outside of the allowable range. The first aspect is considered to occur when there is a delay in the control signal provided to the switching detects that an abnormality has occurred unit for input 124 from the driver circuit for input 125.

Next, as shown in FIG. 12 by (b), a second aspect can be considered in which, after a triangular wave accompanying the main ignition is generated, transition continues at zero. In this case, the abnormality determining unit 111 determines that the detection value of the secondary current has fallen outside of the allowable range based on the length of time over which the detection value of the secondary current falls outside of the allowable range. The second aspect is considered to occur when the control signal provided to the switching unit for input 124 from the driver circuit for input 125 is fixed to the OFF side.

Furthermore, as shown in FIG. 12 by (c), a third aspect can be considered in which, after the detection value of the secondary current exceeds the control upper limit H and further exceeds the allowed upper limit HH while the absolute value increases, after the main ignition is generated, the detection value of the secondary current reverses so as to decrease, thereby exceeding the allowed upper limit HH, further exceeding the control upper limit H, and returning to zero, while the absolute value decreases. In this case, the abnormality determining unit 111 determines that the detection value of the secondary current has fallen outside of the allowable range based on the length of time over which the detection value of the secondary current falls outside of the allowable range. The third aspect is considered to occur when the control signal provided to the switching unit for input 124 from the driver circuit for input 125 is fixed to the ON side.

In the ignition apparatus 101 according to the third embodiment, the abnormality determining unit 111 sets the allowable range for the detection value of the secondary current during operation of the energy input circuit 109, and determines whether or not the detection value of the secondary current has fallen outside of the allowable range. Consequently, the detection value of the secondary current being outside of the allowable range can be detected. As a result, an abnormality in the secondary current during operation of the energy input circuit 109 can be detected, and notification can be given to the ECU 104.

Furthermore, as a result of the ECU 104 performing various publicly known processes, the warning display apparatus 101A can notify the user of the abnormality. As a result, for example, the user can be prompted to send the vehicle to a dealer or the like for repairs, and further malfunctions can be prevented.

Fourth Embodiment

A fourth embodiment of the present invention will be described below with reference to FIG. 13 and FIG. 14. The fourth embodiment discloses a specific example. It goes without saying that the present invention is not limited to the fourth embodiment. Constituent elements that are identical or similar to those according to the third embodiment are given the same reference numbers. Descriptions thereof are omitted or simplified.

Figure 13:
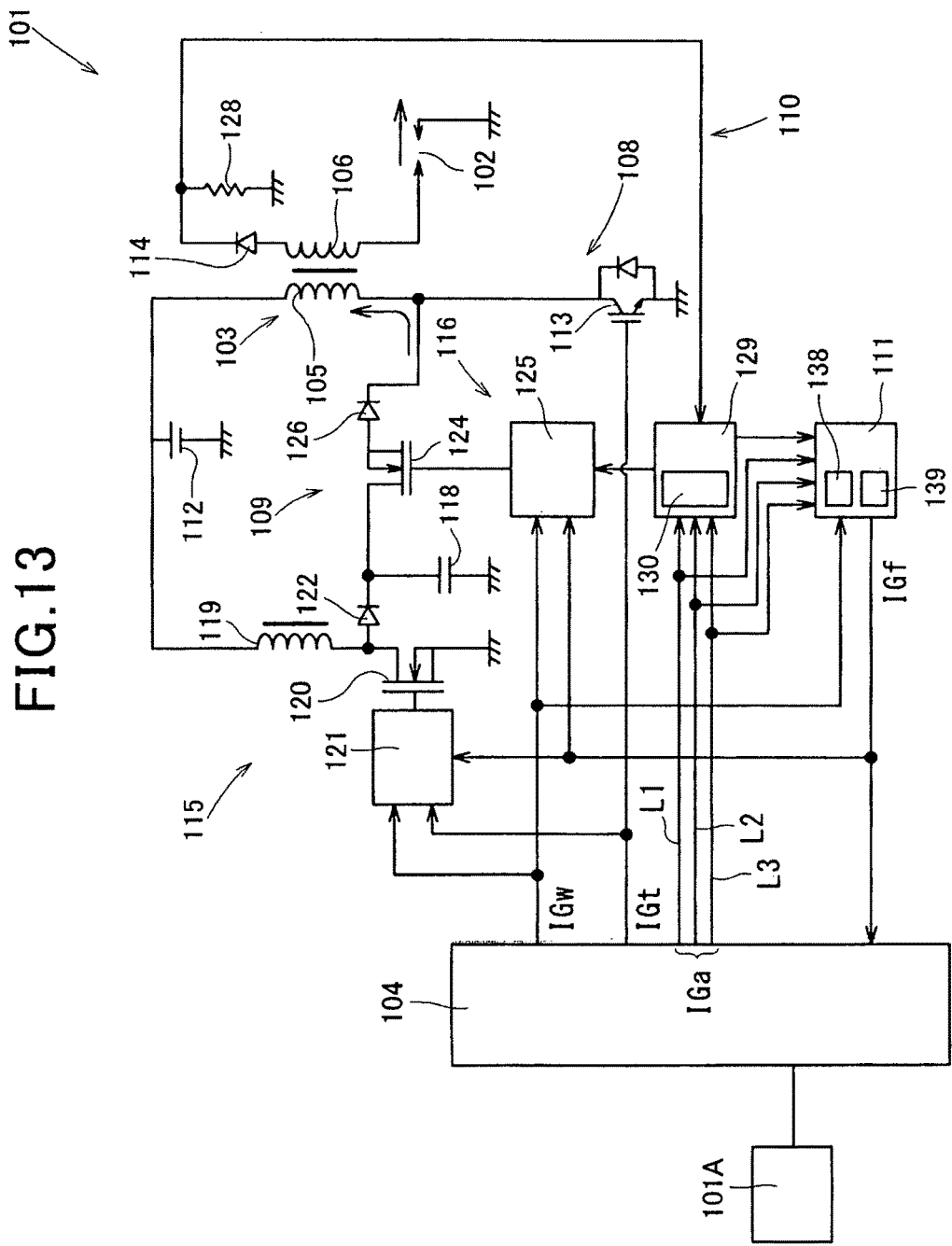
FIG. 13 is a configuration diagram of an ignition apparatus according to a fourth embodiment of the present invention.

As shown in FIG. 13, the ignition apparatus 101 according to the fourth embodiment receives input of a secondary current command signal IGa from the ECU 104. The secondary current command signal IGa indicates a command value of the secondary current. In addition, the ignition apparatus 101 is provided with a secondary current command circuit 130 in the current detection circuit 129. In addition, the current detection circuit 129 composites a feedback signal based on the result of a comparison between the command value of the secondary current outputted from the secondary current command circuit 130 and the detection value of the secondary current.

Here, the secondary current command signal IGa is outputted to the ignition apparatus 101 from the ECU 104 over three signal lines L1 to L3 that are separate from the signal lines over which the ignition signal IGt and the continued discharge signal IGw are outputted. In addition, the ECU 104 acquires engine parameters indicating the operating state of the internal combustion engine from various sensors and determines the command value of the secondary current based on the engine parameters. The ECU 104 then composites the secondary current command signal IGa and outputs the secondary current command signal IGa.

At this time, the ECU 104 selects a single numeric value among a plurality of numeric values set in advance as the command value of the secondary current, based on the engine parameters. In addition, the ECU 104 sets an aspect of the secondary current command signal IGa corresponding to each numeric value by combining the electric potentials (high/low) of the signal lines L1 to L3.

Figure 14:
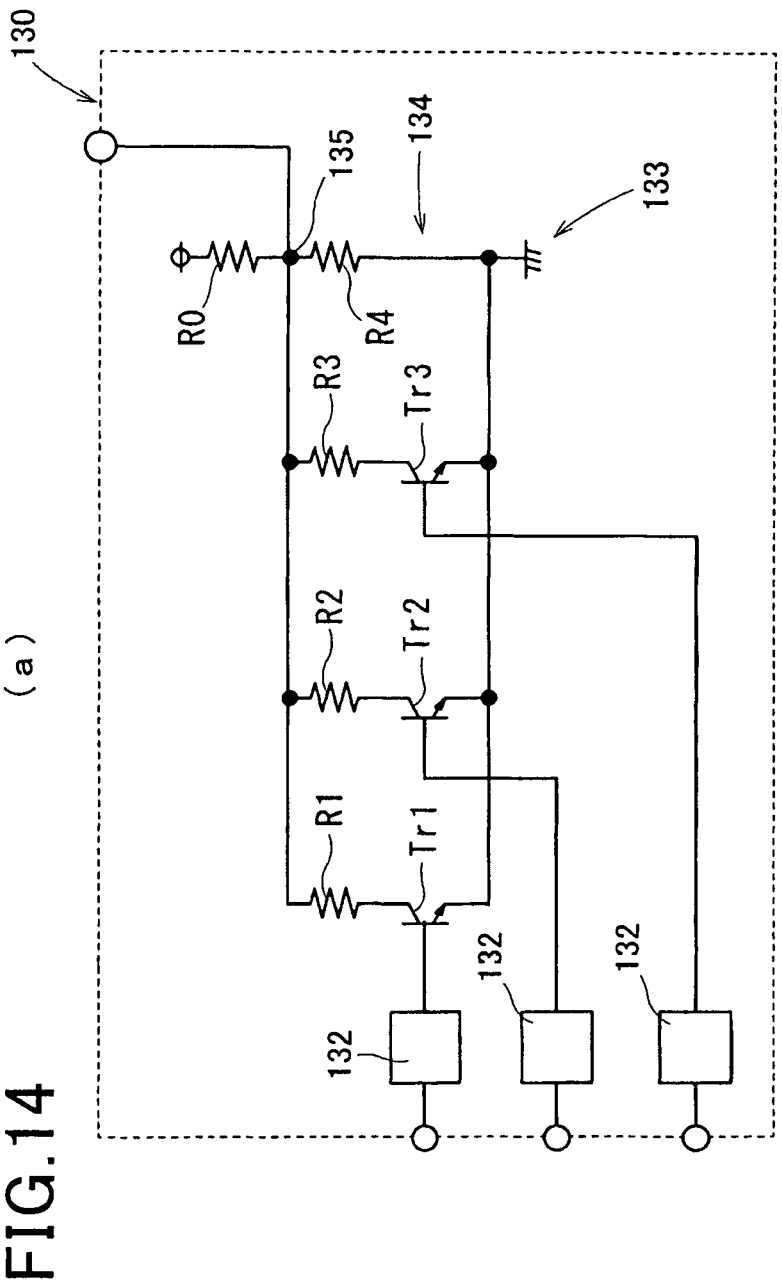
FIG. 14 illustrates diagrams, with (a) showing a configuration diagram of a secondary current command circuit, and with (b) showing a table indicating aspects of a secondary current command signal.
Figure 15:
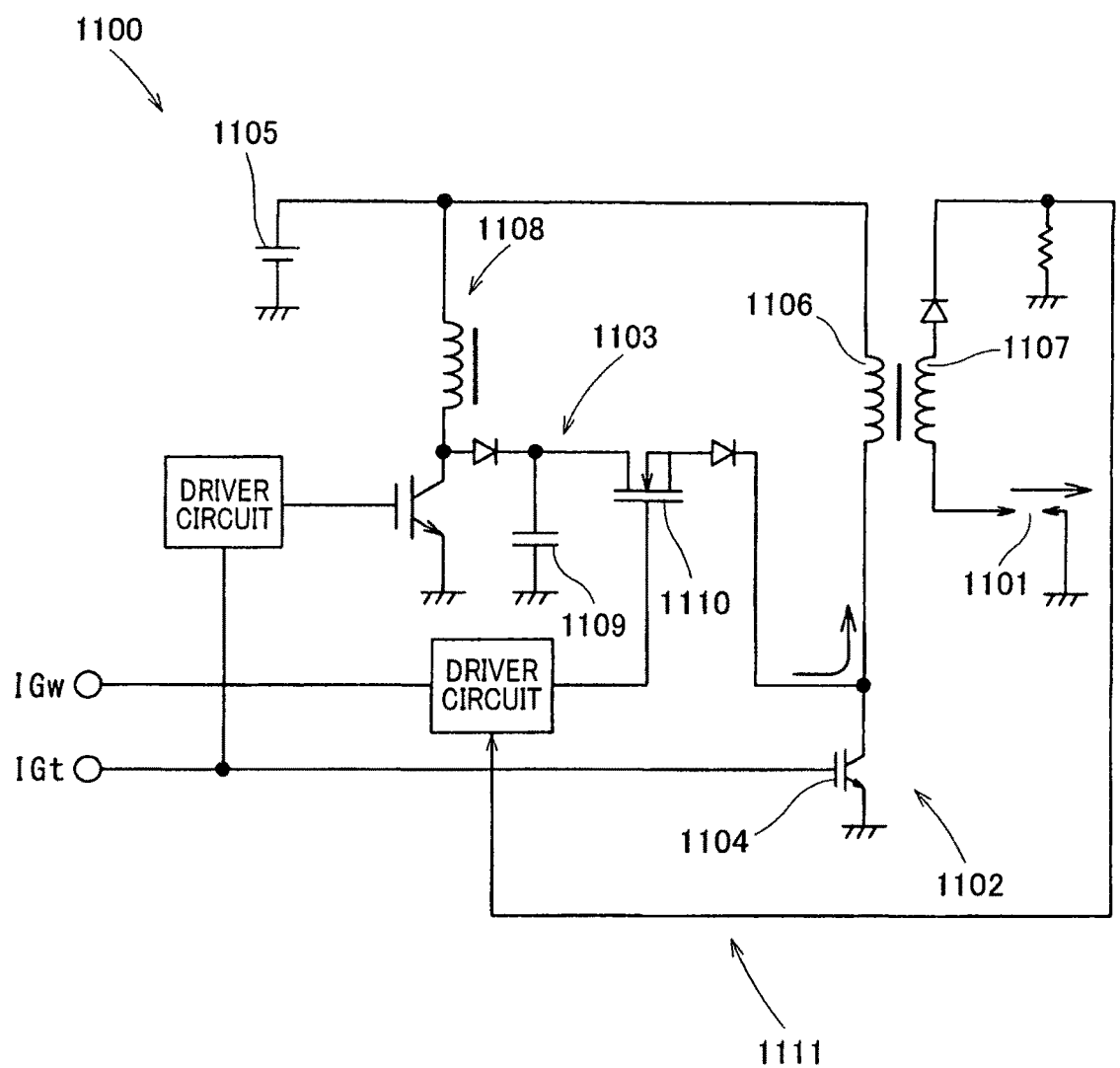
FIG. 15 is a configuration diagram of an ignition apparatus of a first reference example.

For example, the ECU 104 sets three numeric values, 200 mA, 150 mA, and 100 mA, as the command values of the secondary current (see (b) of FIG. 14). In this case, when 200 mA is selected as the command value of the secondary current, the aspect of the secondary current command value IGa is set to, for example, signal line L1: high, signal line L2: low, and signal line L3: low. When 150 mA is selected, the aspect of the secondary current command value IGa is set to signal line L1: low, signal line L2: high, and signal line L3: low. When 100 mA is selected, the aspect of the secondary current command value IGa is set to signal line L1: low, signal line L2: low, and signal line L3: high.

In addition, the secondary current command circuit 130 has three waveform forming units 132 and a command value output unit 133 (see (a) of FIG. 14). The waveform forming units 132 respectively remove noise from the logic signals on the signal lines L1 to L3. The command value output unit 133 outputs the electric potential based on the aspect of the secondary current command signal IGa. Here, in the command value output unit 133, a single resistor R0 and a parallel portion 134 in which four resistors R1 to R4 are parallel with each other are serially connected. The command value output unit 134 outputs the electric potential at a connecting portion 135 between the resistor R0 and the parallel portion 134 as the command value.

That is, of four branches provided in parallel in the parallel portion 134, switching elements Tr1 to Tr3 are respectively assembled in the branches in which the resistors R1 to R3 are assembled. In addition, the switching elements Tr1 to Tr3 are also respectively assembled in series with the resistors R1 to R3. Furthermore, the switching elements Tr1 to Tr3 are, for example, bipolar transistors. The high/low of the signal lines L1 to L3 are inputted, without being logically transformed, to the respective bases of the switching elements Tr1 to Tr3. The switching elements Tr1 to Tr3 are turned ON/OFF based on the high/low states of the signal lines L1 to L3.

As a result, the composite resistance of the parallel portion 134 changes among three numeric values based on the high/low of the signal lines L1 to L3. Therefore, the electric potential at the connecting portion 135 also changes among three numeric values based on the high/low of the signal lines L1 to L3. Therefore, the secondary current command circuit 130 can select the command value of the secondary current from among 200 mA, 150 mA, and 100 mA, based on the aspect of the secondary current command signal IGa, and output the selected command value of the secondary current.

In addition, in the ignition apparatus 101 according to the fourth embodiment, the abnormality determining unit 111 changes the allowable range based on the command value of the secondary current. That is, the abnormality determining unit 111 has an allowed upper limit command circuit 138 and an allowed lower limit command circuit 139 that respectively output the allowed upper limit HH and the allowed lower limit LL (see FIG. 13). In addition, the allowed upper limit command circuit 138 and the allowed lower limit command circuit 139 both have circuit configurations similar to that of the secondary current command circuit 130, and receive input of the secondary current command signal IGa over the signal lines L1 to L3.

The allowed upper limit command circuit 138 selects the allowed upper limit HH from among three numeric values respectively corresponding to the command values 200 mA, 150 mA, and 100 mA, based on the high/low of the signal lines L1 to L3. In a similar manner, the allowed lower limit command circuit 139 selects the allowed lower limit LL from among three numeric values respectively corresponding to the command values 200 mA, 150 mA, and 100 mA, based on the high/low of the signal lines L1 to L3.

As a result of the foregoing, in the ignition apparatus 101 according to the fourth embodiment, the abnormality determining unit 111 can change the allowable range based on the command value of the secondary current. Consequently, erroneous determination accompanying changes in the command value can be prevented.

Variation Examples

According to the third and fourth embodiments described above, the above-described first to third aspects are given as examples of the patterns in which the detection value of the secondary current falls outside of the allowable range. However, the patterns in which the detection value of the secondary current falls outside of the allowable range are not limited to the first to third aspects, and various other aspects can be considered. Therefore, the ignition apparatus 101 is capable of detecting the detection value abnormality of the secondary current through aspects other than the first to third aspects as well.

The secondary current command circuit according to the fourth embodiment, described above, receives input of the secondary current command signal IGa over the three signal lines L1 to L3, and selects a single numeric value from among three differing numeric values, thereby ascertaining the command value of the secondary current. However, the secondary current command circuit may receive input of the secondary current command signal IGa over two, or four or more, signal lines. The secondary current command circuit may select a single numeric value from among four or more differing numeric values, thereby ascertaining the command value of the secondary current. Furthermore, the secondary current command circuit may receive input of the secondary current command signal IGa over a single signal line. In this case, the secondary current command circuit can select either numeric value of two numeric values, as the command value of the secondary current, from the high/low of the single signal line.

An example is given in which the ignition apparatus 101 according to the third and fourth embodiments, described above, is used in a gasoline engine. However, the ignitability of fuel (specifically, the air-fuel mixture) can be improved by the continued spark discharge. Therefore, the ignition apparatus 101 may also be applied to an engine that uses ethanol fuel or blended fuel. In addition, even should the ignition apparatus 101 be used in an engine that may use low-grade fuel, ignitability can be improved by continued spark discharge.

An example is given in which the ignition apparatus 101 according to the third and fourth embodiments, described above, is used in an engine that is capable of lean burn (lean burn) operation. However, ignitability can be improved by the continued spark discharge even in a combustion state other than lean burn. Therefore, the ignition apparatus 101 is not limited to application to an engine capable of performing lean burn, and may be used in an engine that does not perform lean burn.

An example is given in which the ignition apparatus 101 according to the third and fourth embodiments, described above, is used in a direct injection-type engine that directly injects fuel into the combustion chamber. However, the ignition apparatus 101 may also be used in a port injection-type engine that injects fuel into an intake-air upstream side of the intake valve (within the intake port).

An example is disclosed in which the ignition apparatus 101 according to the third and fourth embodiments, described above, is used in an engine that actively generates a rotational flow (such as a tumble flow or a swirl flow) of the air-fuel mixture inside the cylinder. However, the ignition apparatus 101 may be used in an engine that does not have the rotational flow control means (such as a tumble flow control valve or a swirl flow control valve).

Fifth Embodiment

A fifth embodiment of the present invention will be described below with reference to FIG. 16 to FIG. 20. The fifth embodiment discloses a specific example. It goes without saying that the present invention is not limited to the fifth embodiment.

Figure 16:
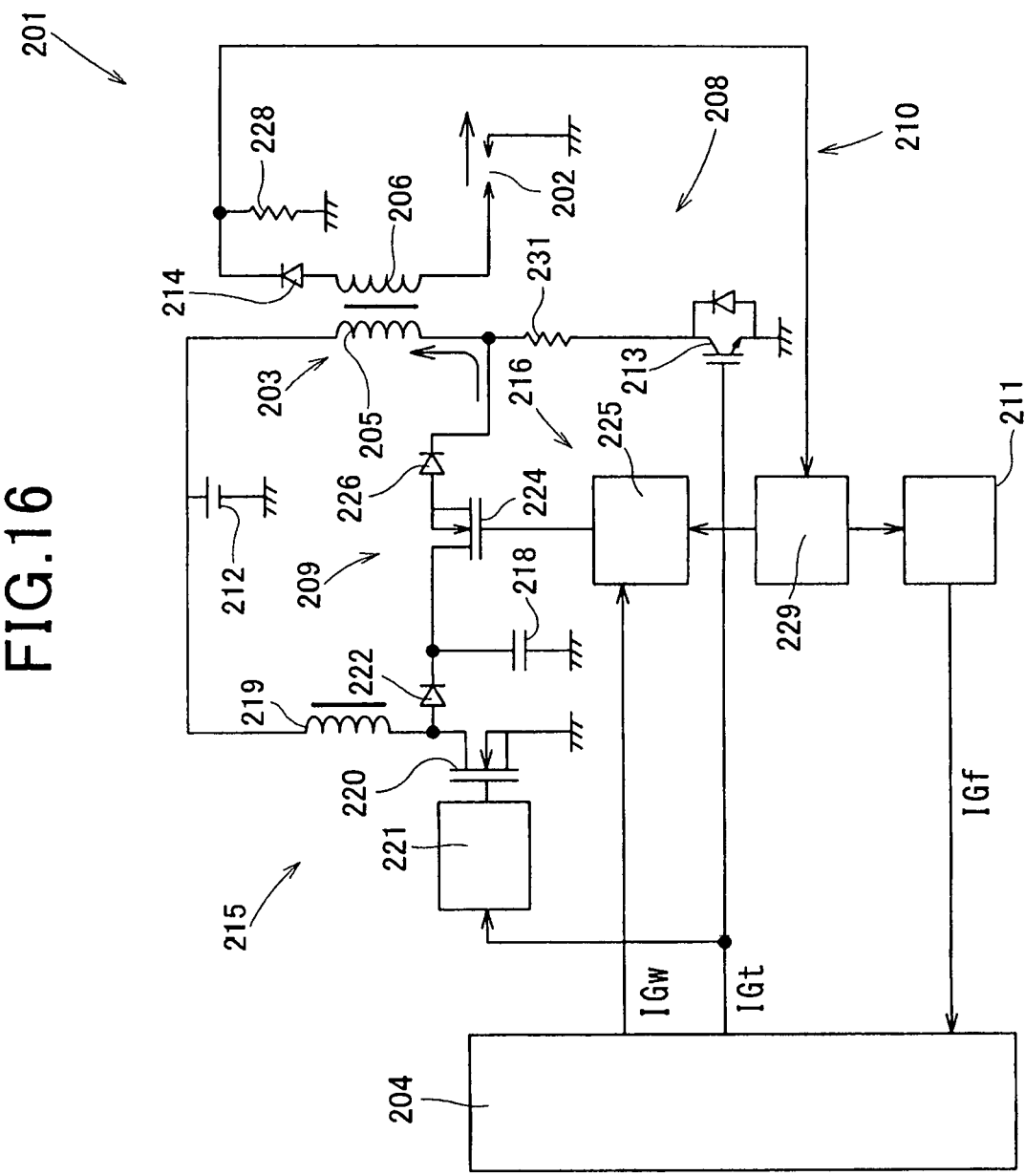
FIG. 16 is a configuration diagram of an ignition apparatus according to a fifth embodiment of the present invention.

An ignition apparatus 201 according to the fifth embodiment will be described with reference to FIG. 16.

The ignition apparatus 201 is mounted in a spark-ignition engine for vehicle driving. The ignition apparatus 101 ignites an air-fuel mixture inside a combustion chamber at a predetermined ignition timing. An example of the engine is a direct injection-type engine that uses gasoline as fuel and is capable of performing lean burn (lean burn). The engine includes a rotational flow control means that generates rotational flow of the air-fuel mixture, such as a tumble flow or a swirl flow, inside the cylinder. In an operating state in which a gas flow rate inside the cylinder is high and the occurrence of a blowout of the spark discharge is possible, such as in lean burn, the ignition apparatus 201 is controlled to perform continued spark discharge following the main ignition.

In addition, the ignition apparatus 201 is a direct ignition (DI) type that uses an ignition coil 203 corresponding to a spark plug 202 of each cylinder.

Furthermore, the ignition apparatus 201 controls energization of a primary coil 205 of the ignition coil 203 based on an ignition signal IGt, a continued discharge signal IGw, and the like provided by an electronic control unit (referred to, hereafter, as an ECU 204) that serves as the core of engine control. The ignition apparatus 201 manipulates electrical energy that is generated in a secondary coil 206 of the ignition coil 203 by performing energization control of the primary coil 205, and controls spark discharge of the spark plug 202.

Here, the ECU 2104 receives input of signals from various sensors that are mounted in the vehicle and detect parameters (such as a heater state, engine rotation speed, engine load, presence of a lean-burn state, and degree of rotational flow) indicating the operating state and the control state of the engine. In addition, the ECU 204 is configured to include an input circuit, a CPU, various memories, an output circuit, and the like. The input circuit processes inputted signals. The CPU performs control processes and calculation processes related to engine control based on the inputted signals. The various memories store and hold data, programs, and the like required for engine control. The output circuit outputs signals required for engine control based on the processing results from the CPU. The ECU 204 then generates the ignition signal IGt and the continued discharge signal IGw based on the engine parameters acquired from the various sensors, and outputs the generated ignition signal IGt and continued discharge signal IGw.

The ignition apparatus 201 according to the fifth embodiment is configured to include a main ignition circuit 208, an energy input circuit 209, a feedback circuit 210, and an abnormality determining unit 211. The main ignition circuit 208 generates a main ignition based on full-tra. The energy input circuit 209 continues, as continued spark discharge, the spark discharge generated as the main ignition by performing additional input of electrical energy. The feedback circuit 210 detects the secondary current and gives feedback to the energy input circuit 209. The abnormality determining unit 211 performs abnormality determination of the ignition apparatus 201.

The main ignition circuit 208, the energy input circuit 209, the feedback circuit 210, and the abnormality determining unit 211 are arranged so as to be housed inside a single case as an ignition circuit unit. The spark plug 202, the ignition coil 203, and the ignition circuit unit are provided in the same quantity as the number of cylinders, and are provided for each cylinder.

The spark plug 202 has a known structure. The spark plug 202 includes a center electrode and a ground electrode. The center electrode is connected to one end of the secondary coil 206. The ground electrode is grounded to the earth via a cylinder head of the engine or the like. The spark plug 202 generates spark discharge between the center electrode and the ground electrode by electrical energy generated in the secondary coil 206.

The ignition coil 203 has the primary coil 205 and the secondary coil 206. The ignition coil 203 has a known structure that generates a current (secondary current) in the secondary coil 206 by electromagnetic induction, based on increase and decrease of a current (primary current) flowing through the primary coil 205.

One end of the primary coil 205 is connected to a positive electrode of an on-board battery 212. The other end of the primary coil 205 is grounded to the earth via a switching unit for ignition (corresponding to a switching means for ignition) 213 of the main ignition circuit 208. Furthermore, the energy input circuit 209 is connected to the other end of the primary coil 205 in parallel with the line that is grounded to the earth via the switching unit for ignition 213.

As described above, one end of the secondary coil 206 is connected to the center electrode of the spark plug 202. The other end of the secondary coil 206 is connected to the feedback circuit 210. The other end of the secondary coil 206 is connected to the feedback circuit 210 via a first diode 214 that restricts the direction of the secondary current to a single direction.

The main ignition circuit 208 accumulates energy in the primary coil 205 by the switching element for ignition 213 being turned ON and OFF. In addition, the main ignition circuit 208 generates a high voltage in the secondary coil 206 using the energy accumulated in the primary coil 205 and generates a main ignition in the spark plug 202.

More specifically, the main ignition circuit 208 includes the switching unit for ignition 213 that continues and interrupts the energization state of the primary coil 205. As a result of the switching unit for ignition 213 being turned ON during a period over which the ECU 204 provides the ignition signal IGt, the main ignition circuit 208 applies the voltage of the on-board battery 212 to the primary coil 205 and sends a positive primary current, thereby accumulating magnetic energy in the primary coil 205. Subsequently, as a result of the switching unit for ignition 213 being turned OFF, the main ignition circuit 208 converts the magnetic energy to electrical energy by electromagnetic induction, generates a high voltage in the secondary coil 206, and generates the main ignition.

The switching unit for ignition 213 is a power transistor, a MOS-type transistor, or the like. In addition, the ignition signal IGt is a signal commanding the period over which magnetic energy is accumulated in the primary coil 205 and the ignition start timing in the main ignition circuit 208.

The energy input circuit 209 is configured to include a booster circuit 215 and an input energy control unit (corresponding to an input energy control means) 216 as follows.

First, the booster circuit 215 boosts the voltage of the on-board battery 212 during the period over which the ECU 204 provides the ignition signal IGt, and accumulates electrical energy in a capacitor 218.

Next, the input energy control unit 216 inputs the electrical energy accumulated in the capacitor 218 to a negative side (ground side) of the primary coil 205.

The booster circuit 215 is configured to include, in addition to the capacitor 218, a choke coil 219, a boost switching unit (corresponding to a boost switching means) 220, a boost driver circuit 221, and a second diode 222. The boost switching unit 220 is, for example, an MOS-type transistor.

Here, one end of the choke coil 219 is connected to a positive electrode of the on-board battery 212. The energization state of the choke coil 219 is continued and interrupted by the boost switching unit 220. In addition, the boost driver circuit 221 turns ON and OFF the boost switching unit 220 by providing the boost switching unit 220 with a control signal. As a result of the ON/OFF operation of the boost switching unit 220, electrical energy is charged in the capacitor 218 by the magnetic energy accumulated in the choke coil 219.

The boost driver circuit 221 is provided to repeatedly turn ON and OFF the boost switching unit 220 at a predetermined cycle, during the period over which the ECU 204 provides the ignition signal IGt.

In addition, the second diode 222 prevents backflow of the electrical energy accumulated in the capacitor 218 towards the choke coil 219 side.

The input energy control unit 216 is configured to include a following switching unit for input (corresponding to a switching means for input) 224, a driver circuit for input 225, and a third diode 226. The switching unit for input 224 is, for example, a MOS-type transistor.

Here, the switching unit for input 224 turns ON and OFF the input of electrical energy accumulated in the capacitor 218 to the primary coil 205 from the negative side. The driver circuit for input 225 turns ON and OFF the switching unit for input 224 by providing the switching unit for input 224 with a control signal.

The driver circuit for input 225 maintains the secondary current at a predetermined value during the period over which the continued discharge signal IGw is provided, by controlling the electrical energy inputted to the primary coil 205 from the capacitor 218 by turning ON and OFF the switching unit for input 224. Here, the continued discharge signal IGw is a signal commanding the period over which the continued spark discharge is continued. More specifically, the continued discharge signal IGw is a signal commanding the period over which the switching unit for input 224 is repeatedly turned ON and OFF and electrical energy is inputted to the primary coil 205 from the booster circuit 215.

The third diode 226 prevents backflow of current from the primary coil 205 to the capacitor 218.

The feedback circuit 210 detects the secondary current and gives feedback to the input energy control unit 216 of the energy input circuit 209.

Here, the feedback circuit 210 is provided with a secondary current detection resistor 228 and a current detection circuit 229. The secondary current detection resistor 228 serves as a secondary current detecting means that detects the secondary current. The current detection circuit 229 composites a feedback signal and outputs the feedback signal. A detection value of the secondary current is converted to voltage by the secondary current detection resistor 228 and outputted to the current detection circuit 229. In addition, for example, upper limit and lower limit thresholds for the secondary current are set in the current detection circuit 229. A feedback signal based on a comparison of the detection value with the upper limit and lower limit thresholds is composited and outputted to the driver circuit for input 225.

The abnormality determining unit 211 determines whether or not an abnormality has occurred based on the detection value of the secondary current, for example, when the detection value of the secondary current falls outside of the upper-limit and lower-limit range in the current detection circuit 229. When determined that an abnormality has occurred, the abnormality determining unit 211 outputs a diagnostics signal IGf to the ECU 204. For example, as the determination of whether or not an abnormality has occurred, the abnormality determining unit 211 determines whether or not the main ignition is being generated in a normal manner and whether or not the continued spark discharge is generated in a normal manner (refer to the characteristic configuration according to the fifth embodiment, described hereafter).

Next, an operation of the ignition apparatus 201 during a normal operation will be described with reference to FIG. 17.

Figure 17:
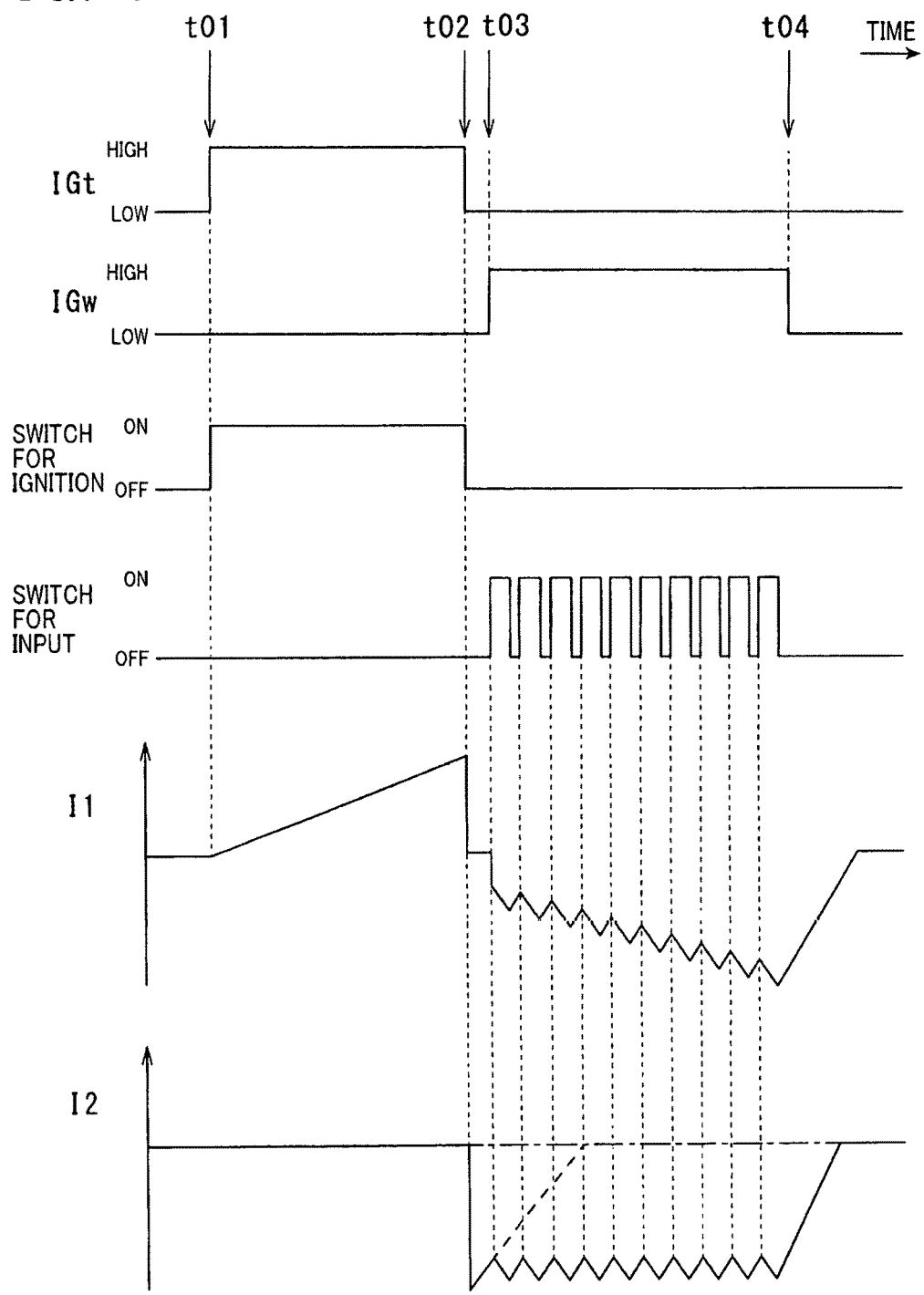
FIG. 17 is a time chart of an operation of the ignition apparatus according to the fifth embodiment.

In FIG. 17, IGt indicates the input state of the ignition signal IGt by high/low. IGw indicates the input state of the continued discharge signal IGw by high/low. In addition, switch for ignition and switch for input respectively indicate the ON/OFF of the switching unit for ignition 213 and the switching unit for input 224. I1 indicates the primary current (the value of the current flowing to the primary coil 205), and I2 indicates the secondary current (the value of the current flowing to the secondary coil 206).

When the ignition signal IGt changes from low to high (see time t01), the switching unit for ignition 213 maintains the ON state during the period over which the ignition signal IGt is held high, and a positive primary current flows. Magnetic energy is accumulated in the primary coil 205. In addition, a boosting operation is performed by the boost switching unit 220 being repeatedly turned ON and OFF. The boosted electrical energy is accumulated in the capacitor 218.

When the ignition signal IGt eventually changes from high to low (see time t02), the switching unit for ignition 213 is turned OFF. The energization state of the primary coil 205 is suddenly interrupted. As a result, the magnetic energy accumulated in the primary coil 205 is converted to electrical energy. A high voltage is generated in the secondary coil 206, and the main ignition is started in the spark plug 202.

After the main ignition is started in the spark plug 202, the secondary current attenuates in the manner of a substantially triangular waveform (see the dotted line of 12). Before the secondary current reaches the lower limit threshold, the continued discharge signal IGw changes from low to high (see time t03).

When the continued discharge signal IGw changes from low to high, ON/OFF control of the switching unit for input 224 is performed. The electrical energy accumulated in the capacitor 218 is successively inputted to the negative side of the primary coil 205. The primary current flows from the primary coil 205 towards the positive electrode of the on-board battery 212. More specifically, each time the switching unit for input 224 is turned ON, the primary current from the primary coil 205 towards the positive electrode of the on-board battery 212 is added, and the primary current increases towards the negative side (see time t03 to t04).

Each time the primary current is added, the secondary current in the same direction as that of the secondary current resulting from the main ignition is successively added to the secondary coil 206. The secondary current is maintained within a predetermined range.

As a result of the foregoing, the second current continuously flows to an extent that spark discharge can be maintained, through ON/OFF control of the switching unit for input 224. As a result, when the ON state of the continued discharge signal IGw continues, continued spark discharge is maintained in the spark plug 202.

Next, a characteristic configuration according to the fifth embodiment will be described.

The ignition apparatus 201 includes the following malfunction determining means (abnormality determining means 211) and energy input stopping means (ECU 204) to operate the engine while suppressing deterioration of fuel efficiency to the greatest possible extent, when a malfunction occurs in the energy input circuit 209.

First, the malfunction determining means is a function for determining whether or not a malfunction has occurred in the energy input circuit 209, based on changes over time in the secondary current during the period over which the energy input circuit 209 is performing energization control of the primary coil 205. The malfunction determining means is mainly performed by the abnormality determining unit 211.

In addition, the energy input stopping means is a function for stopping the operation of the energy input circuit 209 of the cylinder in which a malfunction has been determined to have occurred by the malfunction determining means. The energy input stopping means is mainly performed by the ECU 204.

Figure 18:
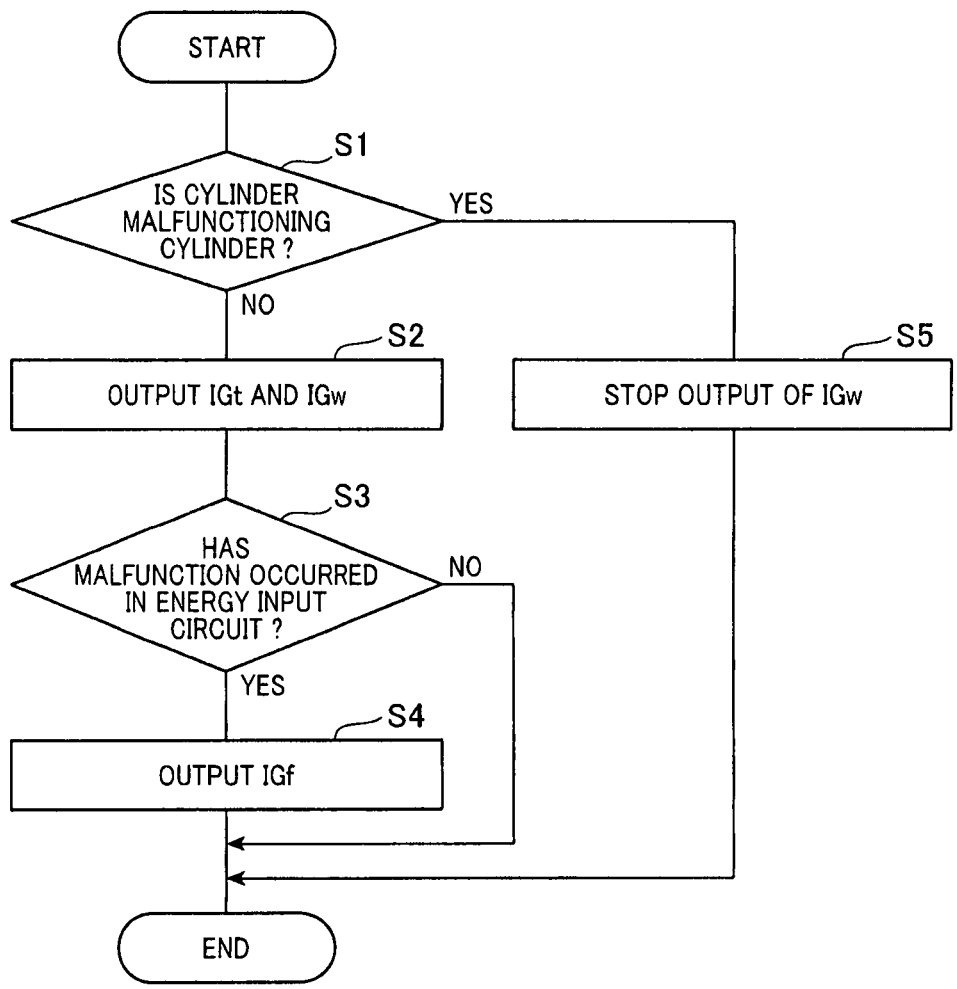
FIG. 18 is a flowchart of a control flow including steps of a malfunction determining means and an energy input stopping means of the ignition apparatus according to the fifth embodiment.

A control flow including steps of the malfunction determining means and the energy input stopping means will be described below with reference to FIG. 18. The control flow in FIG. 18 is performed when the continued spark discharge is performed following the main ignition, as during lean burn.

First, at step S1, the ECU 204 determines whether or not the cylinder in which ignition is to be performed is a malfunctioning cylinder, or in other words, determines whether or not the cylinder is a cylinder determined by the malfunction determining means to be that in which an abnormality has occurred in the energy input circuit 209. As a result, when determined that the cylinder is not a malfunctioning cylinder (NO at step S1), the ECU 204 proceeds to step S2. When determined that the cylinder is a malfunctioning cylinder (YES at step S1), the ECU 204 proceeds to step S5.

Next, at step S2, the ECU 204 outputs the ignition signal IGt and the continued discharge signal IGw, and operates the ignition apparatus 201. Then, at step S3, the ECU 204 determines whether or not a malfunction has occurred in the energy input circuit 209 based on the changes over time in the secondary current (that is, step S3 corresponds to the malfunction determining means.). This determination is made by the abnormality determining unit 211 determining whether or not the continued spark discharge is generated in a normal manner.

Here, as shown in FIG. 19 by (a) to (c), the abnormality determining unit 211 provides a function for determining whether or not the main ignition and the continued spark discharge are both generated in a normal manner.

For example, the abnormality determining unit 211 determines whether or not the main ignition is generated in a normal manner based on whether or not the detection value of the secondary current is greater towards the negative side than a predetermined threshold α, at a predetermined timing to counted from when the ignition signal IGt is set to OFF. That is, the abnormality determining unit 211 determines that the main ignition is generated in a normal manner when the detection value of the secondary current is greater towards the negative side than the threshold α at the timing ta.

In addition, the abnormality determining unit 211 determines whether or not the continued spark discharge is generated in a normal manner based on whether or not the detection value of the secondary current is greater towards the negative side than a predetermined threshold β, at a predetermined timing tb that is later than the timing ta in terms of time. That is, the abnormality determining unit 211 determines that the continued spark discharge is generated in a normal manner when the detection value of the secondary current is greater towards the negative side than the threshold β at the timing tb. The threshold β is set to be a value that is greater than the threshold α towards the negative side.

Then, when determined that the continued spark discharge is not generated in a normal manner, at step S3, the ECU 204 determines that a malfunction has occurred in the energy input circuit 209 (YES at step S3) and proceeds to step S4. In addition, when determined that the continued spark discharge is generated in a normal manner, at step S3, the ECU 204 determines that a malfunction has not occurred in the energy input circuit 209 (NO at step S3) and ends the control flow. When the main ignition is determined to not be generated in a normal manner, processing is performed based on a separate control flow.

Next, at step S4, the abnormality determining unit 211 outputs the diagnostics signal IGf to the ECU 204. The diagnostics signal IGf indicates that the continued spark discharge is not generated in a normal manner. As a result, the ECU 204 ascertains the cylinder in which the continued spark discharge is not generated in a normal manner, and subsequently repeats the control flow with the relevant cylinder as the malfunctioning cylinder. That is, the ECU 204 changes the ignition timing, fuel injection amount, and the like of the relevant cylinder to values based on the full-transistor of the main ignition circuit 208, and stops the output of the continued discharge signal IGw to the relevant cylinder.

Figure 20:
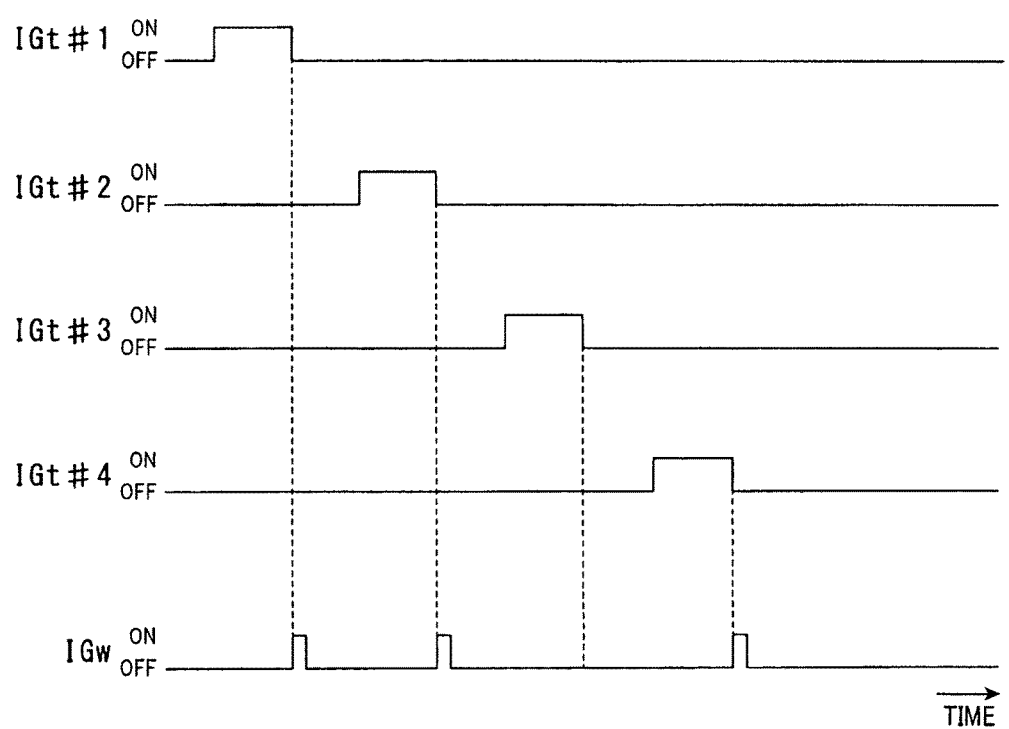
FIG. 20 is a time chart of ON/OFF switching of an ignition signal IGt and a continued discharge signal IGw when a malfunction occurs in an energy input circuit in one cylinder of a four-cylinder engine according to the fifth embodiment.
Figure 21:
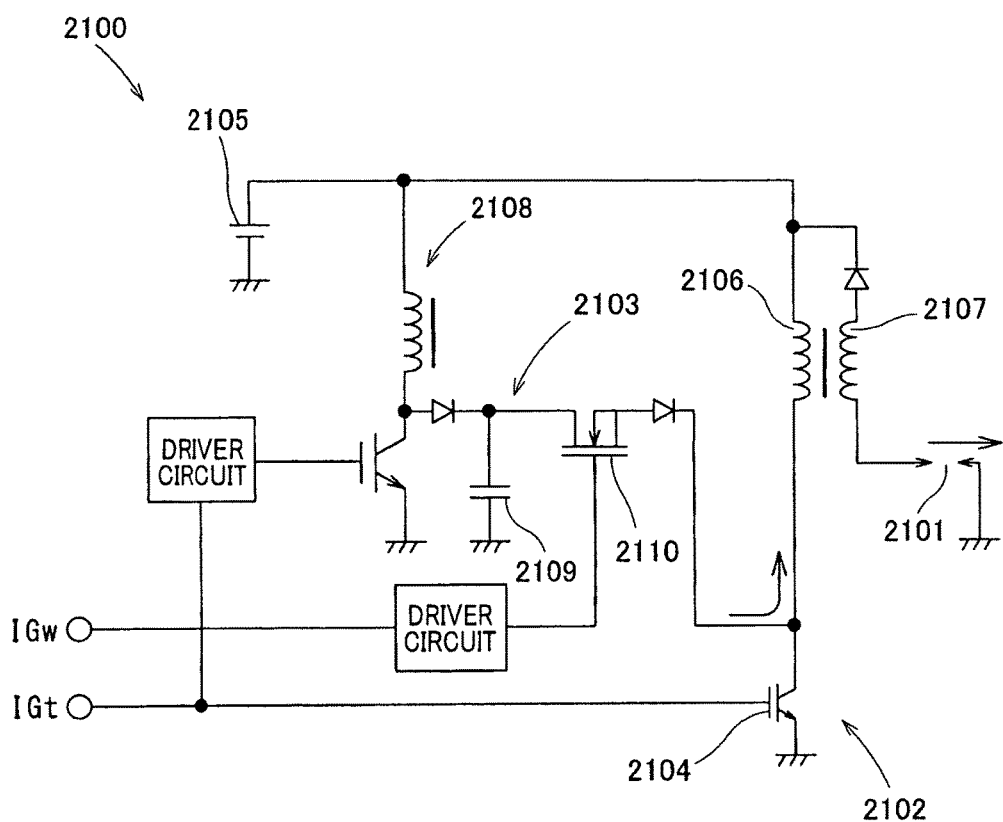
FIG. 21 is a configuration diagram of an ignition apparatus of a second reference example.

Therefore, for example, when the engine has four cylinders, from #1 to #4, and a malfunction has occurred in the energy input circuit 209 of the cylinder #3, as shown in FIG. 20, the continued discharge signal IGw is not set to ON after the ignition signal IGt is set to OFF in the cylinder #3, in subsequent ignition control.

Step S5 is a process performed when the cylinder is determined to be a malfunctioning cylinder at step S1. At step S5, the ECU 204 outputs the ignition signal IGt and stops the output of the continued discharge signal IGw. Therefore, when the ECU 204 proceeds to step S5, only the main ignition circuit 208 operates and the energy input circuit 209 does not operate, regardless of whether or not the continued spark discharge is required.

In the ignition apparatus 201 according to the fifth embodiment, the malfunction determining means determines whether or not a malfunction has occurred in the energy input circuit 209 based on the changes over time in the secondary current during the period over which the energy input circuit 209 is performing energization control of the primary coil 205. Furthermore, the energy input stopping means stops operation of the energy input circuit 209 of the cylinder determined by the malfunction determining means to be that in which a malfunction has occurred.

As a result, in the cylinder in which the energy input circuit 209 has malfunctioned, at least the main ignition can be generated. In addition, in the cylinder in which the energy input circuit 209 is not malfunctioning, the continued spark discharge is possible and lean burn is possible as a result of the continued spark discharge being performed. Therefore, in the ignition apparatus 201, when a malfunction occurs in the energy input circuit 209, the engine can be operated while suppressing deterioration of fuel efficiency to the greatest possible extent.

Variation Examples

In the energy input stopping means according to the fifth embodiment, described above, the abnormality determining unit 211 of the malfunctioning cylinder outputs the diagnostics signal IGf to the ECU 204. In addition, the output of the continued discharge signal IGw to the malfunctioning cylinder from the ECU 204 is also stopped. However, the energy input stopping means is not limited to such an aspect.

For example, the energy input circuit 209 may be made not to operate even when the continued discharge signal IGw is inputted on the side of the ignition apparatus 201, while maintaining the output of the continued discharge signal IGw to the malfunctioning cylinder from the ECU 204. In this case, the ignition apparatus 201 may notify the ECU 204 that the energy input circuit 209 is not operating.

An example is given in which the ignition apparatus 201 according to the fifth embodiment, described above, is used in a gasoline engine. However, the ignitability of the air-fuel mixture can be improved by the continued spark discharge. Therefore, the ignition apparatus 201 may also be applied to an engine that uses ethanol fuel or blended fuel. In addition, even should the ignition apparatus 201 be used in an engine that may use low-grade fuel, ignitability can be improved by continued spark discharge.

An example is given in which the ignition apparatus 201 according to the fifth embodiment, described above, is used in an engine that is capable of lean burn (lean burn) operation. However, ignitability can be improved by the continued spark discharge even in a combustion state other than lean burn. Therefore, the ignition apparatus 201 is not limited to application to an engine capable of performing lean burn, and may be used in an engine that does not perform lean burn.

An example is given in which the ignition apparatus 201 according to the fifth embodiment, described above, is used in a direct injection-type engine that directly injects fuel into the combustion chamber. However, the ignition apparatus 201 may also be used in a port injection-type engine that injects fuel into an intake-air upstream side of the intake valve (within the intake port).

An example is disclosed in which the ignition apparatus 201 according to the fifth embodiment, described above, is used in an engine that actively generates a rotational flow (such as a tumble flow or a swirl flow) of the air-fuel mixture inside the cylinder. However, the ignition apparatus 201 may be used in an engine that does not have the rotational flow control means (such as a tumble flow control valve or a swirl flow control valve).

The ignition apparatus 201 according to the fifth embodiment, described above, is applied to a DI-type ignition apparatus. However, the ignition apparatus 201 may be applied to a distributor type that supplies each spark plug 202 with a secondary voltage by distribution, or a single-cylinder engine (such as a motorcycle) that does not require distribution of a secondary voltage.

REFERENCE SIGNS LIST

10: control apparatus
11: ignition apparatus
12: power supply
20: engine (internal combustion engine)
28: combustion chamber
40: spark plug
50: ignition coil
51: primary coil
52: secondary coil
60: igniter unit
70: energy input unit 81: control unit (discharge control means, energy input control means, normal ignition control means, specific ignition control means, abnormality detecting means)
82: discharge control unit (discharge control means)
83: energy input control unit (energy input control means)
84: normal ignition control unit (normal ignition control means)
85: specific ignition control unit (specific ignition control means)
91: current detection circuit (current detecting means)
93: abnormality detecting unit (abnormality detecting means)
101: ignition apparatus
102: spark plug
103: ignition coil
105: primary coil
106: secondary coil
108: main ignition circuit
109: energy input circuit
128: secondary current detection resistor (secondary current detecting means)
201: ignition apparatus
202: spark plug
203: ignition coil
204: ECU (energy input stopping means)
205: primary coil
206: secondary coil
208: main ignition circuit
209: energy input circuit
211 abnormality determining unit (malfunction determining means)
228 secondary current detection resistor (secondary current detecting means)

What is claimed is:

1. A control apparatus for controlling an ignition apparatus,
the ignition apparatus including:
a spark plug that is provided to a combustion chamber of an internal combustion engine and is capable of igniting an air-fuel mixture in the combustion chamber by generating electric discharge;
an ignition coil that has a primary coil of which one end is connected to a power supply side and another end is connected to a ground side, and a secondary coil of which one end is connected to the spark plug;
an igniter unit that is provided to be capable of allowing or blocking a current flowing from the primary coil towards the ground side; and
an energy input unit that is capable of inputting electrical energy to the ignition coil,
the control apparatus being capable of controlling ignition of an air-fuel mixture in the combustion chamber,
the control apparatus comprising:
a control unit that is capable of controlling the ignition of the air-fuel mixture in the combustion chamber;
a current detecting means that is capable of detecting a current flowing through the secondary coil; and
an abnormality detecting means that is capable of detecting an abnormality in the ignition apparatus based on a current value that is a value corresponding to the current detected by the current detecting means,
the control unit including:
a discharge control means for controlling the igniter unit so as to block a flow of current from the primary coil towards the ground side when an ignition signal to the igniter unit changes from on to off, thereby generating a high voltage in the secondary coil, and controlling the spark plug so that the spark plug generates electric discharge; and
an energy input control means for controlling the energy input unit to input electrical energy to the ignition coil after start of control of the spark plug by the discharge control means,
the abnormality detecting means detecting an abnormality in the igniter unit or the ignition coil based on a first threshold, and a first current value that is a value corresponding to a current detected by the current detecting means at a time point at which a first predetermined period elapses from the start of control of the spark plug by the discharge control means when the ignition signal to the igniter unit changes from on to off.

2. A control apparatus for controlling an ignition apparatus,
the ignition apparatus including:
a spark plug that is provided to a combustion chamber of an internal combustion engine and is capable of igniting an air-fuel mixture in the combustion chamber by generating electric discharge;
an ignition coil that has a primary coil of which one end is connected to a power supply side and another end is connected to a ground side, and a secondary coil of which one end is connected to the spark plug;
an igniter unit that is provided to be capable of allowing or blocking a current flowing from the primary coil towards the ground side; and
an energy input unit that is capable of inputting electrical energy to the ignition coil,
the control apparatus being capable of controlling ignition of an air-fuel mixture in the combustion chamber,
the control apparatus comprising:
a control unit that is capable of controlling the ignition of the air-fuel mixture in the combustion chamber;
a current detecting means that is capable of detecting a current flowing through the secondary coil; and
an abnormality detecting means that is capable of detecting an abnormality in the ignition apparatus based on a current value that is a value corresponding to the current detected by the current detecting means,
the control unit including:
a discharge control means for controlling the igniter unit so as to block a flow of current from the primary coil towards the ground side, thereby generating a high voltage in the secondary coil, and controlling the spark plug so that the spark plug generates electric discharge; and
an energy input control means for controlling the energy input unit to input electrical energy to the ignition coil after start of control of the spark plug by the discharge control means,
the abnormality detecting means detecting an abnormality in the igniter unit or the ignition coil based on a first threshold, and a first current value that is a value corresponding to a current detected by the current detecting means at a time point at which a first predetermined period elapses from the start of control of the spark plug by the discharge control means; and
the abnormality detecting means detects that an abnormality has occurred in the energy input unit based on a second threshold, and a second current value that is a value corresponding to a current detected by the current detecting means at a time point at which a second predetermined period that is longer than the first predetermined period elapses from the start of control of the spark plug by the discharge control means.

3. The control apparatus according to claim 2, wherein:
the energy input unit inputs electrical energy to the ignition coil from the ground side of the primary coil.

4. The control apparatus according to claim 3, wherein:
the abnormality detecting means sets the first threshold and the second threshold based on load and rotation speed of the internal combustion engine.

5. The control apparatus according to claim 4, wherein:
the abnormality detecting means detects that an abnormality has occurred in the igniter unit or the ignition coil when a state in which an absolute value of the first current value is less than an absolute value of the first threshold for a predetermined period.

6. The control apparatus according to claim 5, wherein:
the abnormality detecting means detects that an abnormality has occurred in the energy input unit when a state in which an absolute value of the second current value is less than an absolute value of the second threshold for a predetermined period.

7. The control apparatus according to claim 6, wherein:
the energy input control means controls the energy input unit so that a current corresponding to a target current value that is a predetermined current value flows through the secondary coil.

8. The control apparatus according to claim 7, wherein:
the control unit changes the target current value based on an operating state of the internal combustion engine.

9. The control apparatus according to claim 8, wherein:
the abnormality detecting means changes the second threshold based on the target current value changed by the control unit.

10. The control apparatus according to claim 9, wherein:
the control unit is configured to:
control a throttle valve that is capable of changing an amount of intake air supplied to the combustion chamber and a fuel injection valve that is capable of changing an amount of fuel supplied to the combustion chamber;
control the throttle valve and the fuel injection valve so that an air-fuel ratio within the combustion chamber is a predetermined value or lower when the abnormality detecting means detects only an abnormality in the energy input unit; and
control the fuel injection valve to block the supply of fuel to the combustion chamber when the abnormality detecting means detects an abnormality in the igniter unit or the ignition coil.

11. An ignition apparatus for an internal combustion engine, the ignition apparatus comprising:
a main ignition circuit that performs energization control of a primary coil of an ignition coil and makes a spark plug generate spark discharge;
an energy input circuit that performs energization control of the primary coil during the spark discharge started by operation of the main ignition circuit, continuously sends a secondary current in a same direction to a secondary coil of the ignition coil, and continues the spark discharge started by the operation of the main ignition circuit;
a secondary current detecting means for detecting the secondary current; and
an abnormality detecting unit that sets an allowable range for a detection value of the secondary current during operation of the energy input circuit, and determines whether or not the detection value of the secondary current has deviated outside of the allowable range.

12. The ignition apparatus for an internal combustion engine according to claim 11, wherein:
the abnormality detecting unit changes the allowable range based on a command value of the secondary current.

13. The ignition apparatus for an internal combustion engine according to claim 12, further comprising:
a notifying means for notifying a user of the determination as an abnormality when the abnormality determining unit determines that the detection value of the secondary current has fallen outside of the allowable range, a user of the determination as an abnormality.

14. An ignition apparatus for an internal combustion engine, the ignition apparatus comprising:
a main ignition circuit that is provided for each cylinder of the internal combustion engine, which performs energization control of a primary coil of an ignition coil, and makes a spark plug generate spark discharge;
an energy input circuit that is provided for each cylinder of the internal combustion engine, performs energization control of the primary coil during the spark discharge started by operation of the main ignition circuit, which continuously sends a secondary current of a same direction to a secondary coil of the ignition coil, and continues the spark discharge started by the operation of the main ignition circuit;
a secondary current detecting means for detecting the secondary current;
a malfunction determining means for determining whether or not a malfunction has occurred in the energy input circuit based on changes over time in the detection value of the secondary current during a period over which the energy input circuit is performing energization control of the primary coil; and
an energy input stopping means for stopping operation of the energy input circuit of a cylinder determined by the malfunction determining means to be that in which a malfunction has occurred.

15. The control apparatus according to claim 2, wherein:
the abnormality detecting means sets the first threshold and the second threshold based on load and rotation speed of the internal combustion engine.

16. The control apparatus according to claim 2, wherein:
the abnormality detecting means detects that an abnormality has occurred in the igniter unit or the ignition coil when a state in which an absolute value of the first current value is less than an absolute value of the first threshold for a predetermined period.

17. The control apparatus according to claim 2, wherein:
the abnormality detecting means detects that an abnormality has occurred in the energy input unit when a state in which an absolute value of the second current value is less than an absolute value of the second threshold for a predetermined period.

18. The control apparatus according to claim 2, wherein:
the energy input control means controls the energy input unit so that a current corresponding to a target current value that is a predetermined current value flows through the secondary coil.

19. The control apparatus according to claim 2, wherein:
the control unit is configured to:
control a throttle valve that is capable of changing an amount of intake air supplied to the combustion chamber and a fuel injection valve that is capable of changing an amount of fuel supplied to the combustion chamber;

control the throttle valve and the fuel injection valve so that an air-fuel ratio within the combustion chamber is a predetermined value or lower when the abnormality detecting means detects only an abnormality in the energy input unit; and control the fuel injection valve to block the supply of fuel to the combustion chamber when the abnormality detecting means detects an abnormality in the igniter unit or the ignition coil.

20. The ignition apparatus for an internal combustion engine according to claim 11, further comprising:

a notifying means for notifying, when the abnormality determining unit determines that the detection value of the secondary current has deviated outside of the allowable range, a user of the determination as an abnormality.

21. The control apparatus according to claim 1, wherein: the abnormality detecting means detects the abnormality in the igniter unit or the ignition coil based on the first threshold, and the first current value that is the value corresponding to the current detected by the current detecting means at a time point at which the first predetermined period elapses from the start of discharge control of the spark plug by the discharge control means.

22. The control apparatus according to claim 1, wherein: the abnormality detecting means detects the abnormality in the igniter unit or the ignition coil based on the first threshold, and the first current value that is the value corresponding to the current detected by the current detecting means at a time point at which the first predetermined period that is a delay period elapses from the start of discharge control of the spark plug by the discharge control means.

* * * * *